(12) United States Patent
Hirata et al.

(10) Patent No.: US 6,563,498 B1
(45) Date of Patent: May 13, 2003

(54) THREE-DIMENSIONAL OBJECT SHARED PROCESSING METHOD AND STORAGE MEDIUM

(75) Inventors: Mitsunori Hirata, Kawasaki (JP); Yuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 236 days.

(21) Appl. No.: 09/637,644

(22) Filed: Aug. 14, 2000

(30) Foreign Application Priority Data

Oct. 4, 1999 (JP) .............................. 11-283496

(51) Int. Cl.[7] .............................................. G06T 17/00
(52) U.S. Cl. ...................................... 345/419; 345/418
(58) Field of Search ................................ 345/418, 419, 345/420, 421, 422, 423, 424

(56) References Cited

U.S. PATENT DOCUMENTS

| 5,821,925 | A | 10/1998 | Carey et al. |
| 5,828,866 | A | 10/1998 | Hao et al. |
| 5,844,553 | A | 12/1998 | Hao et al. |

*Primary Examiner*—Cliff N. Vo
(74) *Attorney, Agent, or Firm*—Staas & Halsey LLP

(57) ABSTRACT

A three-dimensional object shared processing method for sharing data of a three-dimensional object among a plurality of computer systems which are coupled via a network, includes a step of updating the data of the three-dimensional object stored at each of the computer systems so that the data match, based on an operation command and change information. The operation command is related to an operation with respect to the three-dimensional object carried out at each of the computer systems. In addition, the change information indicates a change of the three-dimensional object caused by the operation carried out with respect to the three-dimensional object, and includes a number of a selected part of the three-dimensional object and a position coordinate of the selected part.

12 Claims, 67 Drawing Sheets

F I G. 17

```
COMMAND PROCESS:On Command(WPARAM wParam,LPARAM lparam) {
  IF OPERATOR
        stNetParam2 NetParam2;                          SECURE DATA STRUCTURE FOR COMMAND
        NetParam2.param1=IFVPS_MAINFRAME;               SET COMMAND OF MAINFRAME
        NetParam2.param2=wParam;                        SET PARAMETERS OF COMMAND TO BE EXECUTED
        VPSDataSend(IFVPS_ONCOMMAND,(const char*)&NetParam2);  COMMAND TRANSMISSION
    EXCUTE OWN PROCESS
}
```

FIG. 18

```
RECEIVING PROCESS:OnVPSDataRecv(*)
    IF IFVPS_ONCOMMAND
        GetNetParam2=(stNetParam2*)pcData;      DATA READ
        DoOnCommand(GetNetParam2->param1,GetNetParam2->param2); EXCUTE COMMNAD PROCESS
```

FIG. 19

```
COMMAND PROCESS:DoOnCommand(int kind, int command) {
  DIVIDE DEPENDING ON kind
    IF IFVPS_MAINFRAME
      SEND MESSAGE TO MAINFRAME AND EXECUTE
    IF IFPCS_VIEW
      SEND MESSAGE TO VIEW AND EXECUTE
```

FIG. 20

```
COMMAND PROCESS:OnCommand(WPARAM wParam,LPARAM lParam) {
  IF OPERATOR
    (wParam=ID_FILE_OPEN)IF NON-TRANSMITTING COMMAND
        EXCUTE COMMAND BY ITSELF & ESCAPE FROM FUNCTION,
        SO AS NOT TO OPEN FILE CHOOSER SINCE NON-TRANSMITTING
    stNetParam2 NetParam2;                SECURE DATA STRUCTURE FOR COMMAND
    NetParam2.param2=wParam;              SET PARAMETERS OF COMMNAD TO BE EXECUTED
    VPSDataSend(IFVPS_ONCOMMNAD, (const char*)&NetParam2);   TRANSMIT COMMAND
  IF RECEIVING END
    IF MENU EXECUTABLE AT RECEIVING END(e.g. :wParam=ID_FILE_OPEN)
        EXECUTE COMMAND ONLY BY ITSELF
        ESCAPE FROM FUNCTION TO PROHIBIT OPERATION BY OTHER THAN OPERATOR
    IF NOTIFIED OF COMMAND BEING EXECUTED
        EXECUTE SAME COMMNAD ALSO AT RECEIVING END
    EXECUTE COMMAND ONLY BY ITSELF & ESCAPE FROM FUNCTION
}
```

FIG. 21

```
RECEIVING PROCESS:OnVPSDataRecv(const unsigned short usFrom,
     DIVIDE DEPENDING ON usKind
     IF IFVPS_ONCOMMAND
         GetNetParam2=(stNetParam2*)pcData:DATA READ
         tmpflag=m_Operatorflag;           SAVE FLAG
         m_Opratorflag=IFVPS_ONCOMMAND;    NOTIFY FLAG DURING EXECUTION OF COMMAND
         DoOnCommand(GetNetPram2->param1,GetNetPram2->param2);EXECUTE PROCESS
         m_Operatorflag=tmpflag;           RETURN SAVED FLAG
```

FIG. 22

```
PC OF OPERATOR
(1) SELECT & OPEN D:\users\dATA\ModelA.asy
(2) OBTAIN & SEND ModelA.asy PC OF USER 1
(1) RECEIVE ModelA.asy
(2) OBTAIN INFO OF PRESET DATA DIRECTORY
(3) COMBINE BOTH & OPEN F:\users\Viewer\ModelA.asy

SAME FOR PC OF OTHER USERS INCLUDING USER 2
```

F I G. 24

```
DIRECTORY SELECTING PROCESSS:OnDirSelect0
  IF DATA OF 3-D SHARED VIEWER SELECTED
    OBTAIN DIRECTORY OF FILE CHOOSER
    WriteProfileString(szSection,"DATA_HOME",m_Data_Dir):RECORD REGISTRY INFO
```

FIG. 25

```
OPENING FILE SELECTING PROCESS:OnFileOpen0 {
  IF POSESSING OPERATION RIGHT
    BECOME OPERATOR IF OPERATION RIGHT NOT LOCKED
  OPEN FILE CHOOSER
  SET DATA DIRECTORY PATH OF REGISTRY
```

FIG. 26

```
FILE OPEN PROCESS:OnOpenDocument(LPCTSTR lpszPathName)
  ACQUIRE DIRECTORY & FILE NAME                              (e.g.:D:\users\Data\ModelA.asy)
  IF OPERATOR
    PROCESS ACQUIRING FILE NAME EXCLUDING DIRECTORY          (e.g.:ModelA.asy)
      ViewerDataSend(IFVPS_FILE_NAME, szFnameExt);           TRANSMIT FILE NAME BEFORE EXECUTING READ
    READ PROCESS
```

FIG. 27

```
COMMAND EXECUTING PROCESS:OnCommand(WPARAM wParam,LPARAM lParam) {
    IF OPERATOR
        IF NON-TRANSMITTING COMMAND (e.g.:wParam=ID_FILE_OPEN)
            EXECUTE COMMAND ONLY BY ITSELF & ESCAPE FROM FUNCTION,
            SO AS NOT TO OPEN FILE CHOOSER SINCE NON-TRANSMITTING
        }
        ViewerDataSend(IFVPS_ONCOMMAND,(const char*)&NetParam2):    TRANSMIT COMMAND IF RECEIVING END
        IF COMMAND EXECUTABLE AT RECEIVING END (e.g.:wParam=ID_FILE_OPEN)
            EXECUTE COMMAND
        ESCAPE FROM FUNCTION TO PROHIBIT OPERATION BY OTHER THAN OPERATOR IF NOTIFIED OF COMMAND BEING EXECUTED
        EXECUTE SAME COMMNAD ALSO AT RECEIVING END
    }
    EXECUTE COMMAND ONLY BY ITSELF & ESCAPE FROM FUNCTION
```

FIG. 28

```
RECEIVING PROCESS:OnViewerDataRecv(*)
    IF "OPEN" RECEIVED
        SET RECEIVED FILE NAME                              (e.g.:ModelA.asy)
        READ FUNCTION OF REGISTRY INFO
            SET DATA DIRECTORY PATH OF REGISTRY             (e.g.:F:\users\Viewer\)
        PROCESS CREATING DIRECTORY PATH & FILE NAME         (e.g.:F:\users\Viewer\ModelA.asy)
        PROCESS OPENING FILE FROM SET DIRECTORY
```

FIG. 29

```
ANOTHER NAME STORE PROCESS
OPEN FILE CHOOSER
IF OPERATOR
    PROCESS ACQUIRING FILE NAME EXCLUDING DIRECTORY PORTION
        ViewerDataSend(ID_FILE_SAVE_AS, szFnameExt);    TRANSMIT ANOTHER NAME STORE COMMAND & FILE NAME
    STORE ASSEMBLY DATA IN ITSELF
}
```

FIG. 30

```
IF OPERATOR
    IF NON-TRANSMITTING COMMAND (e.g. :wParam=ID_FILE_SAVE_AS)
        NOT OPEN FILE CHOOSER SINCE NON-TRANSMITTING
    IF RECEIVING END
        IF MENU EXECUTABLE AT RECEIVING END (e.g. :wParam=ID_FILE_SAVE_AS)
            EXECUTE COMMAND
        ESCAPE FROM FUNCTION TO PROHIBIT OPERATION BY OTHER THAN OPERATOR
```

FIG. 31

```
RECEIVING PROCESS:OnViewerDataRecv(*)
 IF "ANOTHER NAME STORE" RECEIVED
   SET RECEIVED FILE                                    (e.g.:ModelB.asy)
   DATA DIRECTORY PATH SINCE ALREADY OPEN
   PROCESS CREATING DIRECTORY PATH & FILE NAME          (e.g.:F:¥users¥Viewer¥)
   NetCommand(ID_FILE_SAVE_AS, 0);                      (e.g.:F:¥users¥Viewer¥ModelB.asy)
                                                        EXECUTE ANOTHER NAME STORE
```

FIG. 32

```
NetCommand(int command, int)
    DIVIDE DEPENDING ON command
    IF ID_FILES_SAVE_AS
        Save(lpsz.PathName);          STORE SET DIRECTORY & FILE NAME
```

FIG. 33

```
CONFERENCE STATE NOTIFYING PROCESS:OnCollaboStatusChg(const int iChangeInf,*)
    DIVIDE DEPENDING ON iChangeInf
    (1) IF RESET
        IF OPERATOR
                    (1) EXECUTE RESET PROCESS
    (2) IF CONFERENCE END
        IF CHAIRMAN
            OBTAIN OPERATION RIGHT
            EXECUTE ANOTHER NAME STORE PROCESS
            EXECUTE CLOSING PROCESS
    OTHER CASES
```

FIG. 34

```
RESET PROCESS {
    IF PROCESSING OPERATION RIGHT & IF FILE NAME NOT BLANK
        MOVE TO DIRECTORY HAVING FILE OPENED BEFORE
        CREATE DIRECTORY & FILE NAME OPENED BEFORE
        READ AGAIN BY ITSELF (TRANSMIT FILE NAME & OPEN COMMAND)
}
```

FIG. 51

USER NO.
CPU NO.
CPU FREQUENCY
CG DRAWING TIME (SECONDS)
CPU PROCESSING TIME (SECONDS)

FIG. 52A

USERS 1 & 2 PARTICIPATING

PC SPEC LIST OF USER 1
USER 1, DRAWING TIME OF USER 1
USER 2, DRAWING TIME OF USER 2

PC SPEC LIST OF USER 2
USER 2, DRAWING TIME OF USER 2
USER 1, DRAWING TIME OF USER 1

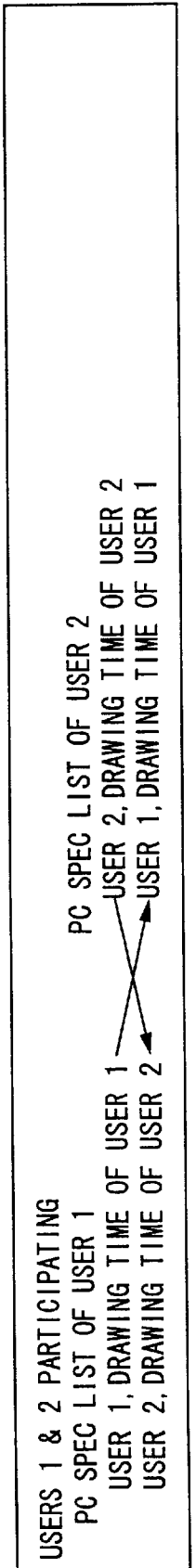

FIG. 52B

USER 3 LATE PARTICIPATING

PC SPEC LIST OF USER 1
USER 1, DRAWING TIME OF USER 1
USER 2, DRAWING TIME OF USER 2
USER 3, DRAWING TIME OF USER 3

PC SPEC LIST OF USER 2
USER 2, DRAWING TIME OF USER 2
USER 1, DRAWING TIME OF USER 1
USER 3, DRAWING TIME OF USER 3

PC SPEC LIST OF USER 3
USER 3, DRAWING TIME OF USER 3
USER 2, DRAWING TIME OF USER 2
USER 1, DRAWING TIME OF USER 1

FIG. 52C

USER 2 LEAVING

PC SPEC LIST OF USER 1
USER 1, DRAWING TIME OF USER 1
USER 3, DRAWING TIME OF USER 3
USERS 2, 0

PC SPEC LIST OF USER 3
USER 3, DRAWING TIME OF USER 3
USER 1, DRAWING TIME OF USER 1
USERS 2, 0

FIG. 55

MAILER

Subject NetCollaboration Data Transfer test
   Date:Thu.08 Oct 1998 11:46:59 +0900
   From:hirata<hirata@ ********* co.jp>
    To:memb@ ********* co.jp This is Hirata of Fujitsu

AGENDA OF MEETING IS ATTACHED. PLEASE PREPARE
TO ENSURE SMOOTH DISCUSSION.

AGENDA OF MEETING
  1.DATE & TIME: Oct.25(fri) 10:00
  2.PLACE: Fujitsu Kawasaki 5 Fl.Room S510
  3.PARTICIPANTS; SATO, HIRATA
               INOMATA, SAKURAI

4.TOPIC
  STUDY ON DESIGN OF PRODUCT A

5.SUBJECT
  FROM file:///G1/users/hirata/NET/HTML_DATA/test.html
    1.Download->START VPS
     SAIKUDA_TAVPS.exe
  TO GET DATA

FIG. 62

```
CONFERENCE HOLDING (PARTICIPATING) PROCESS:ExecCollabo {
    dwID1=ShellExecute(".¥¥MeetingStatus.exe","MeetingStatus");    START CONFERENCE MANAGEMENT
    dwID2=ShellExecute(".¥¥VPS.exe","VPS");                        START 3-D SHARED VIEWER
}
```

TRANSMITTING END

RECEIVING END

HORIZONTAL 2

RECEIVING END

HORIZONTAL

TRANSMITTING END

FIG. 69

| | STATE | TRANSMITTING END | RECEIVING END | NOTE |
|---|---|---|---|---|
| 1 | INITIAL STATE | | | NO-ONE HAS OPERATION RIGHT |
| 2 | ACQUIRING OPERATION RIGHT | | | DISPLAY MARK ON SPEAKER IN CONFERENCE STATE TABLE. DISPLAY SPEAKER NAME IN POINTER OF RECEIVING END |
| 3 | LOCKING | | | PROHIBIT RECEIVING END FROM ACQUIRING OPERATION RIGHT |
| 4 | RELEASE LOCKING | | | SAME AS 2, OPERATION RIGHT CAN BE ACQUIRED AT RECEIVING END |
| 5 | RELEASE OPERATION RIGHT | | | NO-ONE HAS OPERATION RIGHT |

THREE-DIMENSIONAL OBJECT SHARED PROCESSING METHOD AND STORAGE MEDIUM

BACKGROUND OF THE INVENTION

This application claims the benefit of a Japanese Patent Application No.11-283496 filed Oct. 4, 1999, in the Japanese Patent Office, the disclosure of which is hereby incorporated by reference.

1. Field of the Invention

The present invention generally relates to three-dimensional object shared processing methods and storage media, and more particularly to a three-dimensional object shared processing method for processing a three-dimensional object which is built on a computer by sharing the three-dimensional object by a plurality of computers which are coupled via a network, and to a computer-readable storage medium which stores a program for causing a computer to process a three-dimensional object by such a three-dimensional object shared processing method.

In this specification, a three-dimensional object refers to an abstract model such as a three-dimensional graphics model. In addition, processing the three-dimensional object refers to an arbitrary operation which can be carried out on a computer with respect to the three-dimensional object, such as moving, rotating, enlarging, reducing, changing view point, clipping, checking interference and annotation. Furthermore, the three-dimensional object shared processing method according to the present invention and the storage medium according to the present invention are applicable to simultaneous design reviews and conferences conducted at remote locations in the fields of design and production, to remote control of robots or the like, to computer games or the like, for example.

2. Description of the Related Art

The conventional three-dimensional object shared processing method can roughly be categorized into the following three kinds.

According to a first method, a plurality of computers share commands for controlling window events and display events, and a drawn object is shared by the plurality of computers by successively exchanging information. This first method is employed in systems such as "NetMeeting" provided by Microsoft Corporation, and "LiveHelp" and "The Collabo" provided by Fujitsu Limited.

According to the first method, all commands controlling display events are exchanged by an Operating System (OS), thereby requiring an extremely larger communication band. For this reason, consideration is normally not given on the use of this first method under environments other than a Local Area Network (LAN). In addition, when this first method is employed in a computer which is installed with a three-dimensional graphics board, the display commands are not only processed by the OS but also by the three-dimensional graphics board. Hence, graphics processed in the computer which is installed with the three-dimensional graphics board cannot be shared by computers which are coupled to this computer via a network. Therefore, the sharing of the graphics object is limited to the computers which process the display events by software of the OS, and it is not possible to smoothly share the graphics object among the computers by high-speed rendering using the three-dimensional graphics board.

According to a second method, the three-dimensional object which is to be shared among the computers is locally stored in memories of the computers which are coupled via a network. Only basic transformation quantities related to moving, rotation and the like of the object are exchanged among the computers. This second method is proposed in a U.S. Pat. No. 5,821,925, for example.

Because this second method only exchanges the basic transformation quantities such as the moving, rotation and the like of the object among the computers, it is not possible to share among the computers object operations other than the basic object operations such as moving and rotation. In addition, if performance conditions such as drawing performance and CPU performance are not uniform among each of the local sites (computers), errors are introduced in the shared state of the object among the computers.

On the other hand, instead of exchanging the basic transformation quantities such as the moving and rotation of the object among the computers as in the case of the second method, a third method exchanges only input operation events, such as mouse events and keyboard events, among the computers. The mouse events include mouse positions X and Y and upward and downward movements of a button by the mouse. This third method is proposed in a U.S. Pat. No. 5,844,553, for example. According to this third method, the operation itself of an application which loads the object is shared among all of the computers.

Since the third method shares the application among the computers, the amount of programming required is small, and it is possible to build a so-called "shared communication system" which is virtually independent from each application which is to be shared. However, in the case of an application having VisualC++ standard Graphic User Interface (GUI) system, it is a precondition that display conditions match at all of the local sites. The display conditions include window sizes of the applications, positions of menu bars and the like. Therefore, the degree of user freedom is limited by the precondition which is to be satisfied at all of the local sites.

According to the first through third methods described above, there are problems in that the three-dimensional object cannot be shared interactively and smoothly and among the computers by flexibly copying with various operations carried out at each of the local sites, regardless of the uniformity of the performance conditions and the display conditions at each of the local sites. In addition, when the three-dimensional object is to be shared in response to the mouse events, it is a precondition that the window sizes and the positions of the menu bars of the applications match at each of the local sites, and there is also a problem in that the degree of user freedom is limited and the user cannot freely change the display conditions such as the window sizes and menu bar positions.

SUMMARY OF THE INVENTION

Accordingly, it is a general object of the present invention to provide a novel and useful three-dimensional object shared processing method and storage medium, in which the problems described above are eliminated.

Another and more specific object of the present invention to provide a three-dimensional object shared processing method and a storage medium, which can share a three-dimensional object interactively and smoothly among computers by flexibly copying with various operations carried out at each of local sites, in a state where display conditions such as window sizes and menu bar positions may be set arbitrarily at each of the local sites.

Still another object of the present invention is to provide a three-dimensional object shared processing method for sharing data of a three-dimensional object among a plurality of computer systems which are coupled via a network, comprising a step of updating the data of the three-dimensional object stored at each of the computer systems so that the data match, based on an operation command and change information, where the operation command is related to an operation with respect to the three-dimensional object carried out at each of the computer systems, and the change information indicates a change of the three-dimensional object caused by the operation carried out with respect to the three-dimensional object and includes a number of a selected part of the three-dimensional object and a position coordinate of the selected part. According to the three-dimensional object shared processing method of the present invention, it is possible to share a three-dimensional object interactively and smoothly among computer systems by flexibly copying with various operations carried out at each of local sites, in a state where display conditions such as window sizes and menu bar positions may be set arbitrarily at each of the local sites.

A further object of the present invention is to provide a computer-readable storage medium which stores a program for causing a computer to process data of a three-dimensional object to be shared among a plurality of computer systems which are coupled via a network, comprising means for causing the computer to update the data of the three-dimensional object stored at each of the computer systems so that the data match, based on an operation command and change information, where the operation command is related to an operation with respect to the three-dimensional object carried out at each of the computer systems, and the change information indicates a change of the three-dimensional object caused by the operation carried out with respect:to the three-dimensional object and includes a number of a selected part of the three-dimensional object and a position coordinate of the selected part. According to the computer-readable storage medium of the present invention, it is possible to share a three-dimensional object interactively and smoothly among computer systems by flexibly copying with various operations carried out at each of local sites, in a state where display conditions such as window sizes and menu bar positions may be set arbitrarily at each of the local sites.

Other objects and further features of the present invention will be apparent from the following detailed description when read in conjunction with the accompanying drawings.

BRIEF DESCRIPTION OF THE DRAWINGS

FIG. 17 is a diagram showing the command process of a transmitting end client system;

FIG. 18 is a diagram showing the receiving process of a receiving end client system;

FIG. 19 is a diagram showing the command process of the receiving end client system;

FIG. 20 is a diagram showing the command process of the transmitting end client system, including the process of prohibiting the menu operation at the receiving end;

FIG. 21 is a diagram showing the receiving process of the receiving end client system, including the process of prohibiting the menu operation at the receiving end;

FIG. 22 is a diagram for explaining the special file operation;

FIG. 24 is a diagram for explaining the directory selecting process;

FIG. 25 is a diagram for explaining the opening file selecting process of the special file open;

FIG. 26 is a diagram for explaining the file open process of the special file open;

FIG. 27 is a diagram for explaining the command executing process of the special file open;

FIG. 28 is a diagram for explaining the receiving process of the special file open;

FIG. 29 is a diagram for explaining the another name store process of the general another name store;

FIG. 30 is a diagram for explaining a modification of the another name store process;

FIG. 31 is a diagram for explaining the receiving process of the general another name store;

FIG. 32 is a diagram for explaining the another name store process;

FIG. 33 is a diagram for explaining the conference state notifying process;

FIG. 34 is a diagram for explaining the reset process;

FIG. 51 is a diagram showing specifications of the computer system;

FIGS. 52A, 52B and 52C are diagrams for explaining the creation and updating of a specification list;

FIG. 55 is a diagram for explaining the mail reception;

FIG. 62 is a diagram for explaining the conference holding (participating) process;

FIG. 69 is a diagram for explaining the operation right switching process.

DESCRIPTION OF THE PREFERRED EMBODIMENTS

Figure 1:
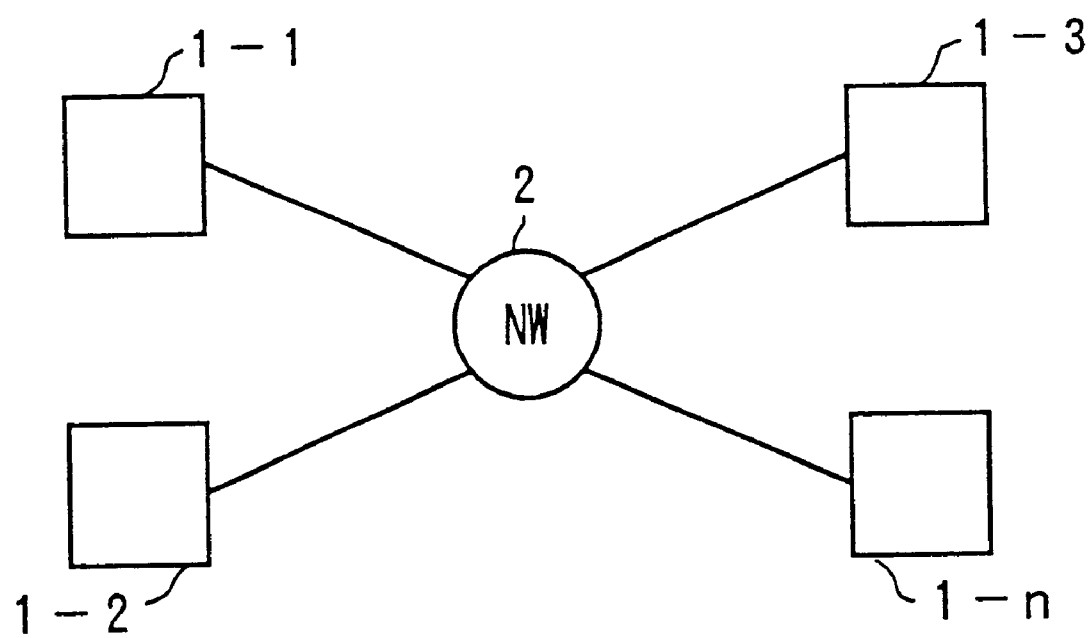
FIG. 1 is a diagram showing a server-client system which may be applied with a first embodiment of a three-dimensional object shared processing method according to the present invention.

A description will hereinafter be given of various embodiments of a three-dimensional object shared processing method according to the present invention and a storage medium according to the present invention, by referring to the drawings.

FIG. 1 is a diagram showing a server-client system which may be applied with a first embodiment of the three-dimensional object shared processing method according to the present invention. In the server-client system shown in FIG. 1, a plurality of computer systems 1-1 through 1-n are coupled via a network 2 such as a LAN and a Wide Area Network (WAN). It is assumed for the sake of convenience that the computer system 1-1 forms a server, and the other computer systems 1-2 through 1-n form clients. Of course, the computer system 1-1 may include the functions of both the server and the client. In this embodiment, it is assumed for the sake of convenience that all of the computer systems 1-1 through 1-n have the same basic structure, however, the basic structures of the computer system 1-1 which forms the server and the computer systems 1-2 through 1-n which form the clients may be mutually different. In addition, of the computer systems 1-1 through 1-n, two or more computer systems may have mutually different basic structures.

Figure 2:
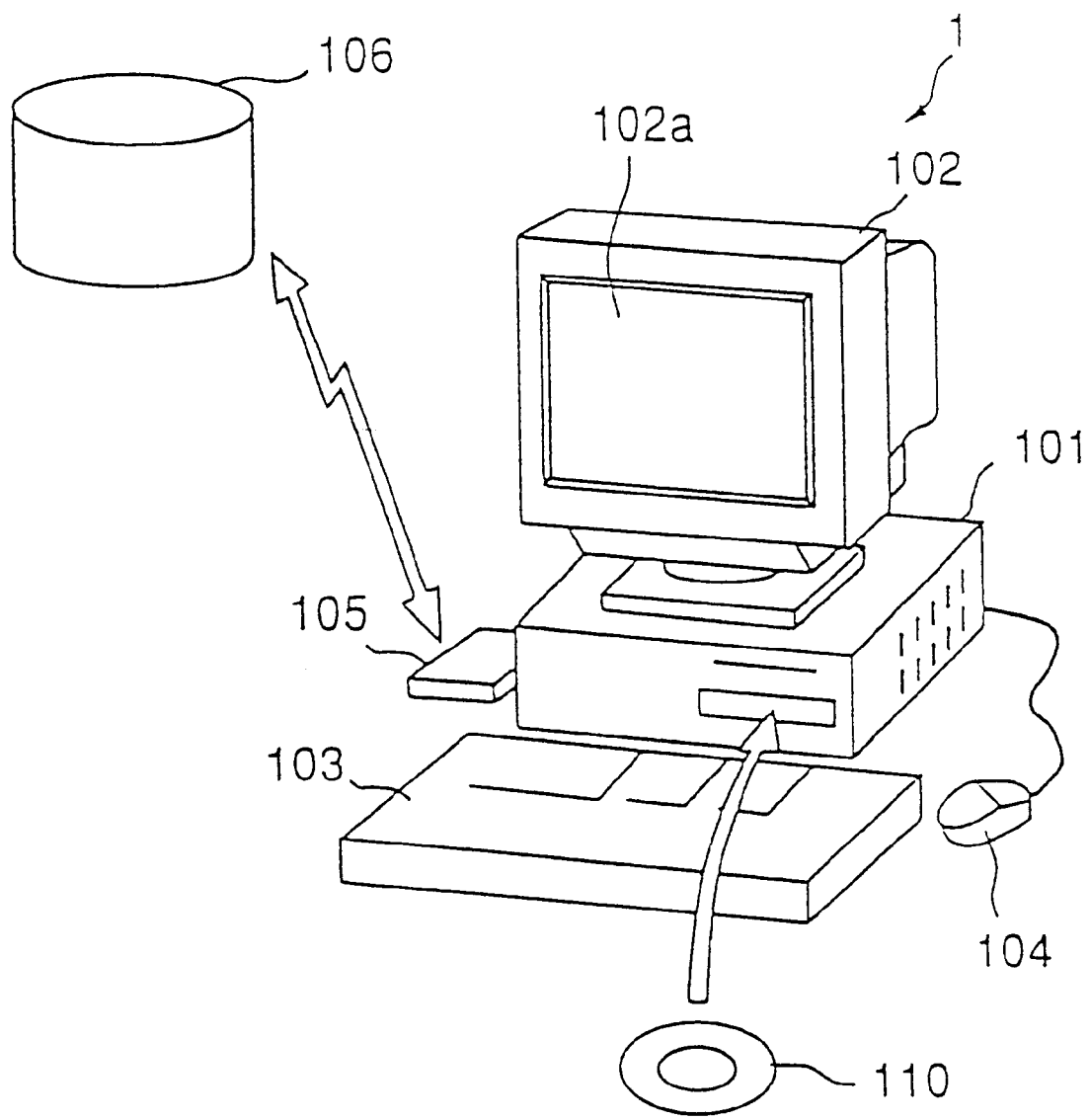
FIG. 2 is a perspective view showing a computer system.

FIG. 2 is a perspective view showing a computer system 1 which may be used as the computer systems 1-1 through 1-n. The computer system 1 shown in FIG. 1 includes a main body 101 which includes a CPU, a disk drive unit and the like, a display 102 for displaying an image on a display screen 102a in response to an instruction from the main body 101, a keyboard 103 for inputting various information to the computer system 1, a mouse 104 for specifying an arbitrary position on the display screen 102a of the display 102, and a modem 105 for making access to an external database or the like and downloading a program or the like stored in another computer system.

A program for causing the computer system 1 to carry out a process based on the three-dimensional object shared processing method according to the present invention, is stored in a portable recording medium such as a disk 110 or, is downloaded from a recording medium 106 of another computer system using a communication unit such as the modem 105. This program is input to the computer system 1 and is compiled therein. A computer-readable storage medium according to the present invention is formed by a recording medium such as the disk 110 which stores the program described above. The recording medium forming the computer-readable storage medium according to the present invention is not limited to portable recording media such as the disk 110, IC card memories, floppy disks, magneto-optical disks, CD-ROMS, but also includes various kinds of recording media which are accessible by a computer system which is connected via a communication means or communication unit such as the modem 105 and the LAN.

Figure 3:
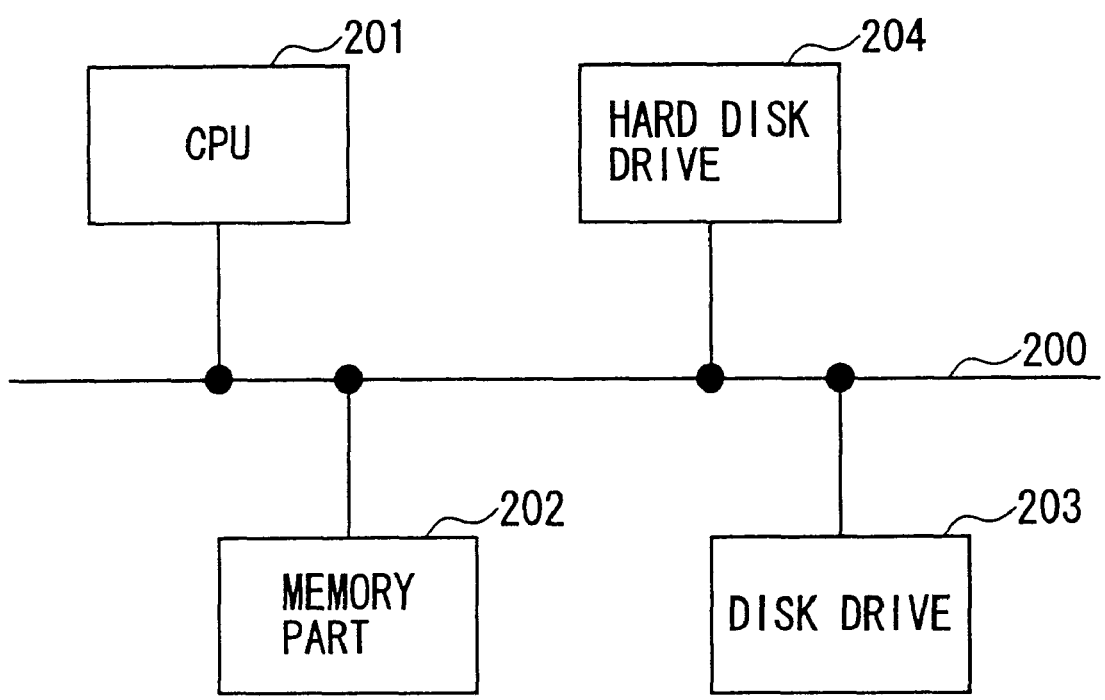
FIG. 3 is a system block diagram showing the construction of an important part within a main body of the computer system.

FIG. 3 is a system block diagram for explaining the construction of an important part within the main body 101 of the computer system 1. In FIG. 3, the main body 101 generally includes a CPU 201, a memory part 202 including a RAM, a ROM and the like, a disk drive unit 203 for the disk 110, and a hard disk drive unit 204 which are connected via a bus 200. The display 102, the keyboard 103, the mouse 104 and the like are connected to the CPU 201 via the bus 200, or directly connected to the CPU 201, although the illustration thereof is omitted in FIG. 3.

Figure 4:
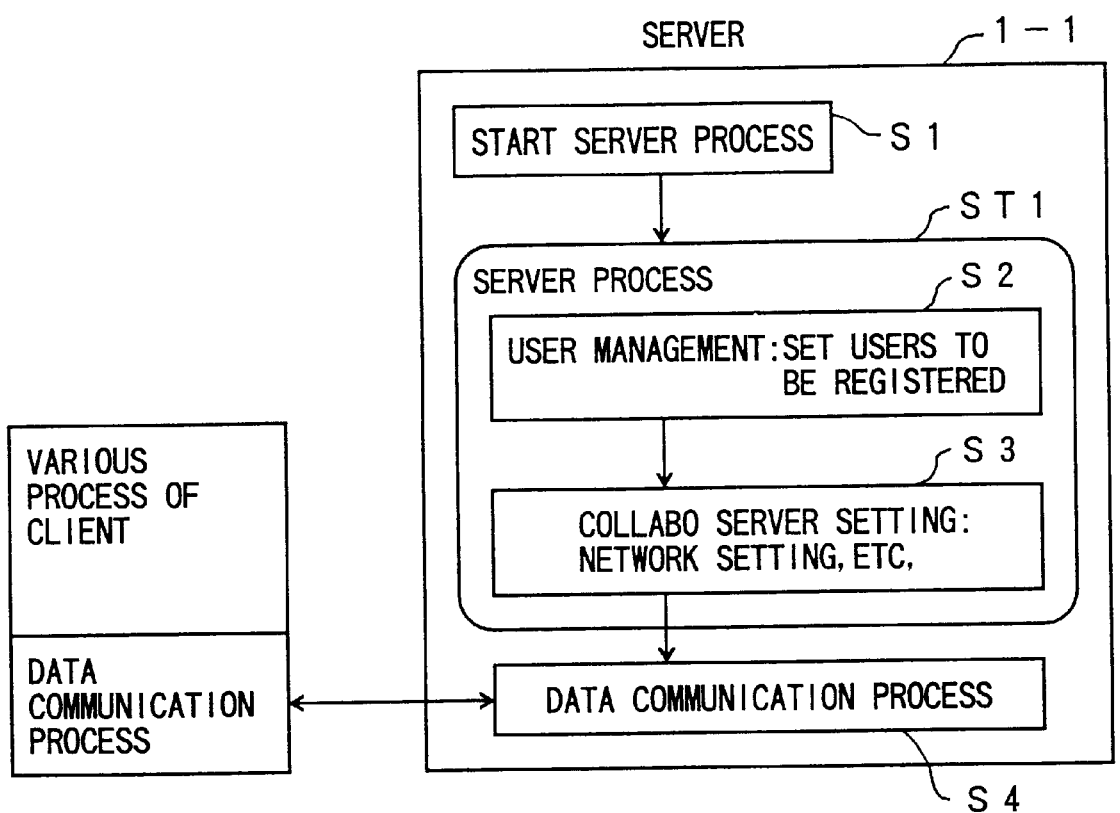
FIG. 4 is a flow chart for explaining the operation of a server when holding a conference.
Figure 5:
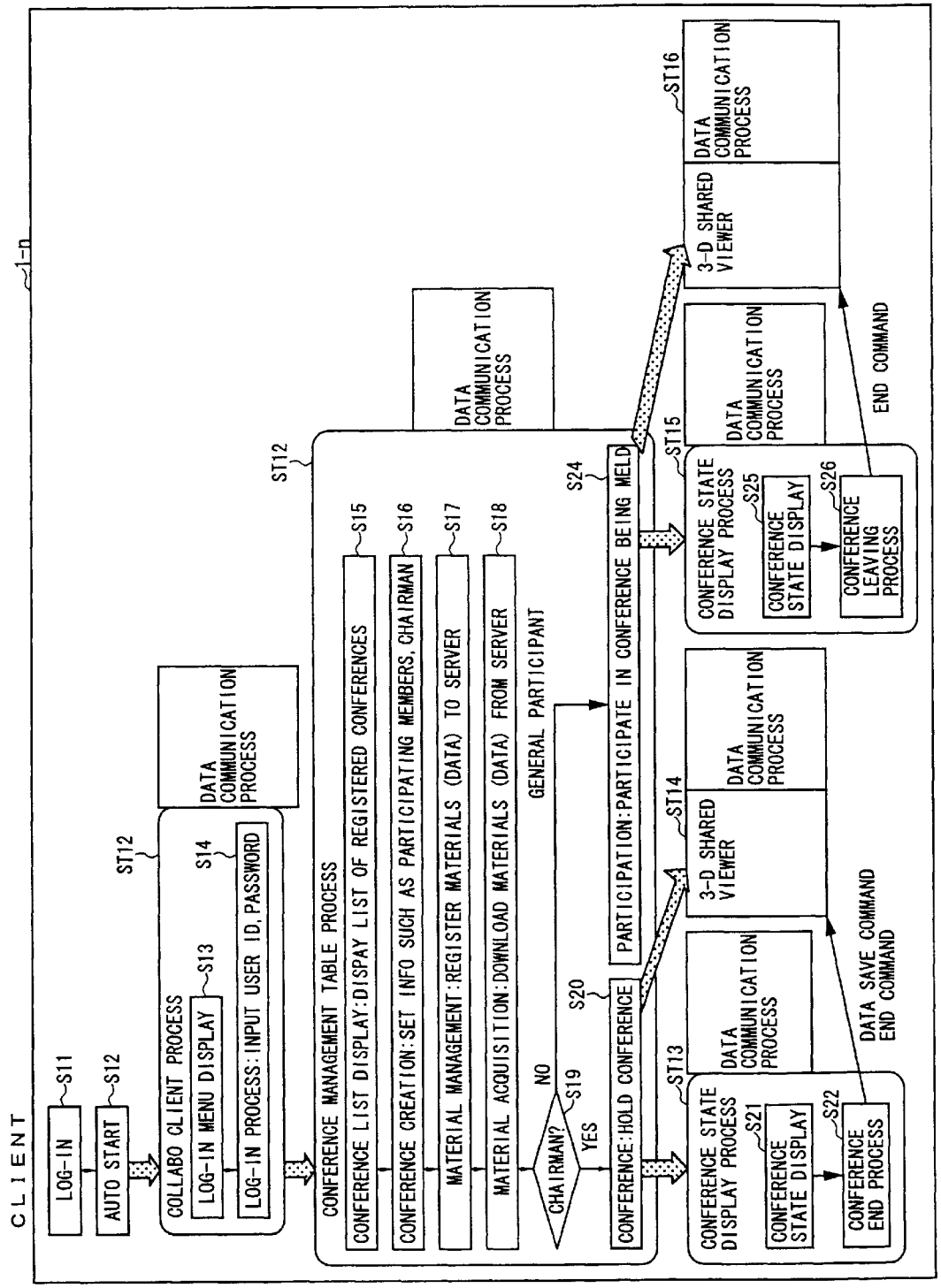
FIG. 5 is a flow chart for explaining the operation of a client when holding the conference.

FIGS. 4 and 5 are diagrams for explaining the operation of the system as a whole when holding a conference by the server-client system shown in FIG. 1. More particularly, FIG. 4 is a flow chart for explaining the operation of the computer system 1-1 which function as the server (hereinafter simply referred to as a server system) when holding a conference, and FIG. 5 is a flow chart for explaining the operation of the computer system 1-n which functions as the client (hereinafter simply referred to as a client system) when holding the conference. For the sake of convenience, it is assumed that data related to a three-dimensional object in an initial state are already stored in each of the computer systems 1-1 through 1-n. The data related to the three-dimensional object in the initial state may be supplied in advance from the server system to each of the client systems or, may be supplied from one client system to the server system and all of the other client systems. Any means of supplying the data are acceptable, as long as the same data related to the three-dimensional object in the initial sate are stored in the server system and all of the client systems before the conference starts.

It is assumed for the sake of convenience that, in the conference, operations are carried out with respect to the three-dimensional object which shared by the users of each of the client systems while viewing the three-dimensional object. The face or the like of the user (conference participant) of each of the client systems may be displayed according to a known method, but is optional and not essential in this embodiment.

In FIG. 4, a step S1 starts a server process of the system "The Collabo" provided by Fujitsu Limited, and a step ST1 carries out a Collabo server process. The step ST1 includes a step S2 for carrying out a user management, and a step S3 for carrying out a Collabo server setting. In the user management of the step S2, the users to be registered are set. In the Collabo server setting of the step S3, the setting of a network and the like is made. After the Collabo server process of the step ST1, a step S4 carries out a data communication process, and required data communication processes are made with each of the client systems.

In FIG. 5, when a log-in to the system is made in a step S11, a step S12 automatically starts the system, and a step ST11 carries out a Collabo client process. The step ST11 includes a step S13 for carrying out a log-in menu display and a step S14 for carrying out a log-in process, and accepts various requests to the conference. In the log-in process of the step S14, a user identification (ID), a password and the like are input. The step S11 and steps ST12 through ST16 which will be described later respectively carry out the necessary data communication process with the server system, by the data communication process which is carried in the step S4 of the server system.

After the step ST11, a step ST12 carries out a conference management table process. This step ST12 includes steps S15 through S20 and S24. Th step S15 carries out a conference list display, so as to display a list of registered conferences. The step S16 carries out a conference creation, so as to set information related to participating members, chairman and the like of the conference. The step S17 carries out a material management, by registering materials (data) to the server system. The step S18 carries out a material acquisition, by downloading the materials (data) from the server system. The step S19 carries out a chairman judgement, so as to decide whether or not the user of the client system is the chairman. If the decision result in the step S19 is YES, the step S20 holds the conference, and the process advances to a conference state table process of the step ST13 which will be described later or a three-dimensional shared viewer application (hereinafter simply referred to as a three-dimensional shared viewer) process of the step ST14 which will be described later. On the other hand, if the decision result in the step S19 is NO, the step S24 participates in the conference which is being held, and the process advances to a conference state table process of the step ST15 which will be described later or a three-dimensional shared viewer process of the step ST16 which will be described later.

The step ST13 includes a step S21 for carrying out a conference state display, and a step S22 for carrying out a conference end process. The step S22 sends commands such as a data save command and an end command to the three-dimensional shared viewer of the step ST14.

On the other hand, the step ST15 includes a step S25 for carrying out a conference state display, and a step S26 for carrying out a conference leaving process. The step S26 sends an end command to the three-dimensional shared viewer of the step ST16.

Figure 6:
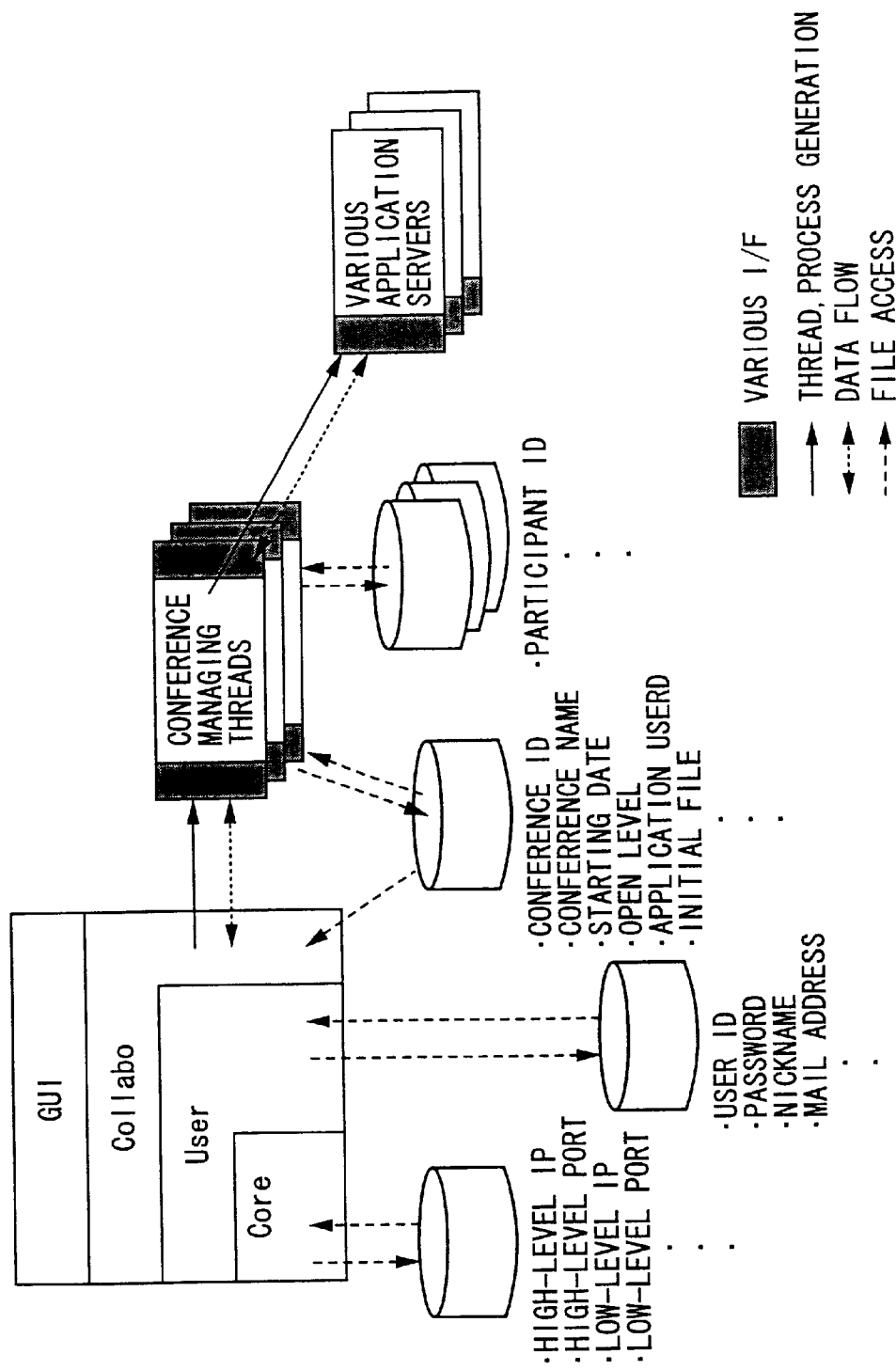
FIG. 6 is a diagram for explaining the server process of a server system.

FIG. 6 is a diagram for explaining a server process of the server system. The server process includes a core layer, a user layer, a Collabo layer, and a GUI layer. Generation of threads and processes, flow of data, and file access are respectively indicated by arrows in solid lines, thin broken lines and broken lines in FIG. 6. Shaded portions in FIG. 6 indicate various interfaces (I/F).

Figure 7:
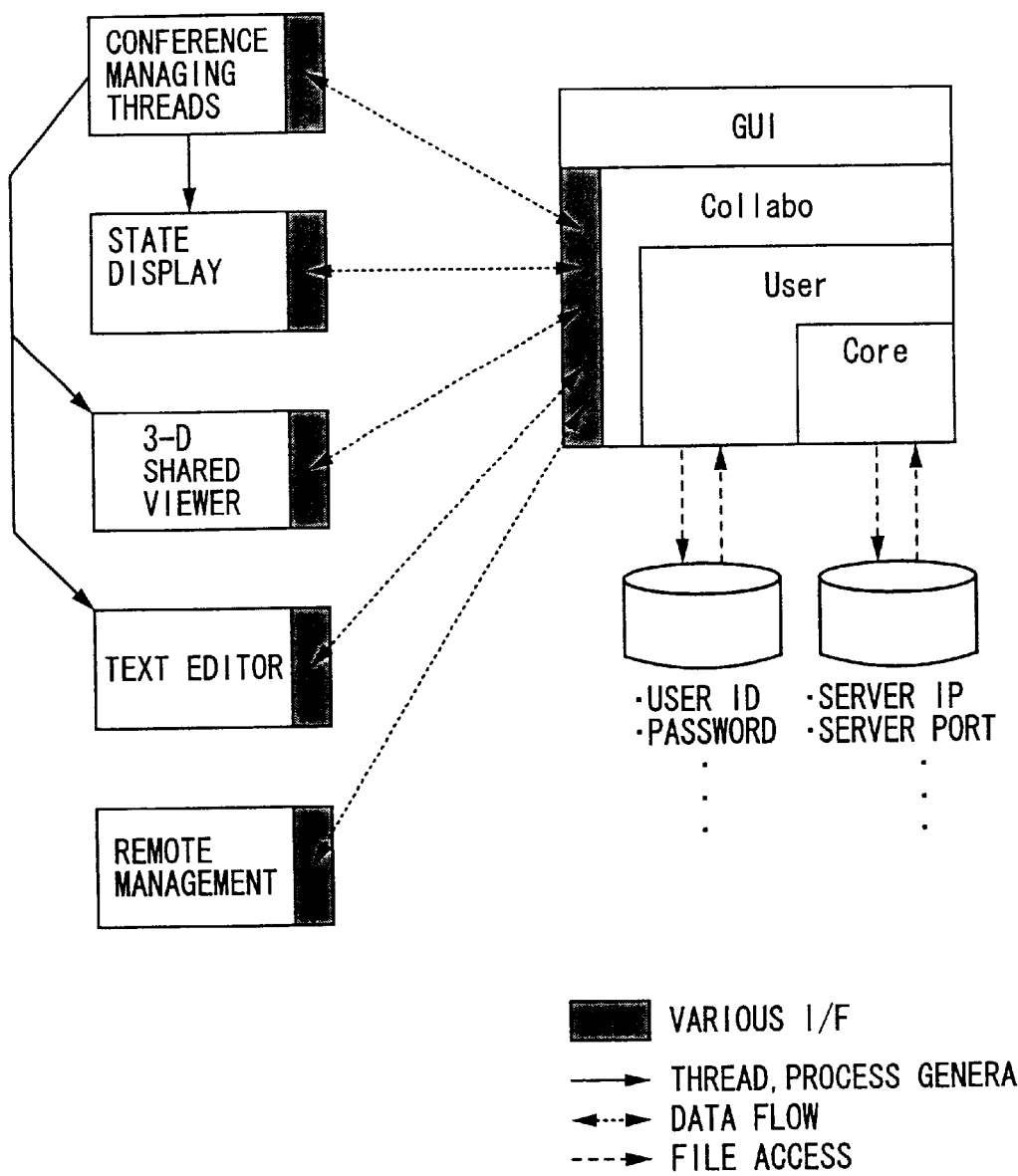
FIG. 7 is a diagram for explaining the client process in a client system.

FIG. 7 is a diagram for explaining a client process in the client system. The client process includes a core layer, a user layer, a Collabo layer, and a GUI layer. Generation of threads and processes, flow of data, and file access are respectively indicated by arrows in solid lines, thin broken lines and broken lines in FIG. 7. Shaded portions in FIG. 7 indicate various interfaces (I/F). The interface of the Collabo layer is linked to the interface of the conference management corresponding to the step ST12 shown in FIG. 5, the interface of the state display corresponding to the steps ST13 and ST15 shown in FIG. 5, and the interface of the three-dimensional shared viewer corresponding to the steps ST14 and ST16 shown in FIG. 5. The interface of the Collabo layer is further linked to the interface of a text editor and the interface of a remote management.

Figure 8:
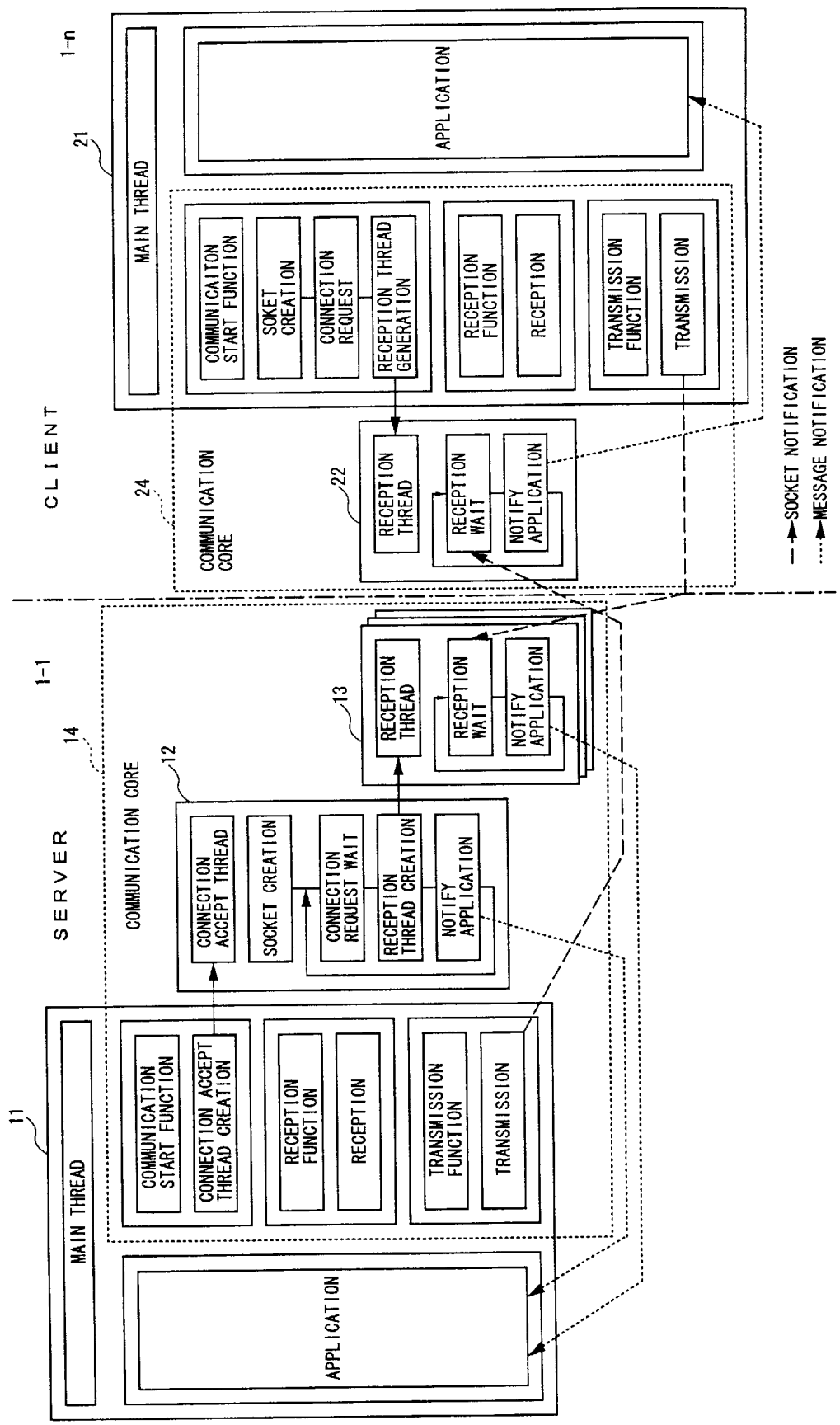
FIG. 8 is a diagram for explaining the connected state of the server system and the client system.
Figure 15:
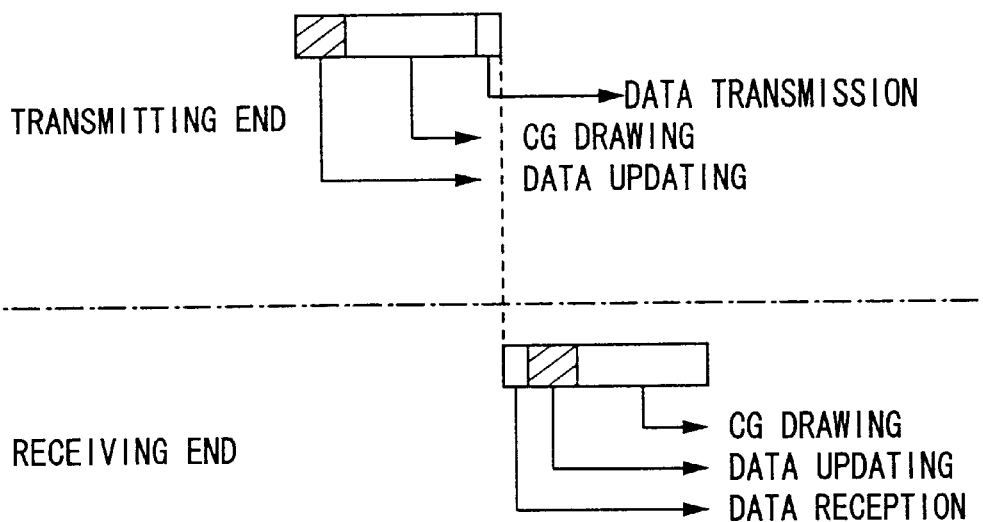
FIG. 15 is a diagram for explaining the data transmission after the drawing process.

The connection of the server system and the client system is enabled when the correct password is input in the step S14 shown in FIG. 15, and the server system and the client system are connected as shown in FIG. 8. FIG. 8 is a diagram for explaining the connected state of the server system and the client system. In FIG. 8, arrows in broken lines indicate socket notifications, and arrows in thin broken lines indicate message notifications. The server system 1-1 shown in FIG. 8 includes a main thread 11, a connection accept thread 12, and a reception thread 13, and a portion surrounded by a dotted line forms a communication core 14.

The main thread 11 of the server system carries out by the application thereof processes related to communication start function, connection accept thread creation, reception function, reception, transmission function, transmission, and the like as shown in FIG. 8. The connection accept thread 12 carries out processes related to socket creation, connection request wait, reception thread creation, notification to the application, and the like as shown in FIG. 8. In addition, the reception thread 13 carries out processes related to reception wait, notification to the application, and the like as shown in FIG. 8.

The main thread 21 of the client system carries out by the application thereof processes related to communication start function, socket creation, connection request, reception thread generation, reception function, reception, transmission function, transmission, and the like as shown in FIG. 8. In addition, the reception thread 23 carries out processes related to reception wait, notification to the application, and the like as shown in FIG. 8.

Therefore, this embodiment avoids data transfer from the transmitting end computer system to itself, and the means for simultaneously transmitting an operation command and change information to each computer system at the receiving end is provided in the communication interface. The operation command is related to an operation with respect to the three-dimensional object, and the change information indicates a change of the three-dimensional object generated by carrying out this operation with respect to the three-dimensional object. The change information includes an identification number of a selected part, a position coordinate of the part, or the like. It is possible to connect the server system and the client system, so that the communication interfaces carry out transmission processes in parallel by multi-threads as shown in FIG. 8.

Figure 9:
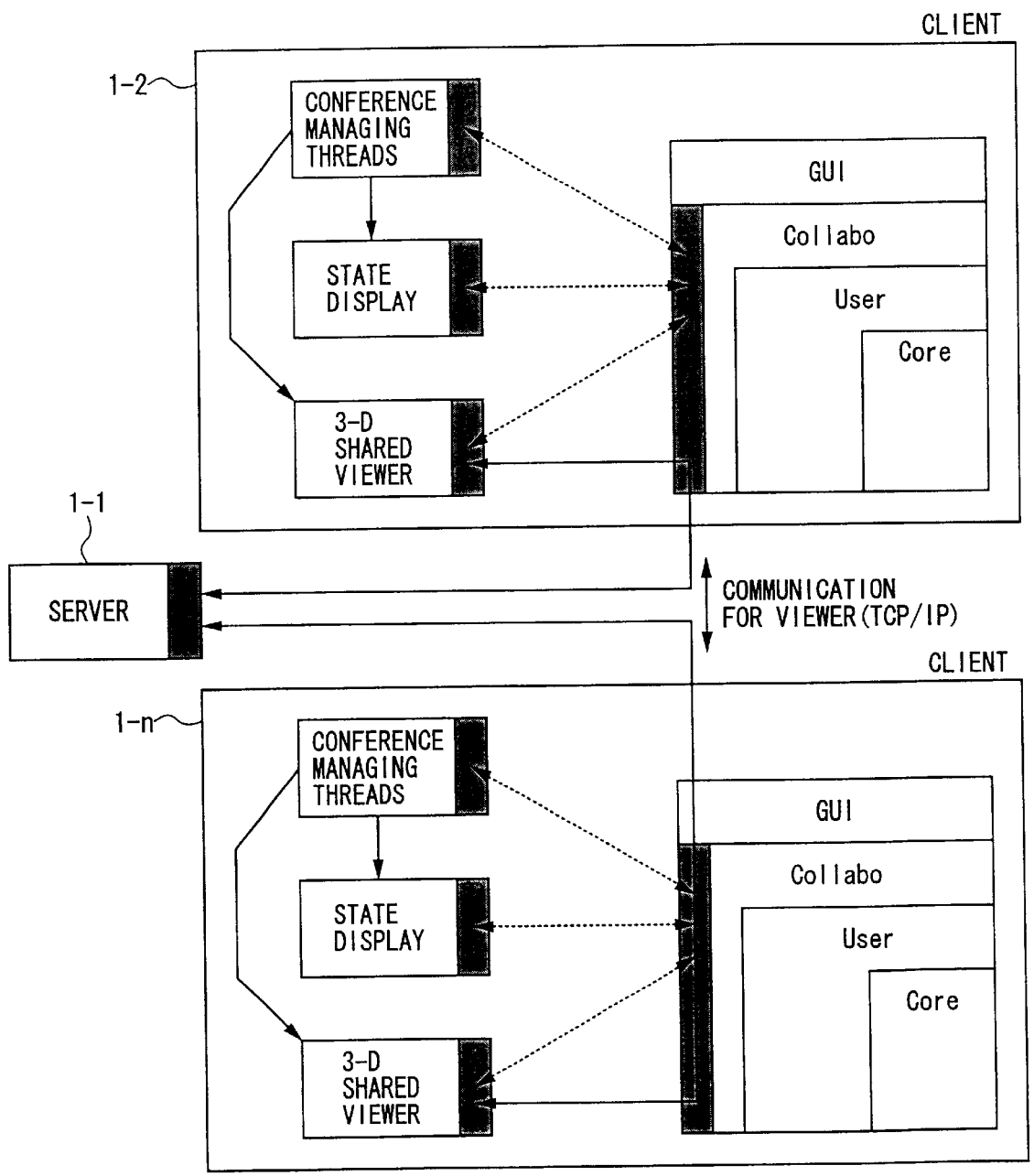
FIG. 9 is a diagram showing the connected state shown in FIG. 8 in a simplified manner.

When the connected state of the server system and the client system shown in FIG. 8 is shown in a simplified manner, the connected state becomes as shown in FIG. 9. In FIG. 9, those parts which are the same as those corresponding parts in FIGS. 7 and 8 are designated by the same reference numerals, and a description thereof will be omitted. After the connection of the client system to the server system is secured, the communication is carried out among the three-dimensional shared viewers of each of the client systems. The three-dimensional shared viewer and the three-dimensional object data are stored at each client system, and during this communication among the three-dimensional shared viewers, only the change information and the operation command of the three-dimensional shared viewers are exchanged, so that the operations of the three-dimensional shared viewers can be shared among the client systems.

During operation of this embodiment, a total of two applications, namely, the applications of the three-dimensional shared viewer and a notebook (memo), for example, are started at each of the client systems, and the three-dimensional shared viewers are shared and operated by each of the client systems. The notebook application can create necessary notes (memos) during the conference, by a local process at each client system. Even while such notes (memos) are being created at one client system, it is possible to confirm on the display of the one client system the state of the operations of the three-dimensional shared viewers carried out at the other client systems. In other words, it is possible to carry out a local operation at one client system while the three-dimensional shared viewers are shared among a plurality of client systems. In addition, even in a case where the window size and position, the individual tool bars and the like differ among the client systems, it is possible to positively confirm at each client system the state of the operations of the three-dimensional shared viewers carried out at one or more client systems.

Figure 10:
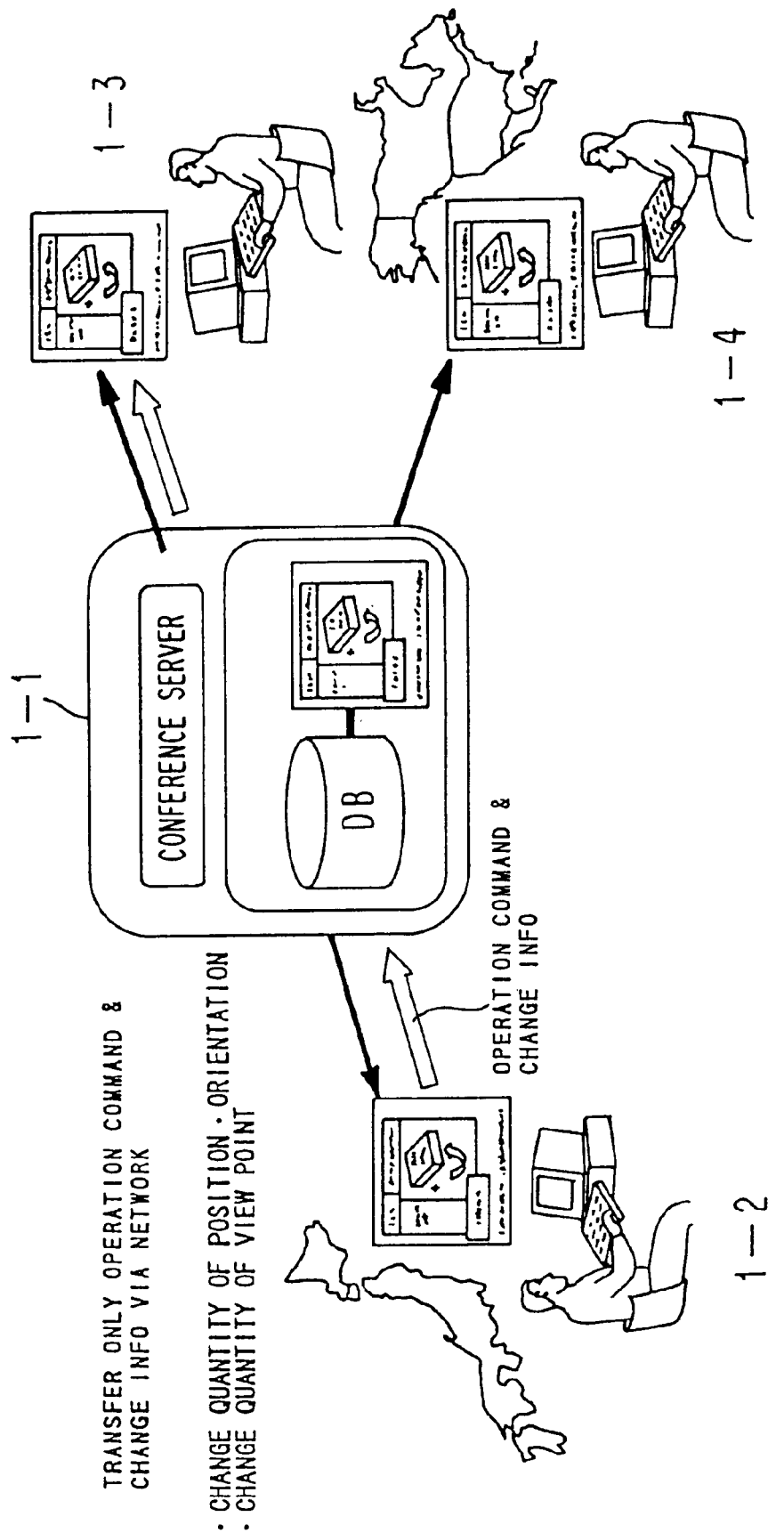
FIG. 10 is a diagram for explaining a three-dimensional viewer which operates as the client.
Figure 11:
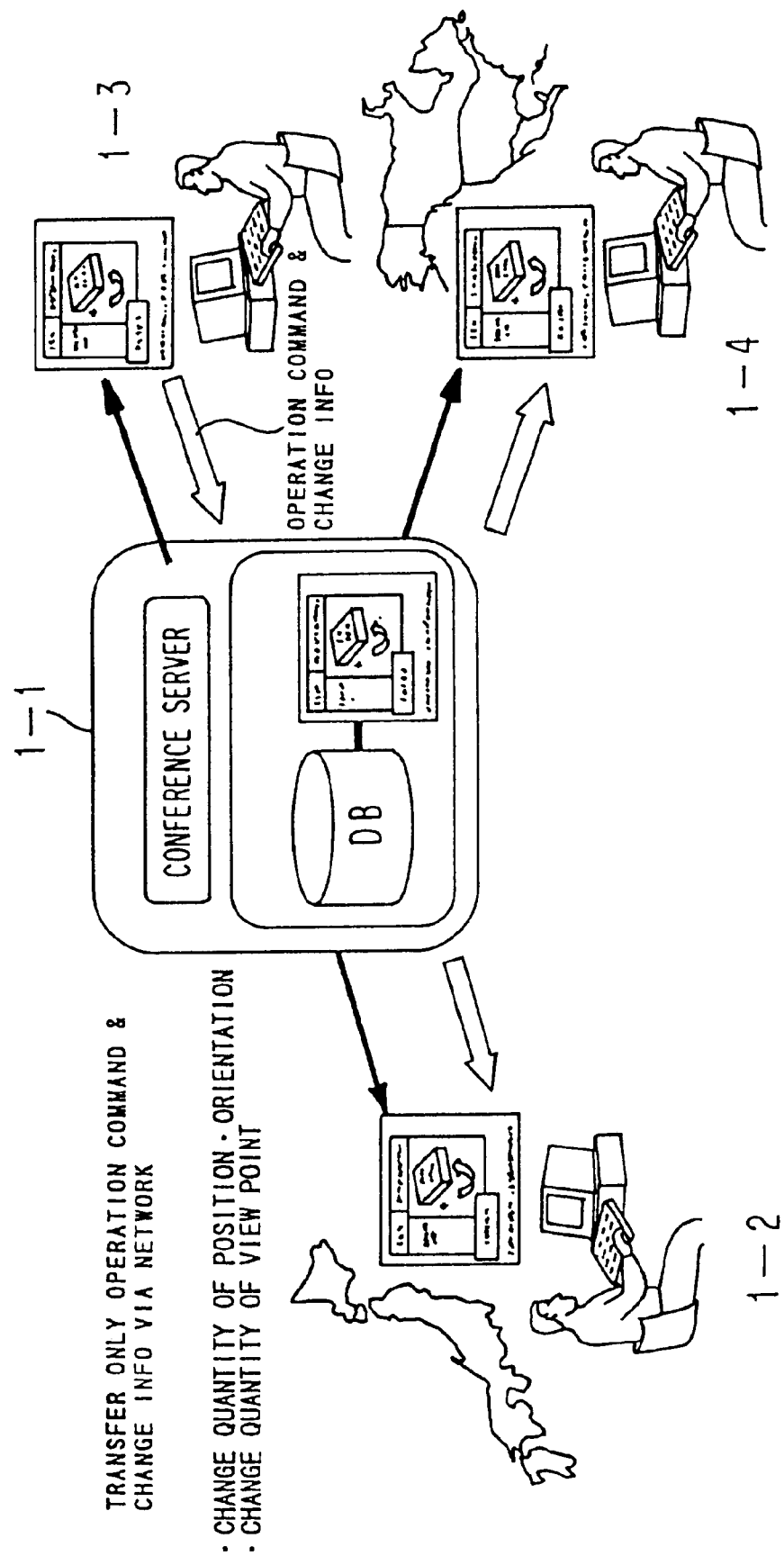
FIG. 11 is a diagram for explaining the three-dimensional viewer which operates as the client.

The three-dimensional shared viewer of one client system can share all operations thereof with the other client systems, by exchanging only the change information and the operation command of the three-dimensional shared viewer with the three-dimensional shared viewers of the other client systems via the communication interfaces. With respect to the three-dimensional shared viewers, no three-dimensional shared viewer server exists, and as shown in FIG. 10, three-dimensional shared viewer execution modules of all of the computer systems operate as the clients. FIG. 10 and FIG. 11 which will be described later, respectively are diagrams for explaining the three-dimensional shared viewer which operates as the client. In FIGS. 10 and 11, those parts which are the same as those corresponding parts in FIG. 1 are designated by the same reference numerals, and a description thereof will be omitted.

By switching the operation right, the client system which obtains the operation right becomes the transmitting end, and the other client systems become the receiving ends. In addition, a shared operation is carried out by exchanging only the change information and the operation commend between the transmitting end and the receiving ends. For example, when the client system 1-2 obtains the operation right and becomes the operator, the change information and the operation command from the client system 1-2 are transmitted to the other client systems 1-1, 1-3 and 1-4 as shown in FIG. 10.

Figure 12:
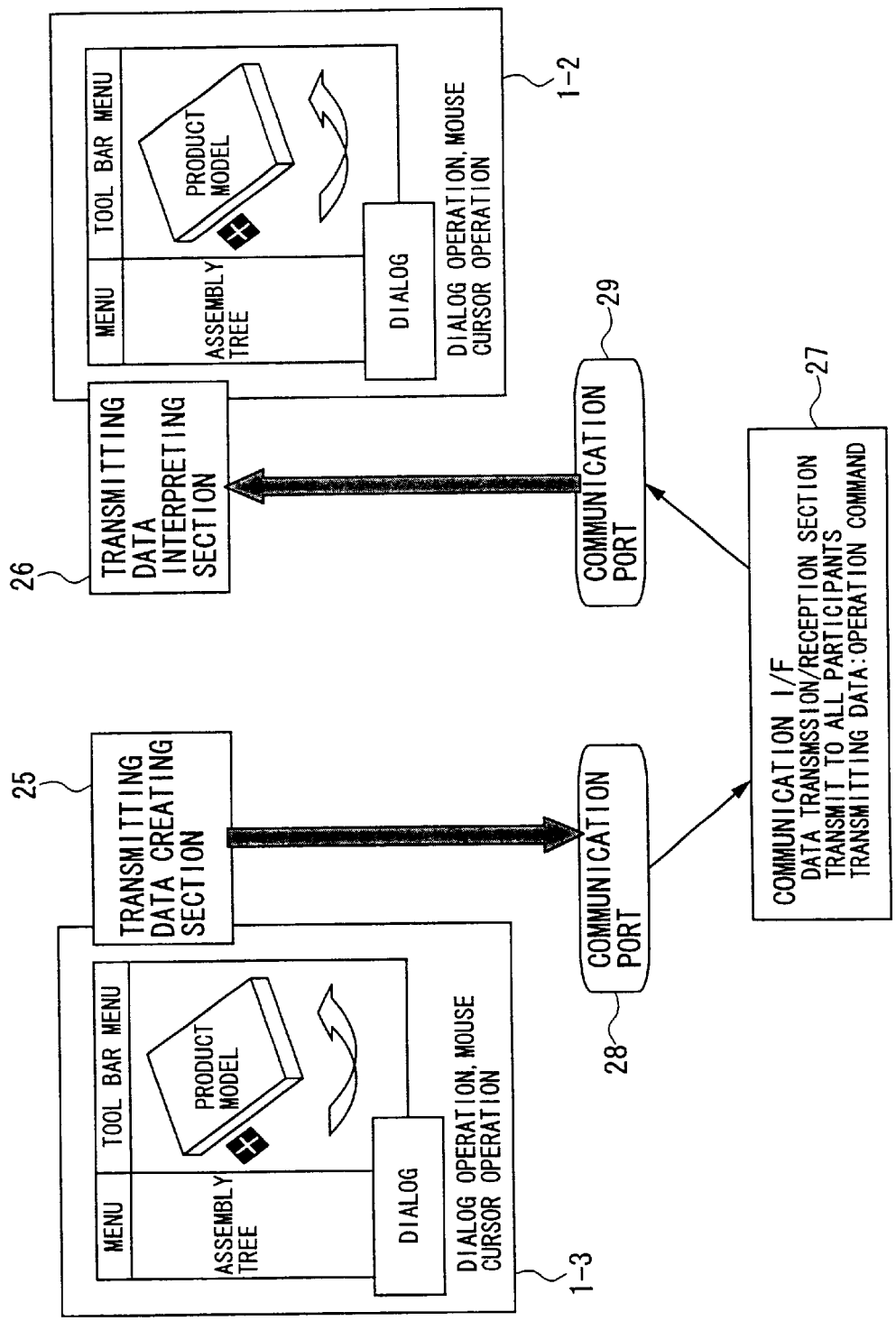
FIG. 12 is a diagram for explaining the sharing of operation commands.

In addition, when the client system 1-3 obtains the operation right and becomes the operator, the change information and the operation command from the client system 1-3 are transmitted to the other client systems 1-1, 1-2 and 1-4 as shown in FIG. 11. The switching between the transmitting end and the receiving end is judged using an operator flag within the three-dimensional shared viewer. As may be seen from FIG. 12, when the operation command and the change information are transmitted to the receiving end from a transmitting data creating sector 25 of the transmitting end, a transmitting data interpreting section 26 of the receiving end carries out a process dependent on the operation command and the change information, so as to enable the operation with respect to the three-dimensional object to be shared. FIG. 12 is a diagram for explaining the sharing of the operation commands. In FIG. 12, those parts which are the same as those corresponding parts in FIG. 1 are designated by the same reference numerals, and a description thereof will be omitted.

In FIG. 12, the transmitting data creating section 25 is provided in the transmitting end client system 1-3, and the received data interpreting section 26 is provided in the receiving end client system 1-2. The data from the transmitting data creating section 25 are output from a communication port 28 of the client system 13, and are supplied to a communication port 29 of the client system 1-2 via a communication interface 27, so that the data reaches the received data interpreting section 26.

The change information includes all information indicating the internal state of the three-dimensional shared viewer. Accordingly, the change information of the three-dimensional object relates, for example, to the identification number of the selected part, the position coordinates X, Y and Z in the case of moving the part, and the rotary angle about the X, Y and Z axes in the case of rotating the part. In addition, the change information may relate to the position of the view point, rotary angle, joint position in the case of a translation joint, joint rotary position in the case of a rotary joint, and the like.

Figure 13:
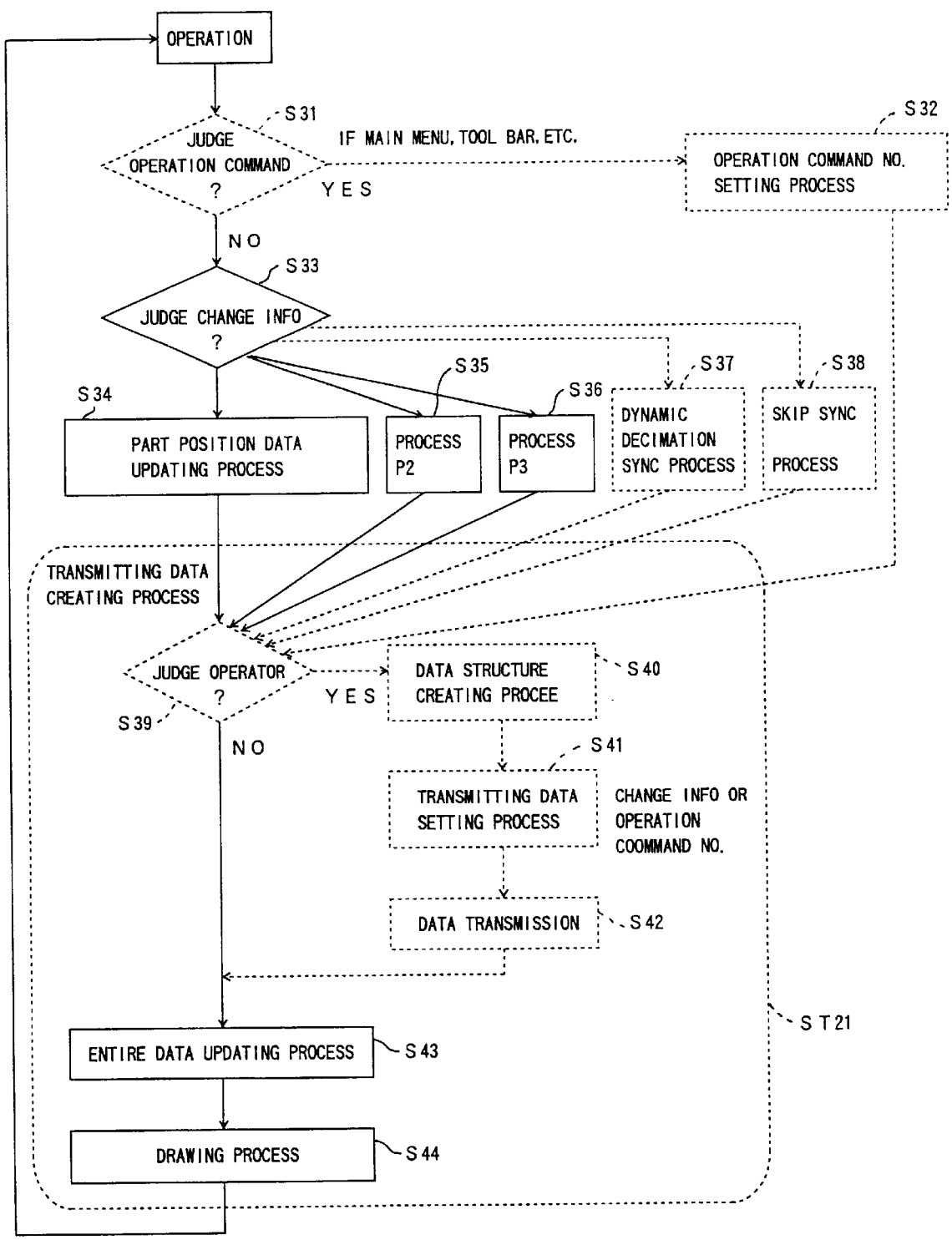
FIG. 13 is a flow chart for explaining the transmitting data creating process.

FIG. 13 is a flow chart for explaining the operation of the transmitting data creating section 25. In FIG. 13, when an operation is carried out with respect to the three-dimensional object in the transmitting end client system, a step S31 decides whether or not the operation command is with respect to the main menu, the tool bar or the like. If the decision result in the step S31 is YES, a step S32 carries out an operation command number setting process. After the step S32, the process advances to a step S39 of a transmitting data creating process ST21 which will be described later.

On the other hand, if the decision result in the step S31 is NO, no direct operation is carried out with respect to the three-dimensional object, and thus, a step S33 judges the kind of change information. The process of one of steps S34 through S38 is carried out depending on the kind of change information. The step S34 carries out an updating process P1 with respect to the part position data of the three-dimensional object. Similarly, the steps S35 and S36 respectively carry out updating processes P2 and P3 with respect to the part position data of the three-dimensional object. The step S37 carries out a dynamic decimation synchronizing process which will be described later, and the step S38 carries out a skip synchronizing process which will be described later. After the process of one of the steps S34 through S38 is carried out, the process advances to the transmitting data creating process ST21.

In the transmitting data creating process ST21, a step S39 transmits the operation command and the change information to the other client systems, and decides whether or not the operation carried out with respect to the three-dimensional object is to be reflected to the other client systems. In other words, the step S39 decides whether or not the operation carried out with respect to the three-dimensional object is made by the operator of the transmitting end client system. If the decision result in the step S39 is YES, a step S40 carries out a data structure creating process, and creates a data structure for the data related to the positions of each of the parts forming the three-dimensional object. In addition, a step S41 carries out a transmitting data setting process, and sets the change information with respect to the data structure and the operation command number to be transmitted. A step S42 transmits the set data, that is, the operation command number and the change information, to the receiving end client system via the network 2, for example.

After the step S42 or if the decision result in the step S39 is NO, a step S43 carries out an entire data updating process, so as to update the data related to the entire three-dimensional object depending on the operation carried out with respect to the three-dimensional object. A step S44 carries out a drawing process with respect to the data related to the updated three-dimensional object, so as to display the updated three-dimensional object on the display 102.

Figure 14:
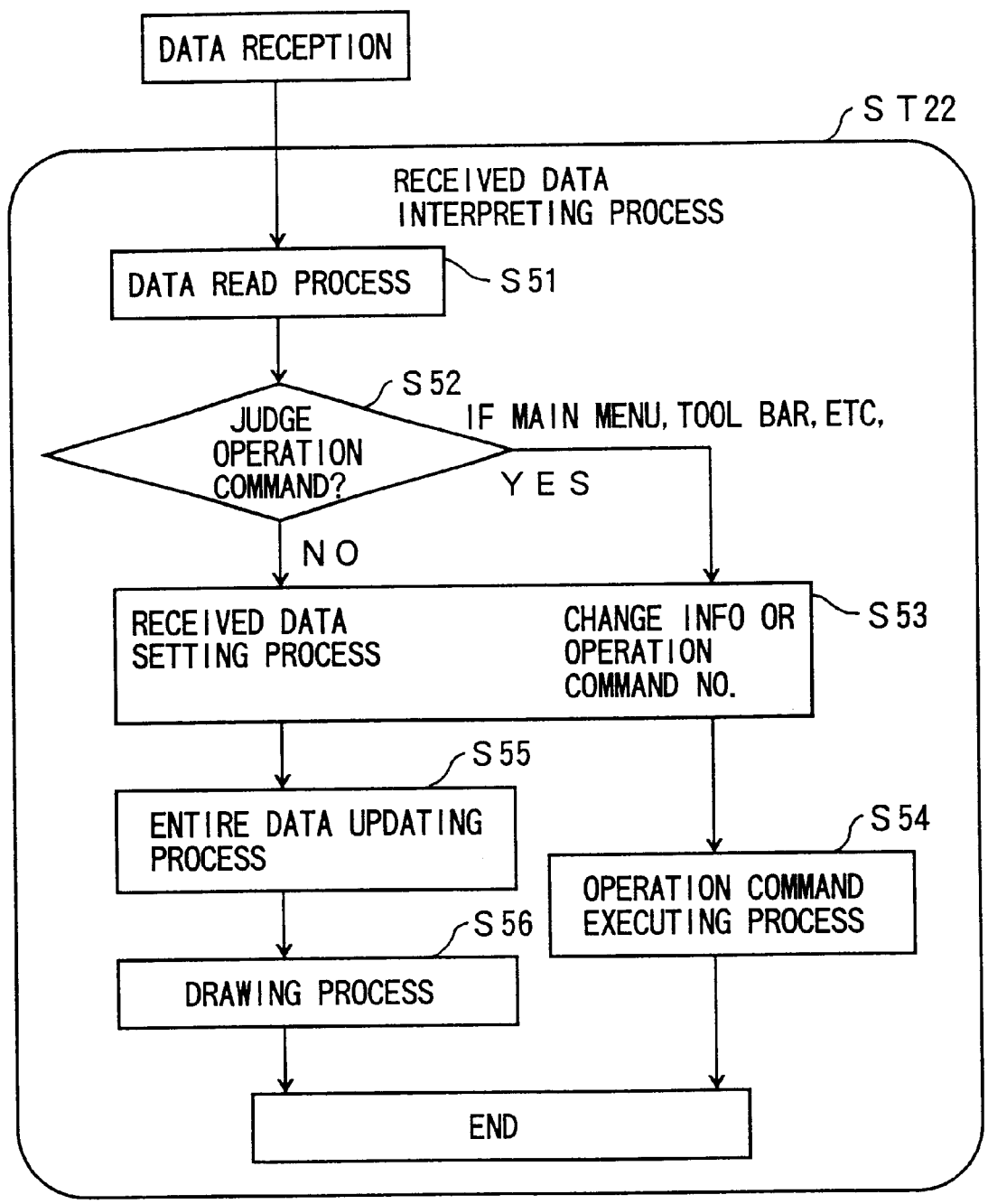
FIG. 14 is a flow chart for explaining the received data interpreting process.

FIG. 14 is a flow chart for explaining the operation of the received data interpreting section 26. When the receiving end client system receives the data from the transmitting end client system, a received data interpreting process ST22 is carried out. A step S51 carries out a data read process so as to read the data which is transmitted from the transmitting end client system. A step S52 decides whether or not the operation command is related to the main menu, the tool bar or the like, based on the read data. If the decision result in the step S52 is YES, a step S53 carries out an operation command number setting process, as a received data setting process. After the step S53, the process advances to a step S54 which carries out an operation command executing process, and the process ends. The operation command executing process executes the operation command corresponding to the set operation command number.

On the other hand, if the decision result in the step S52 is NO, a direct operation is carried out with respect to the three-dimensional object. Hence, in this case, a step S53 carries out a change information setting process, as the received data setting process. In this case, the process advances to a step S55 after the step S53. The step S55 carries out an entire data updating process, and updates the data related to the entire three-dimensional object depending on the operation carried out with respect to the three-dimensional object. In addition, a step S56 carries out a drawing process with respect to the data related to the updated three-dimensional object, so as to display the updated three-dimensional object on the display 102, and the process ends.

Accordingly, by providing in the receiving end the received data interpreting section corresponding to the operation command transmitted from the transmitting end, it becomes possible to share an arbitrary operation with respect to the three-dimensional object among the three-dimensional shared viewers. Hence, if corresponding operation commands and menus are created between two client systems, for example, it is possible to share the operation itself with respect to the three-dimensional object even between mutually different kinds of applications.

Next, a description will be given of the advantages of carrying out the data transmission of the step S42 in the transmitting end client system prior to the entire data updating process of the step S43 shown in FIG. 13 and the drawing process of the step S44, by referring to FIGS. 15 and 16.

FIG. 15 is a diagram for explaining the data transmission after the drawing process. Particularly in the case of a large scale product model or the like, the number of parts forming the model becomes large, and it takes time to carry out the entire data updating process and the drawing process. For this reason, when the data transmission is carried out after carrying out the entire data updating process and the drawing process at the transmitting end client system, it takes time until the entire data updating process and the drawing process are carried out at the receiving end client system, as may be seen from FIG. 15.

Figure 16:
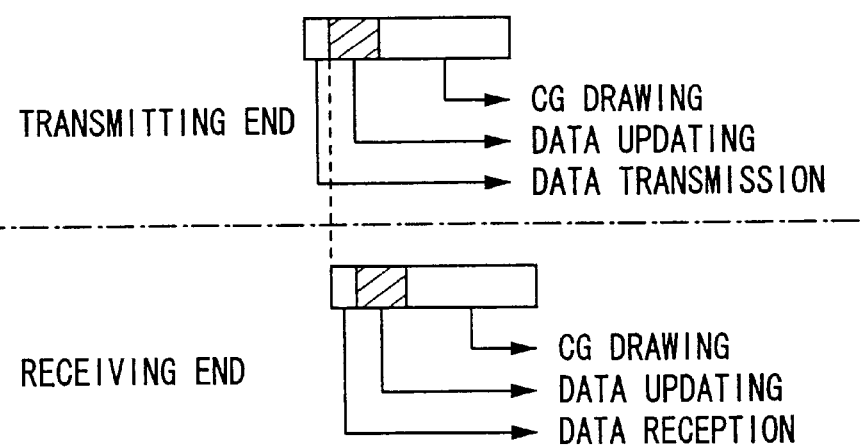
FIG. 16 is a diagram for explaining the data transmission prior to the drawing process.

FIG. 16 is a diagram for explaining the data transmission prior to the drawing process. Particularly in the case of a large scale product model or the like, the number of parts forming the model becomes large, and it takes time to carry out the entire data updating process and the drawing process. However, when the entire data updating process and the drawing process are carried out after carrying out the data transmission at the transmitting end client system, the time required for the entire data updating process and the drawing process to be carried out at the receiving end client system is short as compared to the case shown in FIG. 15, as may be seen from FIG. 16. Hence, a difference between the process execution times at the transmitting end and the receiving end can be made extremely small in this case.

In addition, when the size of the three-dimensional shared viewer is large, it takes time to open a file. In such a case, it is possible to reduce the difference between the process execution times at the transmitting end and the receiving end, by first transmitting a file name to the three-dimensional shared viewer of the receiving end client system immediately after the file is selected at the transmitting end client system. In this case, when the data transmission is carried out after the opening of the file ends at the transmitting end and the file is opened after receiving the data at the receiving end, it is possible to further reduce the time difference between the process execution times at the transmitting end and the receiving end.

Next, a description will be given of he data size of the data exchanged between the transmitting end client system and the receiving end client system. The data size may be fixed, but in this embodiment, the data size is changed depending on the needs, so as to reduce the data transfer load.

The data structure of the data exchanged between the transmitting end client system and the receiving end client system is set arbitrarily to a minimum by the data structure creating process of the step S40 shown in FIG. 13. For example, when selecting a part of the three-dimensional object, only one variable (int: 4 bytes) of the part number is transmitted. Even in the case of the part position information (X, Y, Z), it is possible to make the amount of information transmitted to an extremely small value on the order of twenty-four bytes (double: eight bytes x three (8×3)). In addition, in the case of the translation joint or the rotation of the three-dimensional object, only the joint value (double: eight bytes) is transmitted. Therefore, by varying the data size depending on the needs, it is possible to suppress the load of the data transfer on the network 2. By reducing the transfer data to the limit, it becomes possible to use this embodiment not only within the LAN, but also in a WAN environment which exceeds beyond a firewall (F/W).

Next, a description will be given of the efficient processing of the shared operation. In order to efficiently process the shared operation, this embodiment uses an OnCommand to capture in a batch the operation commands of the tool bar, the pop-up menu and the main menu which are used when carrying out an operation with respect to the three-dimensional object, and exchanges the operation commands by capturing an event ID of each operation command. In general, an application of a computer system which operates under an Operating System (OS) such as Windows (registered trademark), always notifies the control every time a process is carried out, processes a message map for an OnCommand entry, and passes within an OnCommand function which calls appropriate member functions. These member functions can be captured by the following functions of the application.

BOOLCmainFrame::OnCommand(WPARAMwParam, LPARAM1Param)
BOOLCSMRView::OnCommand(WPARAMwParam, LPARAM1Param)
BOOLCSmrTreeView::OnCommand(WPARAMwParam,LPARAM1Param)

An example of CmainFrame::OnCommand is shown in FIG. 17. FIG. 17 is a diagram showing the command process of the transmitting end client system, and CDMRView::OnCommand and the like are carried out similarly thereto. In addition, FIG. 18 is a diagram showing the receiving process of the receiving end client system. FIG. 19 is a diagram showing the command process of the receiving end client system, which is included within the command process of the application.

In the case of the transmitting end, that is, the operator, the command process shown in FIG. 17 includes a step of securing the data structure for the command, a step of setting a command of MAINFRAME, a step of setting parameters of the command to be executed, and a step of transmitting the command. This command process carries out the process of the transmitting end itself, that is, the process of the operator himself.

The receiving process shown in FIG. 18 includes a step of reading the received data, and a step of executing the command process, in the case of IFVPS_ONCOMMAND.

The command process shown in FIG. 19 is divided into different cases depending on the kind of command (kind), and includes a step of sending a message to the MAINFRAME and executing the process in the case of IFVPS_MAINFRAME, and a step of sending a message to VIEW and executing the process in the case of IFVPS_VIEW.

In the command process, the process of the client system itself can be carried out within the OnCommand. For this reason, it is also possible to carry out the menu operation at the receiving end client system, and there is a possibility of an error being generated between the operations of the transmitting end and the receiving end. In order to prevent such an error between the operations, a process of prohibiting the menu operation at the receiving end is added to the processes shown in FIGS. 17 and 18.

FIG. 20 is a diagram showing the command process of the transmitting end client system, including the process of prohibiting the menu operation at the receiving end. In addition, FIG. 21 is a diagram showing the receiving process of the receiving end client system, including the process of prohibiting the menu operation at the receiving end. In this case, a command which does not output a dialog or the like and processes only the result at the receiving end, is not sent.

The command process shown in FIG. 20 includes a step which is carried out in the case of the transmitting end, that is, the operator, a step which is carried out in the case of the receiving end, a step which is carried out when notified of a command which is being executed, and a step which executes a command only by itself and escapes from the function. The step which is carried out in the case of the operator, includes a step of executing the command only by itself and escaping from the function in the case of the command which is not to be sent so as not to open a file chooser since the command is not sent, a step of securing the data structure for the command, a step of setting parameters of the command which is to be executed, and a step of sending the command. The step which is carried out in the case of the receiving end, includes a step of executing the command by itself in the case of a menu which can be executed at the receiving end, and a step of escaping from the function so as to prohibit an operation by someone other than the operator. The step which is which is carried out when notified of the command which is being executed, includes a step of executing the same command also at the receiving end.

The receiving process shown in FIG. 21 is divided into different cases depending on the kind of commands (usKind), and includes a step of reading the data in the case of IFVPS_ONCOMMAND, a step of saving a flag, a step of notifying the flag during execution of the command, a step of carrying out the process of the command, and a step of returning the saved flag.

In the command process shown in FIG, 17, the operation of the dialog is shared by a generalized function. More particularly, an existing function of the dialog is generalized by one generalized function having an argument, so as to carry out processes depending on the kinds of the operation commands.

Since the operation command is shared among the client systems in this embodiment, only the executed result of the operation is processed at the receiving end client system. However, this would not enable the receiving end client system to open the main menu or the pop-up menu or move the mouse cursor on the menu. Hence, in this embodiment, a dummy window is displayed on the real menu at the receiving end client system, and the mouse cursor is movable on the dummy window. As a result, the dummy menu corresponding to the main menu, the pop-up menu and the like of the transmitting end client system is displayed at the receiving end client system, and the same cursor movement as the transmitting end is realized on the dummy menu at the receiving end. Therefore, it is possible to improve the feeling of sharing the operations between the receiving end and the transmitting end.

In this embodiment, the event ID of the operation command is captured and exchanged with respect to the main menu, the pop-up menu, the tool bar and the like, so as to share the commands executed among the client systems. However, the sizes of most dialogs normally are the same. Hence, it is possible to share the commands as described above if the sizes of the dialogs differ, and to share the mouse event with respect to the operation on the dialog if the sizes of the dialogs are the same. In this case, the mouse event indicates the position of the mouse, and the state of the mouse such as push-up, push-down and move. Differences in the image resolutions among the client systems can be absorbed by carrying out a normalization process.

When sharing the mouse event, if the mouse event is issued in the OS level, the mouse cursor at the receiving end client system is forcibly moved depending on the operation at the transmitting end client system. In such a case, it becomes impossible to carry out a local and independent operation at the receiving end client system while the three-dimensional object is shared among a plurality of client systems. Hence, it is desirable from the point of view of enabling a local operation that the mouse event is issued in the application level, and not in the OS level.

Next, a description will be given of a case where a file operation is carried out with respect to the three-dimensional object data in a separate directory simultaneously within the client systems at each of the local sites.

At each local site, if the client system itself opens the file of the data such as shape data and assembly data of the three-dimensional object, the operation is inefficient in that similar operations are carried out a plurality of times. In addition, the storage location of the data of the three-dimensional shared viewer may be different at each of the local sites. Particularly when treating a large scale product model, the data of the three-dimensional shared viewer may be stored at a storage location different from those of other data, such as when there is insufficient storage capacity in the hard disk drive unit of the client system or when the data of the three-dimensional shared viewer needs to be clearly distinguished from other data. Accordingly, in this embodiment, a file name is obtained from the file chooser which is opened by the operator of the transmitting end client system and sent, and at each receiving end client system, the received file name is switched to a preset data directory, and the file operation such as reading, storing, switching parts and adding parts is carried out simultaneously.

FIG. 22 is a diagram for explaining the special file operation (or network file operation). It is assumed for the sake of convenience that the operator stores the data in a drive "D:¥users¥Data¥ModelA.asy", and the user 1 at the receiving end stores the data in a drive "F:¥users¥Viewer¥ModelA.asy" which is different from that used by the operator.

In FIG. 22, the process in the client system of the operator includes a step of selecting and opening "D:¥users¥Data¥ModelA.asy", and a step of obtaining and sending "ModelA.asy". On the other hand, the process in the client system of the user 1 includes a step of receiving "ModelA.asy", a step of obtaining information of a preset data directory, and a step of combining the received "ModelA.asy" and the obtained information to open "F:¥users¥Viewer¥ModelA.asy". The processes in the client systems of the users 2 are carried out similarly as in the client system of the user 1.

Figure 23:
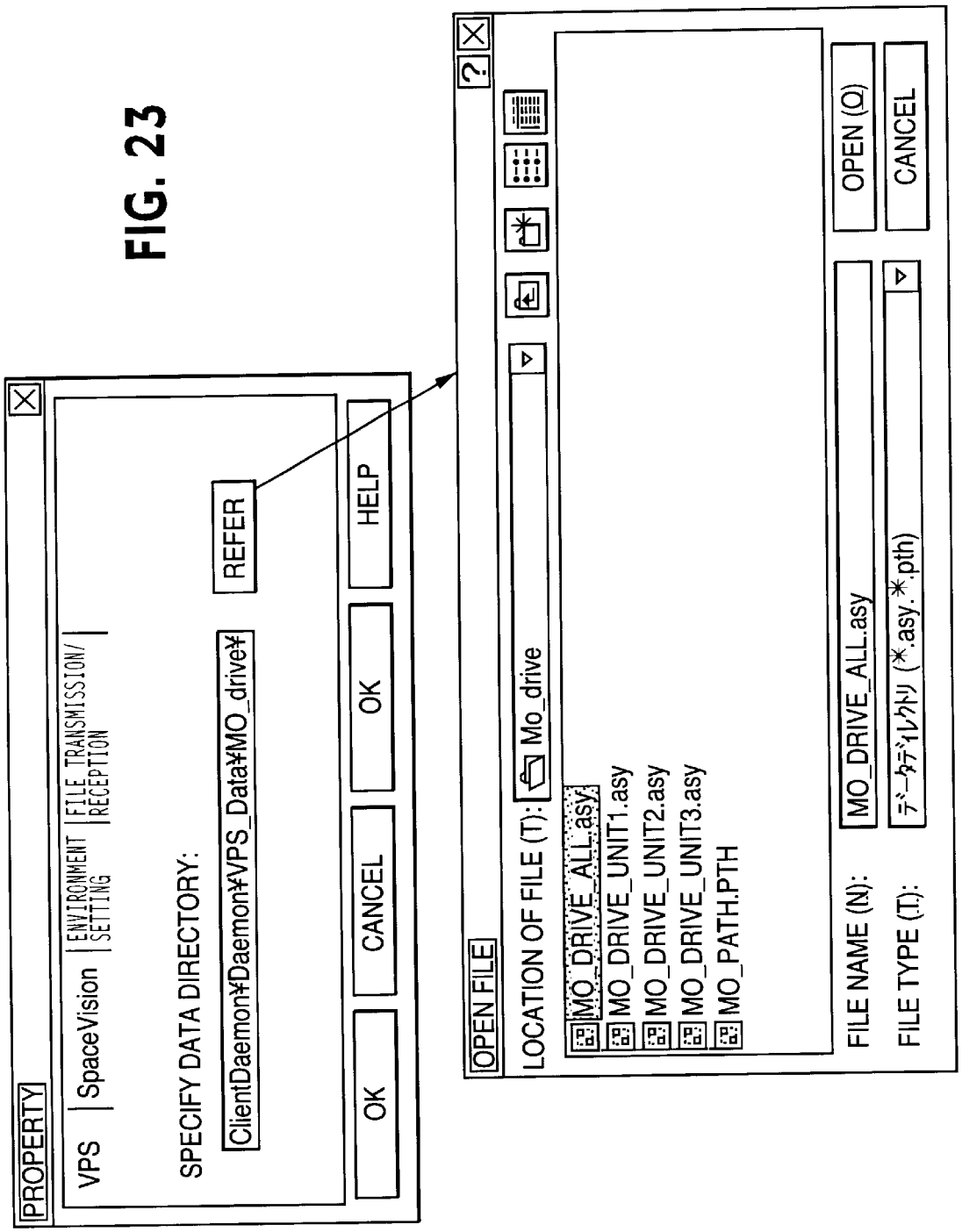
FIG. 23 is a diagram for explaining the directory setting.

Next, a description will be given of the process of presetting the data directory. After receiving the data, each user can select and specify the three-dimensional shared viewer data directory path from the file chooser, by pushing a "refer" button for the property setting of "Collabo_daemon" corresponding to the step ST12 shown in FIG. 5. FIG. 23 is a diagram for explaining the directory setting.

In the case of the user 1, for example, when the above described operation is carried out in "F:¥users¥Viewer¥ModelA.asy", "Collabo_daemon" automatically records "F:¥users¥Viewer¥" as the data directory of the three-dimensional shared viewer in registry information of the user making the log-in.

FIG. 24 is a diagram for explaining a directory selecting process. As shown in FIG. 24, when the data of the three-dimensional shared viewer is selected, the directory selecting process includes a step of obtaining the directory of the file chooser, and a step of recording the registry information.

After the three-dimensional shared viewer is started, the registry information is read, and the data is read from the directory within the registry information. In addition, when the data directory path is set as a storage location for the received file, it is possible to immediately read the data of the file which is modified and sent during the conference. The following operation formats (1) through (3) are possible for the data directory.

(1) According to a first operation format, it is assumed that the shape data of the three-dimensional object are sent to each of the participants of the conference, that is, the client system of each of the users, and after connecting the systems by "Collabo_daemon", the three-dimensional shared viewer directory path is changed by the property. If the target data directories differ, the three-dimensional shared viewer directory path is changed.

(2) According to a second operation format, "F:¥users¥Viewer¥" which is once set is assumed to be the data directory of "tmp", and all three-dimensional shared viewer data "ModelA.asy", "ModelB.asy", "ModelC.asy" and the like are input. When loading the assembly from the three-dimensional shared viewer, only the assembly is displayed, and thus, the target data can easily be selected.

(3) According to a third operation format, the directories are stored by adding directory names such as "users¥MO_DRIVE2" and "users¥ENGINE" thereto, and before the conference, the directory names are changed, for example, by changing the directory name "users¥ENGINE" to "users¥Viewer". In this state, the three-dimensional shared viewer directory path of the property of "Collabo_daemon" may be the same setting as before.

Next, a description will be given of a special file open, by referring to FIGS. 25 through 28. FIG. 25 is a diagram for explaining an opening file selecting process of the special file open, and FIG. 26 is a diagram for explaining a file open process of the special file open. In addition, FIG. 27 is a diagram for explaining a command executing process of the special file open, and FIG. 28 is a diagram for explaining a receiving process of the special file open.

The opening file selecting process shown in FIG. 25 is carried out by pushing an "open" button on the menu shown in FIG. 23, for example. The opening file selecting process includes a step of regarding the user as the operator if the user does not have the right of operation (hereinafter referred to as the operation right) as long as the operation right is not locked, a step of opening the file chooser, and a step of setting the data directory path of the registry.

The file open process shown in FIG. 26 is carried out by selecting a file by opening the file chooser. The file open process includes a step of acquiring the directory such as the directory "D:¥users¥Data¥ModelA.asy" and the file name, a step of acquiring the file name such as the file name "ModelA.asy" excluding the directory portion in the case of the operator, and a step of carrying out a read process.

The command executing process shown in FIG. 27 is carried out to avoid the operation of the same "open" button from being repeated a plurality of times at the receiving end, and to avoid opening of the file chooser at the receiving end. The command executing process.includes a step which is carried out in the case of the operator, a step which is carried out in the case of the receiving end, a step of executing the same command also at the receiving end when notified that the command is being executed, and a step of executing the command only by itself and escaping from the function. The step which is carried out in the case of the operator includes a step of executing the command only by itself and escaping from the function in the case of the command which is not to be sent so as not to open the file chooser because the command is not sent, and a step of sending the command in the case of the command which is to be sent. In addition, the step which is carried out in the case of the receiving end includes a step of executing the command in the case of the command which can be executed at the receiving end, and a step of escaping from the function so as to prohibit operation by someone other than the operator.

The receiving process shown in FIG. 28 includes a step of setting the received file name such as "ModelA.asy" upon receipt of an operation command indicating that the "open" button is pushed, a step of setting the read function of the registry information and the data directory path of the registry such as "F:¥users¥Viewer¥", a step of carrying out a process to create the directory path such as "F:¥users¥Viewer¥ModelA.asy" and the file name, and a step of carrying out the file opening process from the set directory.

Next, a description will be given of a general another name store, which disables overwrite store and carries out another name store, in order to prevent overwriting on an important file, by referring to FIGS. 29 through 32.

FIG. 29 is a diagram for explaining the another name store process of the general another name store. The another name store process shown in FIG. 29 is carried out when the file chooser is opened and the file name is input. The another name store process includes a step of opening the file chooser, a step of acquiring the file name excluding the directory portion and sending an another name store command and the file name in the case of the operator, and a step of storing the assembly data in itself.

FIG. 30 is a diagram for explaining a modification of the another name store process. In order to avoid the same "another name store" operation from being carried out repeatedly at the receiving end and avoid opening of the file chooser at the receiving end, the process is modified as shown in FIG. 30, similarly to the case shown in FIG. 27. More particularly, the another name store process is made to include a step which is carried out in the case of the operator, and a step which is carried out in the case of the receiving end. The step which is carried out in the case of the operator includes a step of executing the command only by itself and escaping from the function in the case of the command which is not to be sent, so as not to open the file chooser since the command is not sent. On the other hand, the step which is carried out in the case of the receiving end includes a step which executes the command in the case of the command which can be executed at the receiving end, and a step of escaping from the function so as to prohibit the operation by someone other than the operator.

FIG. 31 is a diagram for explaining the receiving process of the general another name store. In addition, FIG. 32 is a diagram for explaining the another name store process.

The receiving process shown in FIG. 31 includes a step of setting the received file name such as "ModelB.asy" upon receipt of the operation command indicating that the "another name store" button is pushed, a step of obtaining the data directory path of the registry such as "F:¥users¥Viewer¥" which is set since the file is already open, a step of carrying out the process of creating the directory path such as "F:¥users¥Viewer¥ModelB.asy" and the file name, and a step of carrying out the another name store process.

The another name store process shown in FIG. 32 is divided into different cases depending on the kind of command (command), and includes a step of storing the file by the set directory and the file name in the case of ID_FILE_SAVE_AS.

Next, a description will be given of a linking function to conference management, by referring to FIGS. 33 and 34. FIG. 33 is a diagram for explaining a conference state notifying process, and FIG. 34 is a diagram for explaining a reset process.

Operations to be linked among the three-dimensional shared viewers and the conference management of the system are notified to the three-dimensional shared viewers via the communication interfaces. The function shown in FIG. 33 is passed when making this notification, and thus, the process of the three-dimensional shared viewer is divided into different cases and carried out.

The conference state notifying process shown in FIG. 33 includes a step of dividing into different cases by "iChangeIng" and carrying out a reset process in the case of a reset and the operator, a step of obtaining the operation right in the case of a conference end and the chairman, a step of carrying out the another name store process, and a step of closing the three-dimensional shared viewer. A description of the processes carried out for other cases will be omitted.

Tool bars for the operation right, operation right, reset and the like are on the three-dimensional shared viewer, and the reset process is carried out by selecting the tool bar for the reset. The reset process can only be selected by the operator who has the operation right. When the operator selects the reset process, the file which was opened before is read again by the client system itself which is being operated by the operator, so as to assume the initial state.

The reset process shown in FIG. 34 includes a step of moving to the directory having the file which was opened before if the user has the operation right and the file name is not blank, a step of creating the directory and the file name which was opened before, and a step of reading the file which was opened before again by the client system itself which is being operated by the operator and sending the file name and the command for opening the file. The three-dimensional shared viewers of the other receiving end client systems open the same file as that opened by the operator, similarly as in the case of the file open process described above.

When the chairman executes "conference end" by the conference management of the system, an inquiry is made to determine whether or not "another name store" is to be carried out, and the three-dimensional shared viewer is closed after carrying out the another name store process if the another name store is selected. On the other hand, in the case of a general participant other than the chairman, the three-dimensional shared viewer is closed without carrying out the another name store process. In this state, the file is stored only at the client system of the chairman. In the case of the file which is to be used in the next conference, it is necessary to separately send the file, so as to avoid a situation where the operator forgets to store the final state. Depending on the nature of the conference, it may be unnecessary to store the final state, and in such a case, the another name store process may be cancelled. If it is necessary to store the file at other client systems in order to use the file in the next conference, the operator carries out the another name store process before the conference ends, so that the file is stored at each of the client systems and it is unnecessary to separately send the file.

Next, a description will be given of a fixed decimation synchronizing process which enables smooth movement of the mouse cursor, by carrying out a decimation process at the transmitting end and carrying out an interpolation process at the receiving end.

When the use of the system under the WAN environment is taken into consideration, the communication efficiency deteriorates due to SOCKS which is used to pass the firewall and the passing of the WAN line. In the case of the TCP communication having a high reliability in the WAN, the movement of the mouse cursor of the three-dimensional shared viewer becomes intermittent, and a smooth continuous movement of the mouse cursor cannot be realized. Hence, with respect to the mouse cursor moving part which is frequently passed within the application, the decimation process is carried out at the transmitting end and the interpolation process is carried out at the receiving end. The transmitting end carries out a time-based decimation process in order to reduce the data transmission quantity and the number of transmissions, by transmitting the data of the mouse position for every predetermined time. On the other hand, the receiving end carries out an interpolation process by moving the mouse cursor for every predetermined time, so as to smoothly move the mouse cursor.

The response to the mouse cursor movement at the receiving end is as follows under the LAN environment when no decimation and interpolation processes are carried out. In other words, in the case of the TCP, the movement of the mouse cursor becomes slow and intermittent, but it is possible to use the SOCKS to enable use of the system under the WAN environment which exceeds the firewall. In addition, in the case of the UDP, the movement of the mouse cursor is smooth, however, it is impossible to make the UDP communication by exceeding the firewall, thereby not enabling use of the system under the WAN environment.

On the other hand, by following states are obtained depending on the combination, by changing the decimation time at the transmitting end and the interpolation time at the receiving end.

The mouse cursor frequently appears stationary;

The mouse cursor sometimes appears stationary;

The movement of the mouse cursor becomes smooth; and

The movement of the mouse cursor becomes linear and unnatural or uncomfortable to the user.

According to the experiments conducted by the present inventors, in order to tune the system for use under the WAN environment so that the mouse cursor movement becomes smooth, it was found desirable to set the decimation time at the transmitting end to every 200 ms, for example, and to set the interpolation time to every 20 ms, for example.

Next, a description will be given of a process of smoothly moving the mouse cursor by buffering the received data.

When no buffering of the received data is made, the mouse cursor frequently appears stationary. In addition, when the mouse is moved continuously, the mouse cursor movement successively falls behind. On the other hand, when the buffering of the received data is made by use of the memory part 202 shown in FIG. 3 or the like, the inconsistency in the data reception times is absorbed by the buffering, thereby making the mouse cursor movement smooth. Hence, it is possible to smoothly move the mouse cursor by buffering the data related to the mouse movement and moving the mouse cursor based on the data after holding the data for a certain time. According to the experiments conducted by the present inventors, it was found desirable to set the data buffering time at the receiving end in a range of 400 to 600 ms, for example.

Next, a description will be given of a dynamic decimation synchronizing process which is carried out in the step S27 shown in FIG. 13. The dynamic decimation synchronizing process is carried out to smoothly draw the three-dimensional object which is shared among the remote locations naturally and in synchronism.

When the three-dimensional shared viewer is shared among computer systems having different graphic performances, the drawing process of the computer system having a low performance falls behind compared to the other computer systems. Hence, in order to smoothly share the three-dimensional shared viewer among the computer systems having the differences in the graphic performances, the dynamic decimation synchronizing process measures the drawing time of each computer system in advance when carrying out a continuous operation such as moving the part, rotating the part, moving the view point and rotating the view point. In addition, a decimation number dependent on the difference between the graphic performances is calculated based on the measured drawing times, and the receiving end computer system draws the three-dimensional object by carrying out a decimation based on the calculated decimation number.

Figure 35:
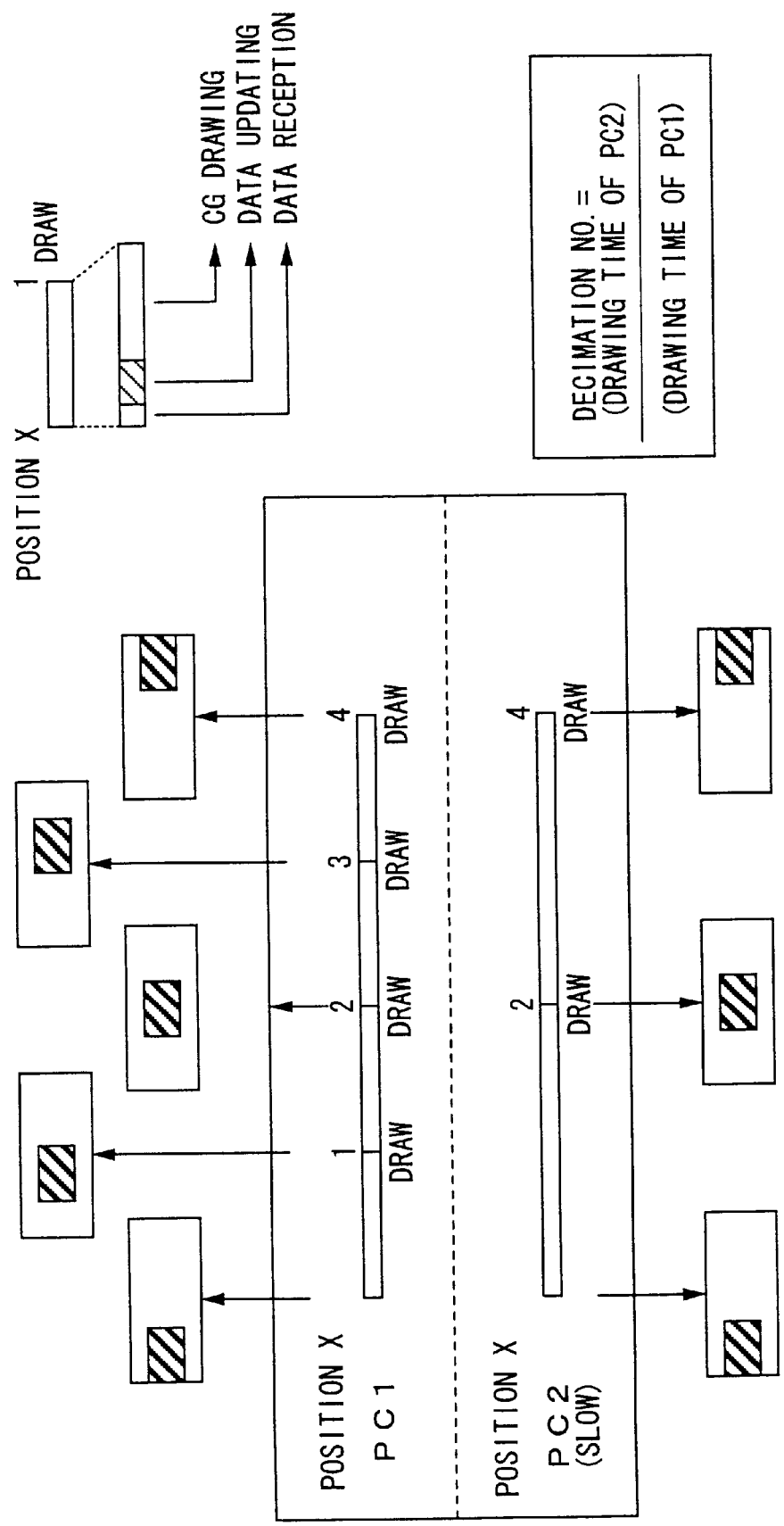
FIG. 35 is a diagram for explaining the operating principle of the dynamic decimation synchronizing process.

FIG. 35 is a diagram for explaining the operating principle of the dynamic decimation synchronizing process. In FIG. 35, a rectangle with the hatching schematically shows the three-dimensional object which is displayed on the display screen, and PC1 and PC2 respective denote computer systems. The graphic performance of the computer system PC1 is higher than that of the computer system PC2. Hence, in the particular case shown in FIG. 35, the computer system PC2 can only carry out the drawing process three times while the computer system PC1 carries out the drawing process five times. Hence, by decimating two drawing processes of the computer system PC2, it becomes possible to smoothly share the three-dimensional object between the computer system PC1 which is installed with a high-performance graphic board, for example, and the computer system PC2 which is not installed with such a high-performance graphic board. When the drawing time of the computer system PC2 having the low graphic performance is denoted by T2 and the drawing time of the computer system PC1 having the high graphic performance is denoted by T1, the drawing process of the computer system PC2 simply needs to be decimated by a decimation number indicated by T2/T1. The measurement of the drawing time will be described later in conjunction with FIG. 36.

Most of the basic functions for moving the part, rotating the part and the like by the three-dimensional shared viewer are differential drive types using the moving quantity.

However, when the dynamic decimation synchronizing process is carried out with respect to the difference data, an error is generated in the final states among the client systems. For this reason, it is necessary to convert the difference data into position and orientation information before being sent. For example, if the command such as MovePos is differential drive ($\Delta X$), it is necessary to correct the command into position drive ($X=Xpre+\Delta X$). Hence, the dynamic decimation synchronizing process is realized by analyzing the process within the dialog for rotating the part, for example, sending the position and orientation information after the differential drive, and carrying out the differential drive at the receiving end to the position indicated by the position and orientation information.

According to the fixed decimation synchronizing process described above, the decimation process is carried out at the transmitting end for every predetermined time regardless of the graphic performance of each of the client systems. On the other hand, according to the dynamic decimation synchronizing process, the decimation process is carried out with respect to the client system.having the low graphic performance, but no decimation process is carried out with respect to the client system having the high graphic performance, so that the performance of the client system having the high graphic performance can be fully utilized.

Figure 36:
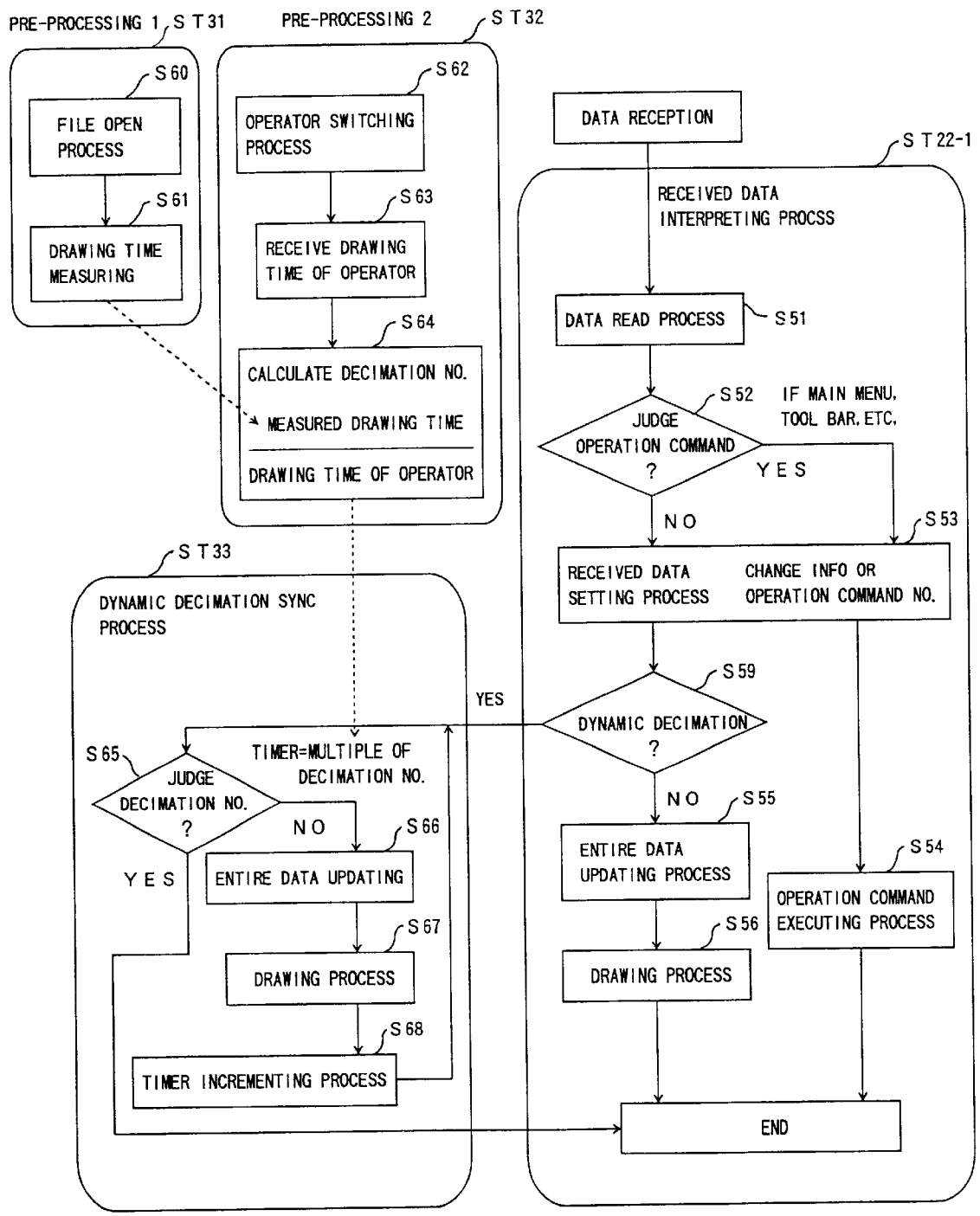
FIG. 36 is a flow chart for explaining the receiving end process of the dynamic decimation synchronizing process.

FIG. 36 is a flow chart for explaining the receiving end process of the dynamic decimation synchronizing process. In FIG. 36, those steps which are the same as those corresponding steps in FIG. 14 are designated by the same reference numerals, and a description thereof will be omitted. The transmitting end process is basically the same as the process shown in FIG. 13, and description and illustration thereof will be omitted.

In FIG. 36, a step ST31 carries out a pre-processing 1 which includes steps S60 and S61, and a step ST32 carries out a pre-processing 2 which includes steps S62 through S64.

The step S60 carries out a file open process, and the step S61 carries out a drawing time measuring process. For example, the drawing time measuring process measures the drawing time of the receiving end client system at the time of changing the part, adding the part, additionally reading, and newly reading when the number of polygons to be finally drawn changes. The measured result may include an error on the order of 0.1 second or less, for example, but this error may be absorbed by carrying out the drawing process a plurality of times and obtaining an average value of the drawing times.

The step S62 carries out an operator switching process, and the step S63 receives the drawing time of the client system of the operator who newly obtained the operation right. The step S64 obtains the decimation number by carrying out a decimation number calculating process, based on the drawing time which is obtained by the drawing time measuring process and the received drawing time of the operator.

In a received data interpreting process of a step ST22-1, a step S59 decides whether or not to carry out a dynamic decimation, after the step S53. The process advances to the step S55 if the decision result in the step S59 is NO. On the other hand, if the decision result in the step S59 is YES, the process advances to a dynamic decimation synchronizing process of a step ST33. The step ST33 includes steps S65 through S68.

The step S65 decides whether or not a decimation number measured by an internal timer of the CPU 201 reached the decimation number obtained by the step S64. The process ends if the decision result in the step S65 is YES. On the other hand, if the decision result in the step S65 is NO, a decimation process is carried out, and the steps S66 and S67 respectively carry out an entire data updating process and a drawing process, similarly to the step S55 and S56. In addition, the step S68 carries out a timer incrementing process so as to increment the measured value of the internal timer by one, and the process returns to the step S65.

Figure 37:
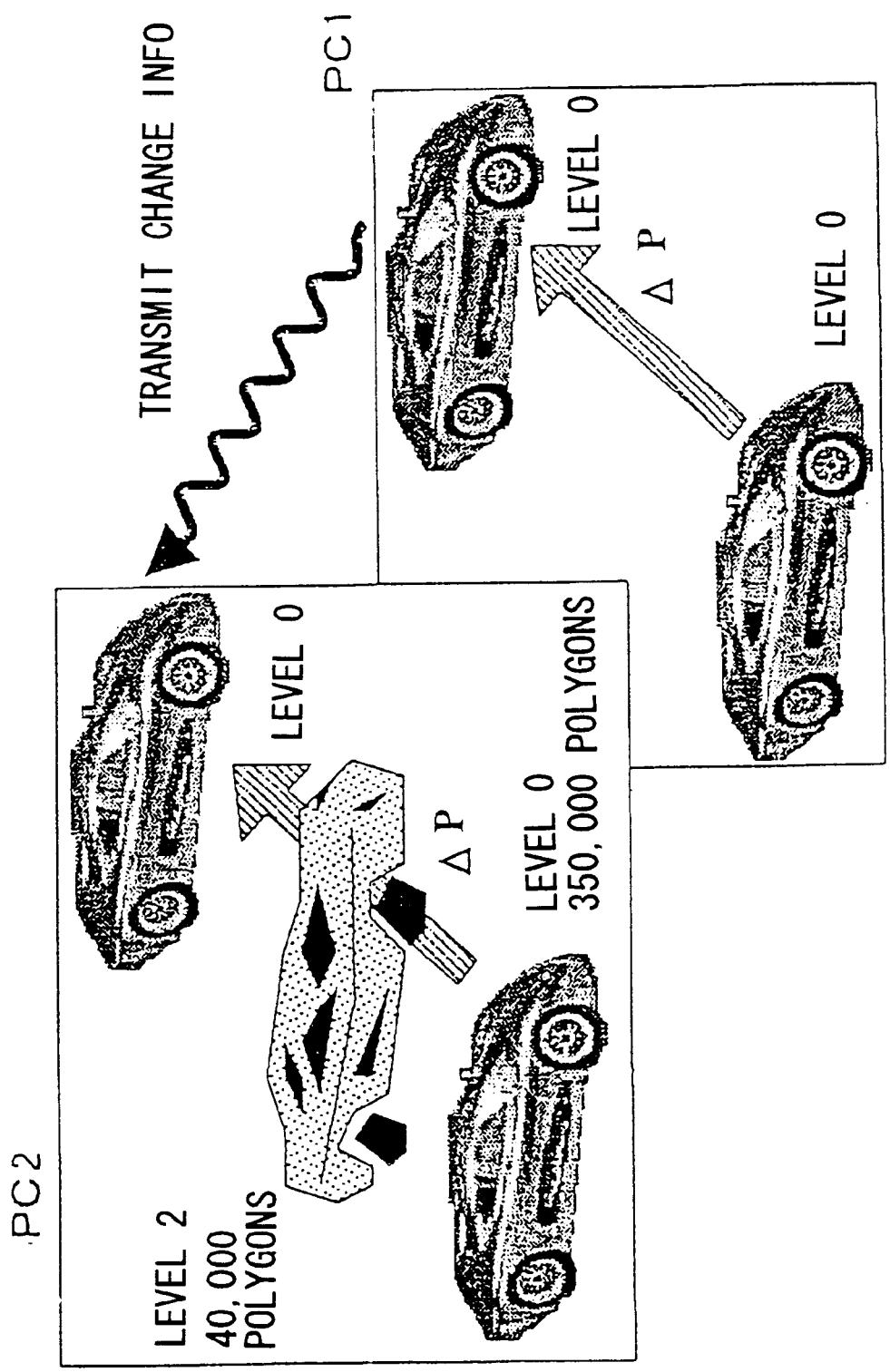
FIG. 37 is a diagram for explaining the operating principle of the LOD dynamic decimation synchronizing process.
Figure 38:
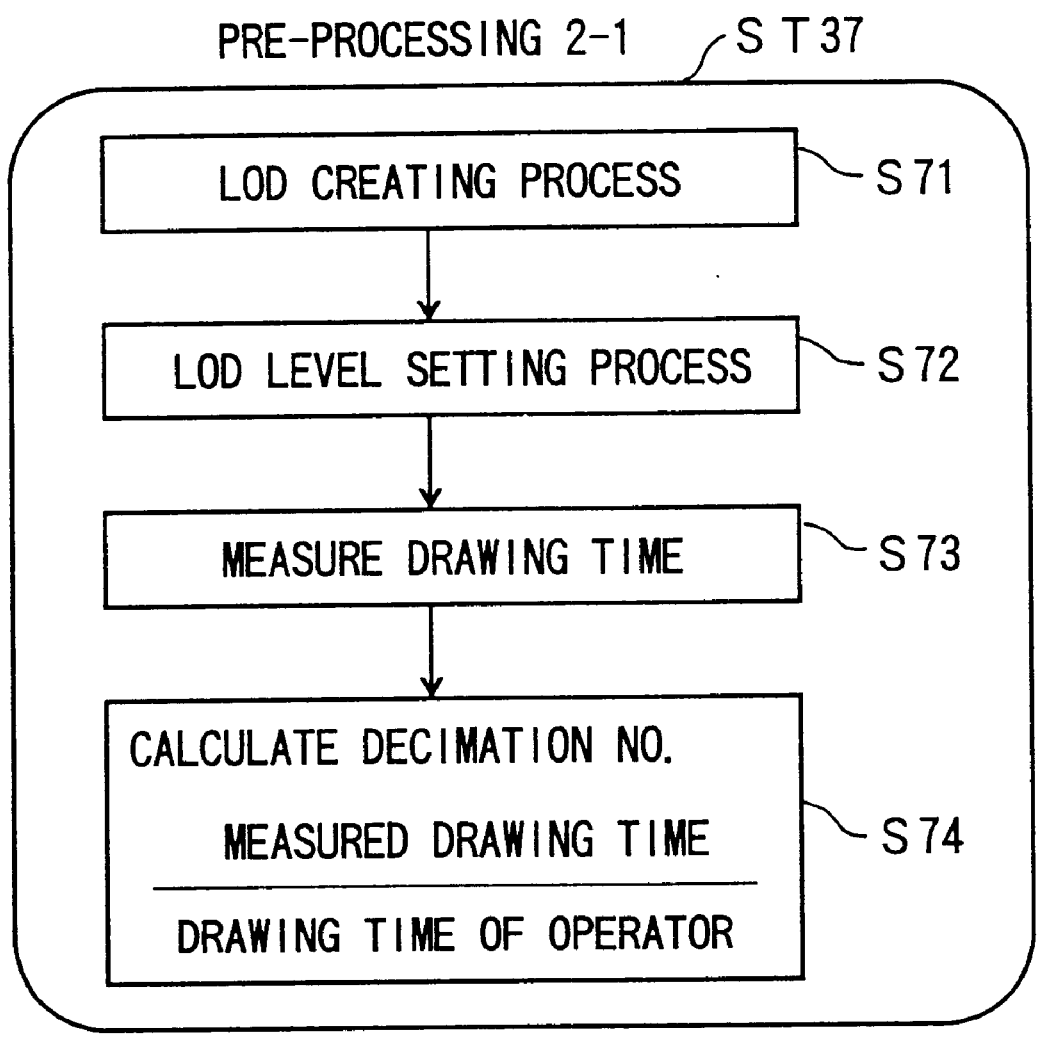
FIG. 38 is a flow chart for explaining the receiving end process of the LOD dynamic decimation synchronizing process.

Next, a description will be given of a Level Of Detail (LOD) dynamic decimation synchronizing process which utilizes the LOD when carrying out the dynamic decimation synchronizing process described above, by referring to FIGS. 37 and 38. FIG. 37 is a diagram for explaining the operating principle of the LOD dynamic decimation synchronizing process, and FIG. 38 is a flow chart for explaining the receiving end process of the LOD dynamic decimation synchronizing process.

When a polygon reduction algorithm is employed with respect to the three-dimensional object, it is possible to smoothly reduce 350,000 polygons making up the three-dimensional object, for example, into approximately 40,000 polygons, to thereby enable a corresponding improvement of the drawing speed. However, if the number of polygons is excessively reduced, the appearance of the three-dimensional object becomes poor and unattractive especially as a product model. But on the other hand, if the number of polygons is too large, the drawing speed becomes slow, and the effect of employing the polygon reduction algorithm is lost.

Accordingly, from the point of view of improving the appearance and the drawing speed, the LOD which is employed in the field of Computer Graphics (CG) prepares several levels of reducing the number of polygons forming each part of the three-dimensional object at appropriate proportions, so that the drawing process can be carried out by varying the polygon reduction level depending on parameters such as the distance between the three-dimensional object and the view point. For example, it is assumed for the sake of convenience that a level 0 draws the three-dimensional object using the original 350,000 polygons, a level 2 draws the three-dimensional object by reducing the number of polygons to approximately 40,000 polygons, and a level 1 draws the three-dimensional object by reducing the number of polygons to an intermediate level of approximately 100,000 polygons. In the case of the level 2, the drawing time does not simply become approximately 1/9 times, and becomes approximately 1/5 times that of the level 0, but the drawing time is still considerably reduced.

Therefore, by employing the LOD, the decimation number of the dynamic decimation synchronizing process can be reduced, so that the drawing processes can be carried out smoothly, naturally, and in synchronism among the client systems.

In FIG. 37, it is assumed for the sake of convenience that a three-dimensional object, that is, an automobile, is drawn with the LOD level 0 on the computer system PC1 having the high drawing speed, and that the position of the automobile changes by $\Delta P$. In the computer system PC2 which has the low drawing speed and receives change information corresponding to this positional change $\Delta P$, it is possible to carry out the drawing process without carrying out the decimation if the graphic performance of the computer system PC1 is three times that of the computer system PC2 and the LOD level 2 is set in the computer system PC2 to reduce the drawing time to approximately 1/5 times. In addition, if the graphic performance of the computer system PC1 is ten times that of the computer system PC2, it is possible to carry out the drawing process once for every two drawing processes carried out in the computer system PC1 by setting the LOD level 2 in the computer system PC2 and reducing the drawing time to approximately 1/5 times, as compared to a case where the LOD is not employed where the drawing process in the computer system PC2 would only be carried out once for every ten drawing processes carried out in the computer system PC1. FIG. 37 shows a case where the moving three-dimensional object, that is, the automobile, is drawn at the LOD level 2 in the computer system PC2.

Therefore, according to the LOD dynamic decimation synchronizing process, the decimation number is reduced compared to the dynamic decimation synchronizing process which does not employ the LOD, thereby enabling smoother drawing of the three-dimensional object.

In FIG. 38, a step ST38 carries out a pre-processing 2-1 in place of the step ST32 shown in FIG. 36. The pre-processing 2-1 includes steps S71 through S74. The step S71 carries out a LOD creating process, and creates the LOD levels. The step S72 carries out a LOD level setting process, and sets the LOD level to be used. The step S73 measures the drawing time. The step S74 carries out a decimation number calculating process, and calculates the decimation number based on the set LOD level and the measured drawing time. Other processes carried out at the receiving end are the same as those shown in FIG. 36, and illustration and description thereof will be omitted.

Next, a description will be given of a skip synchronizing process for smoothly and naturally drawing the three-dimensional object which is shared among the remote locations, in synchronism among the remote locations, when the operation such as moving and rotation with respect to the three-dimensional object is stopped, by referring to FIGS. 39 and 40.

Figure 39:
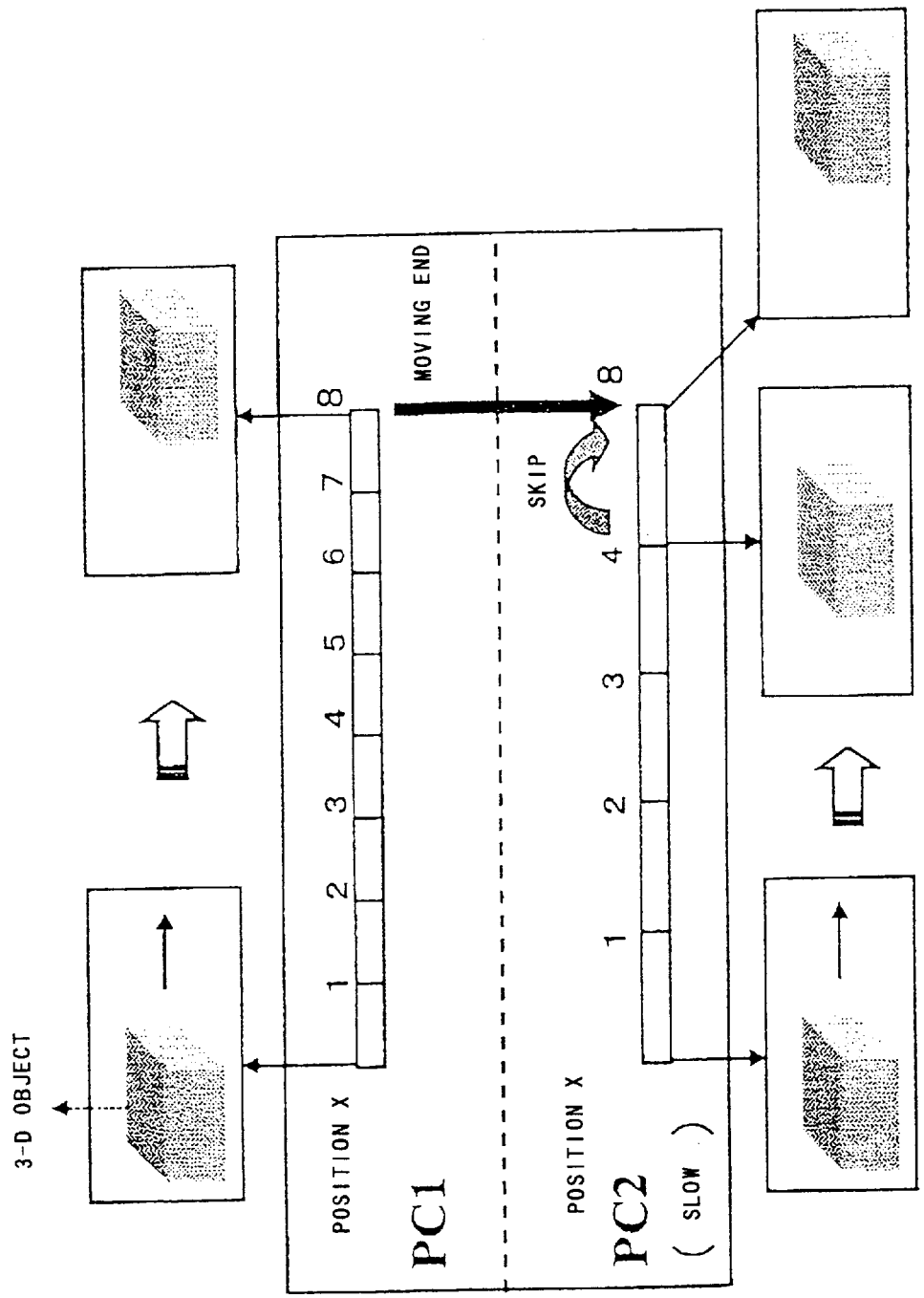
FIG. 39 is a diagram for explaining the operating principle of the skip synchronizing process.

FIG. 39 is a diagram for explaining the operating principle of the skip synchronizing process. When the three-dimensional shared viewer is shared among the computer systems having different graphic performances, the drawing process of the computer system having the low graphic performance falls behind the drawing process of the computer system PC1 having the high graphic performance. Hence, when the operation of the computer system PC1 stops while moving the part, the computer system PC2 carries out the skip synchronizing process shown in FIG. 39 to skip the in-between commands and to execute the last priority command. When this skip synchronizing process is carried out in addition to the dynamic decimation synchronizing process described above, it becomes possible even for the computer system PC2 having the low graphic performance to share the three-dimensional shared viewer with the computer system PC1 having the high graphic performance.

Figure 40:
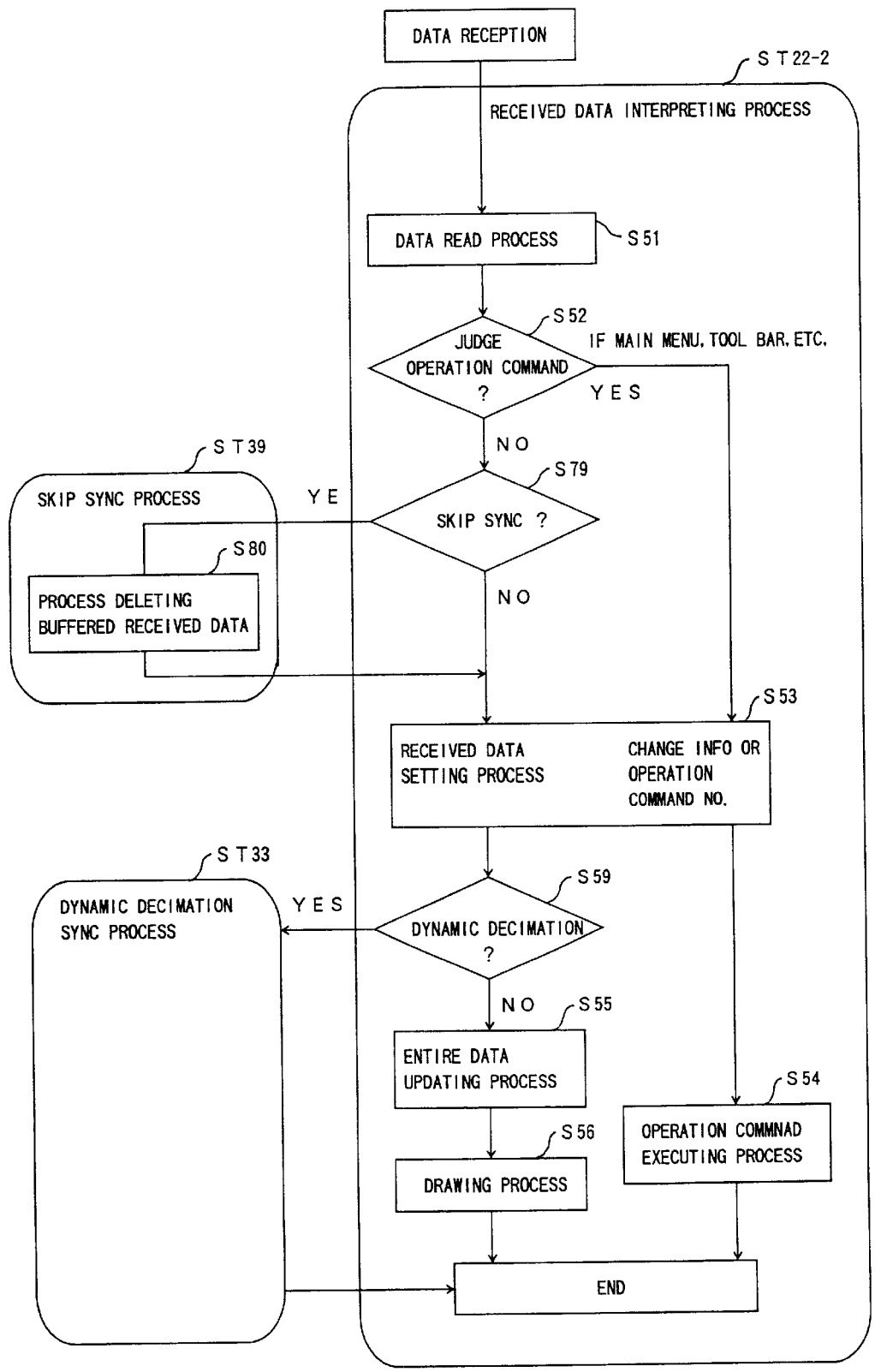
FIG. 40 is a flow chart for explaining the receiving end process of the skip synchronizing process.

FIG. 40 is a flow chart for explaining the receiving end process of the skip synchronizing process. In FIG. 40, those steps which are the same as those corresponding steps in FIG. 36 are designated by the same reference numerals, and a description thereof will be omitted.

In a received data interpreting process of a step ST22-2 shown in FIG. 40, if the decision result in the step S52 is NO, a step S79 decides whether or not to carry out a skip synchronizing process. The process advances to the step S53 if the decision result in the step S79 is NO. On the other hand, if the decision result in the step S79 is YES, a step ST.39 carries out a skip synchronizing process which includes a step S80. Of the operation commands buffered within the communication interface of the three-dimensional shared viewer of the receiving end, for example, the step S80 deletes the operation command (received data) excluding the last priority command, and executes the priority command. The process advances to the step S53 after the step S80.

Next, a description will be given of a long-duration process synchronizing process for smoothly and naturally synchronizing the processes which require long calculation times, in a case where the CPU performances are not uniform among the client systems at each of the local sites, by referring to FIGS. 41 and 42.

Figure 41:
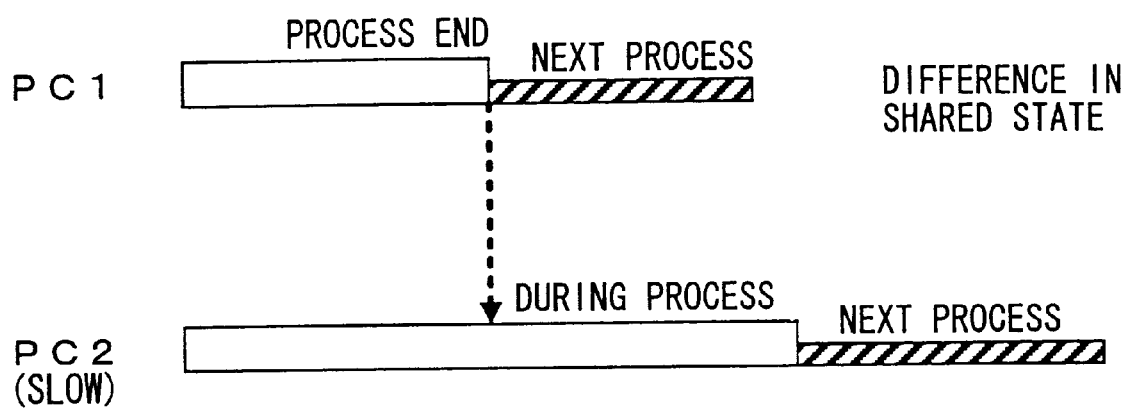
FIG. 41 is a diagram for explaining the processing error caused by differences in CPU performances.
Figure 42:
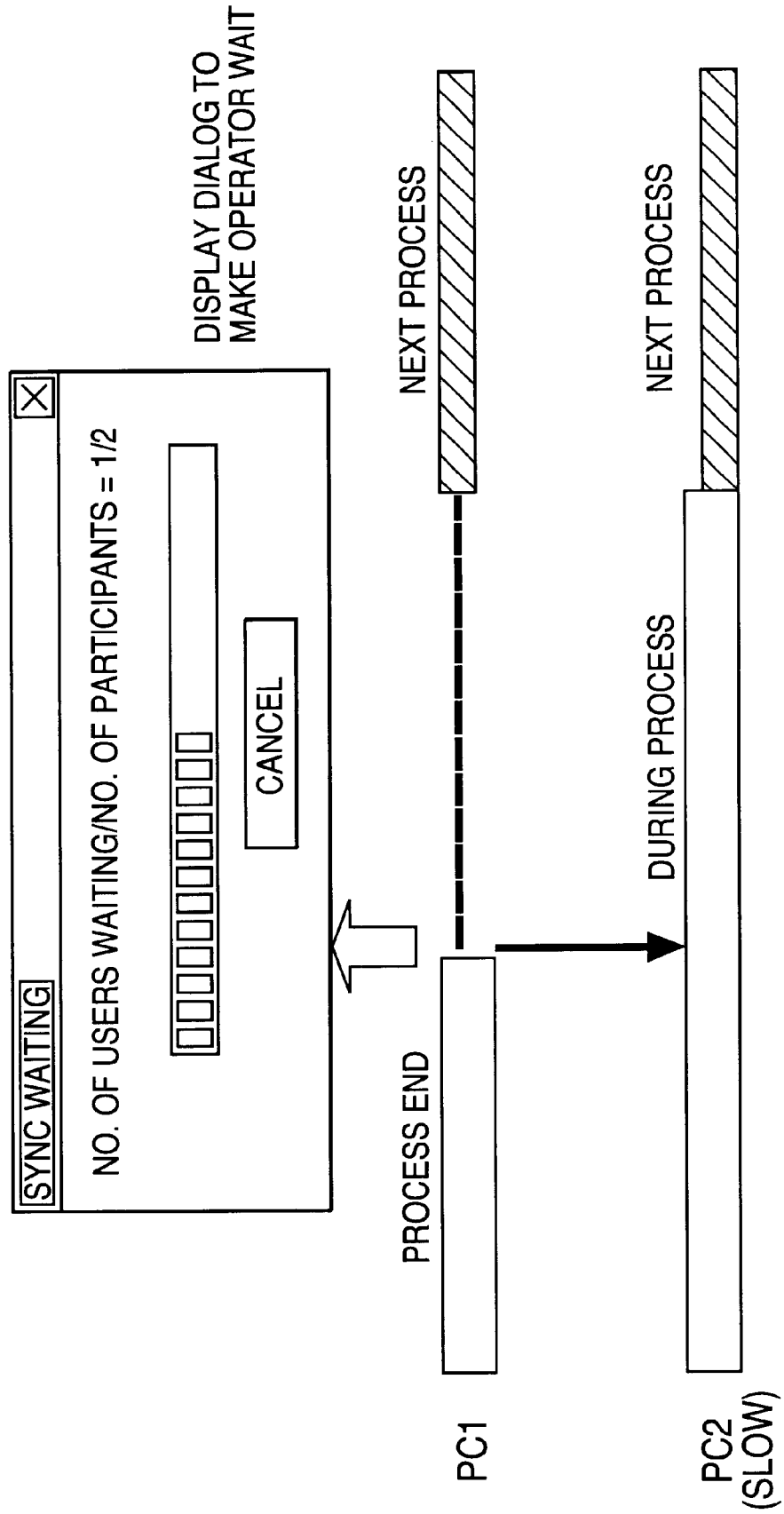
FIG. 42 is a diagram for explaining the operating principle of the long-duration process synchronizing process.

FIG. 41 is a diagram for explaining a processing error caused by differences in the CPU performances. In FIG. 41, if the CPU performance of the computer system PC1 is higher than the CPU performance of the computer system PC2, the computer system PC2 is still carrying out a first process even when the computer system PC1 is finished carrying out the first process and is carrying out a next process. For this reason, an error is generated in the shared states of the three-dimensional shared viewers between the computer systems PC1 and PC2. In other words, when the operator carries out a model read operation and then moves to the next operation before the model read operation is finished at all of the client systems participating in the conference, a failure may occur in the shared states.

Accordingly, it is desirable to carry out a long-duration process synchronizing process in such a case. FIG. 42 is a diagram for explaining the operating principle of the long-duration process synchronizing process. As shown in FIG. 42, when a long-duration process is generated, a dialog such as "number of users waiting/number of participants" is displayed to make the operator wait so as not to carry out next operation until the processes end at the client systems of all of the participants. Furthermore, when a certain participant leaves during the conference, for example, it is possible to automatically carry out a subtraction and change the number of participants, so as to carry out a similar long-duration process synchronizing process.

Next, a description will be given of a stop position synchronizing process, by referring to FIGS. 43 through 47. The stop position synchronizing process is carried out when a product model data having a moving path changes from a reproducing state to a stopped state, by exchanging a stop position (path number) and stopping the reproduction at the stop position.

Even if the creation of the moving path is prohibited in order to suppress the storage capacity consumed during the conference, it is necessary to make the discussion by sharing reproduction of the moving path in the case of a conference which discusses the operation of the product model or the like. Hence, the moving path is created in a stand-alone type three-dimensional shared viewer, and measures are taken so that the reproduction of the moving path can be shared by opening the moving path data which are distributed in advance similarly to the assembly data. When sharing the reproducing function of the moving path, even if the same moving path which is distributed in advance is simultaneously reproduced at each of the client systems, the reproduction at the client system having a low graphic performance lags the reproduction at the other client system having a higher graphic performance, when there are differences in the graphic performances of the client systems. As a result, when the reproduction is stopped halfway at one client system, the reproduction stop position becomes different at each of the client systems depending on the graphic performances thereof.

Figure 43:
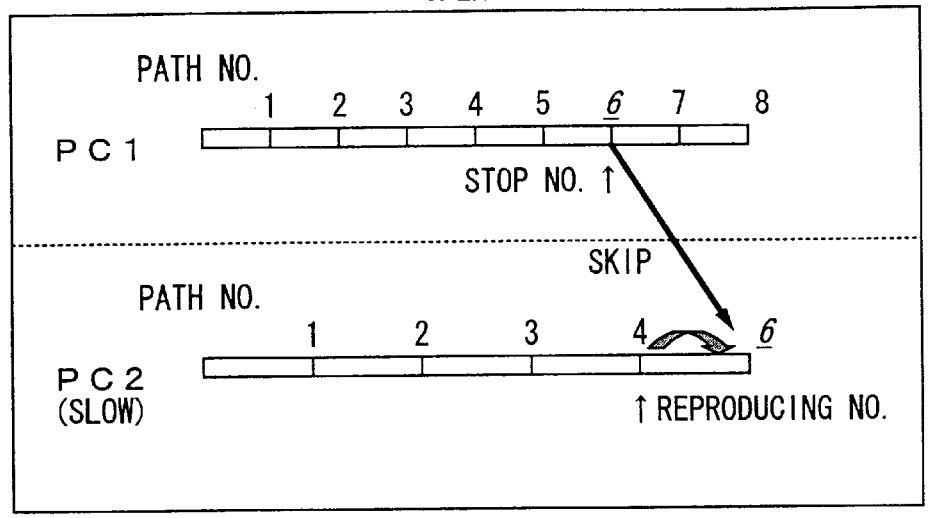
FIG. 43 is a diagram for explaining a case where a stop position is transmitted from a computer system having a high graphic performance to a computer system having a low graphic performance.
Figure 44:
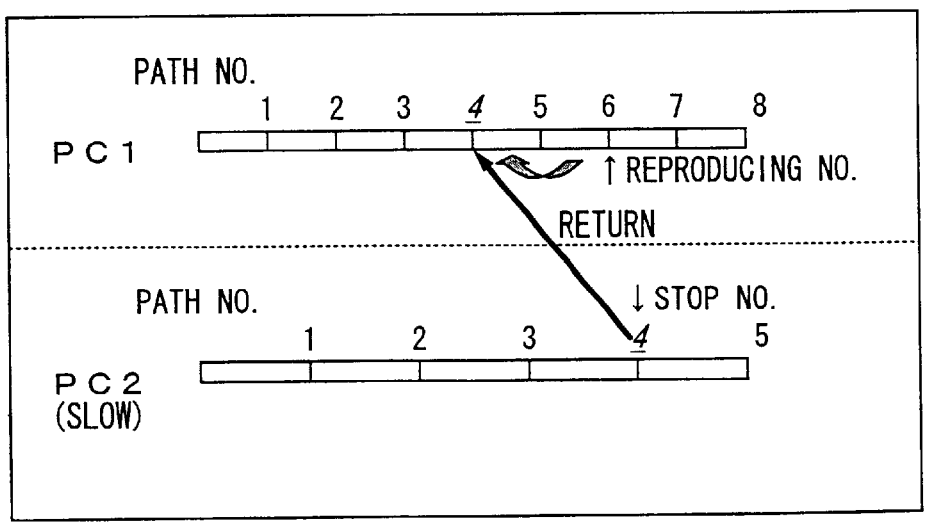
FIG. 44 is a diagram for explaining a case where the stop position is transmitted from the computer system having the low graphic performance to the computer system having the high graphic performance.

Accordingly, in the stopped state, the stop position (path number) is exchanged, and the stop position synchronizing process to stop the reproduction at the stop position is carried out as shown in FIGS. 43 and 44. FIG. 43 is a diagram showing a case where the operator carries out an operation on the computer system PC1 having a high graphic performance, and the stop position (path number) is transmitted from the computer system PC1 to the computer system PC2 having a low graphic performance. In addition, FIG. 44 is a diagram for explaining a case where the operator carries out an operation on the computer system PC2 having the low graphic performance, and the stop position (path number) is transmitted from the computer system PC2 to the computer system PC1 having the high graphic performance. In FIGS. 43 and 44, a "stop number" refers to the path number which indicates the stop position, and a "reproducing number" refers to the path number which is being reproduced.

Figure 45:
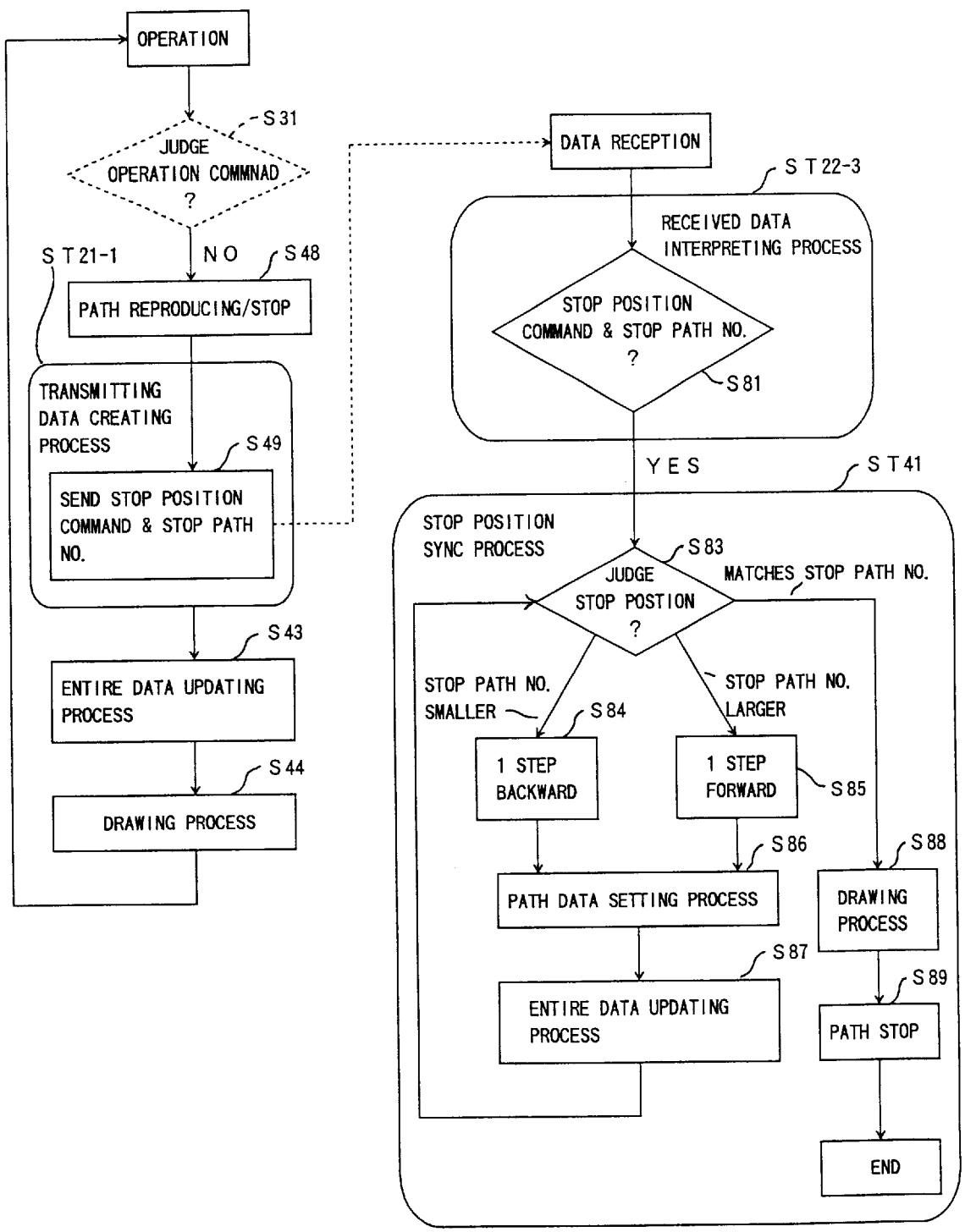
FIG. 45 is a flow chart for explaining the stop position synchronizing process of FIGS. 43 and 44.

FIG. 45 is a flow chart for explaining the stop position synchronizing process of FIGS. 43 and 44. In FIG. 45, those steps which are the same as those corresponding steps in FIGS. 13 and 14 are designated by the same reference numerals, and a description thereof will be omitted.

In FIG. 45, a step S48 carries out a path reproducing or stop process. A transmitting data creating process of a step S21-1 includes a step S49 which sends a stop position command and a stop path number. On the other hand, a received data interpreting process of a step S22-3 includes a step S81 which decides whether or not the stop position command and the stop path number are received. When the decision result in the step S81 becomes YES, the process advances to a stop position synchronizing process of a step S41-1.

The stop position synchronizing process includes steps S83 through S89. The step S83 judges the stop position. The process advances to the step S84 if the stop path number is smaller than the path number of the receiving end, the process advances to the step S85 if the stop path number is larger than the path number of the receiving end, and the process advances to the step S88 if the stop path number matches the path number of the receiving end. The step S84 returns backward by one step (frame), and the step S85 advances forward by one step (frame). After the step S84 or S85, the step S86 carries out a path data setting process to set the path data. In addition, the step S87 carries out an entire data updating process, and the process thereafter returns to the step S83. The step S88 carries out a drawing process, and a step S89 carries out a path stop process. The process ends after the step S89.

Figure 46:
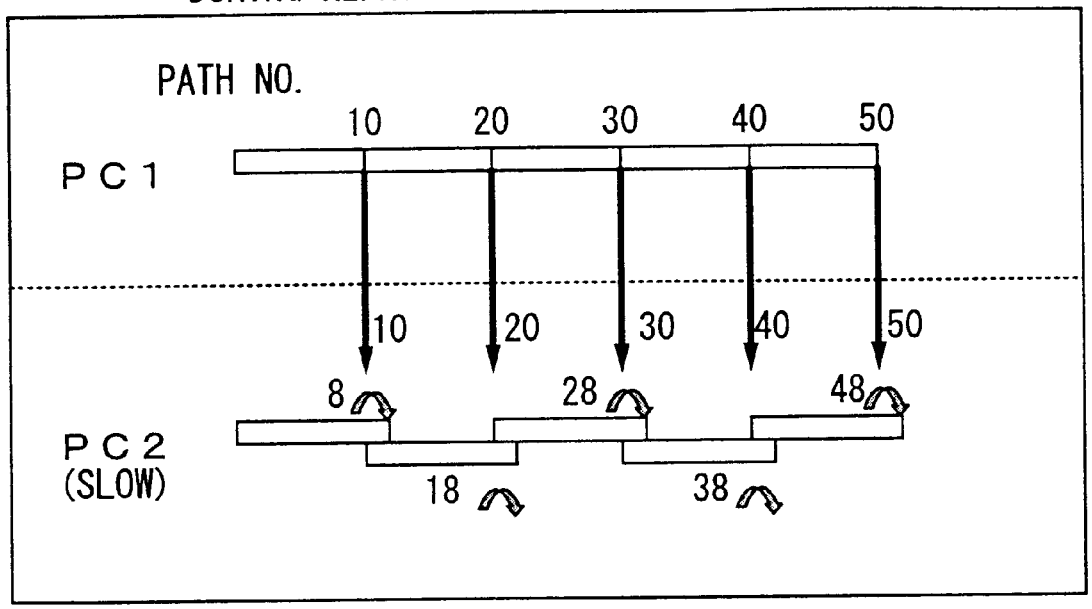
FIG. 46 is a diagram showing a case where the stop position synchronizing process is carried out during the moving path reproduction for every ten moving path reproductions, for example.

During the moving path reproduction, the stop position synchronizing process may be carried out periodically,such as, for every ten moving path reproductions, for example, so as to prevent the error of the stop position. FIG. 46 is a diagram showing a case where the stop position synchronizing process is carried out during the moving path reproduction for every ten moving path reproductions, for example.

Figure 47:
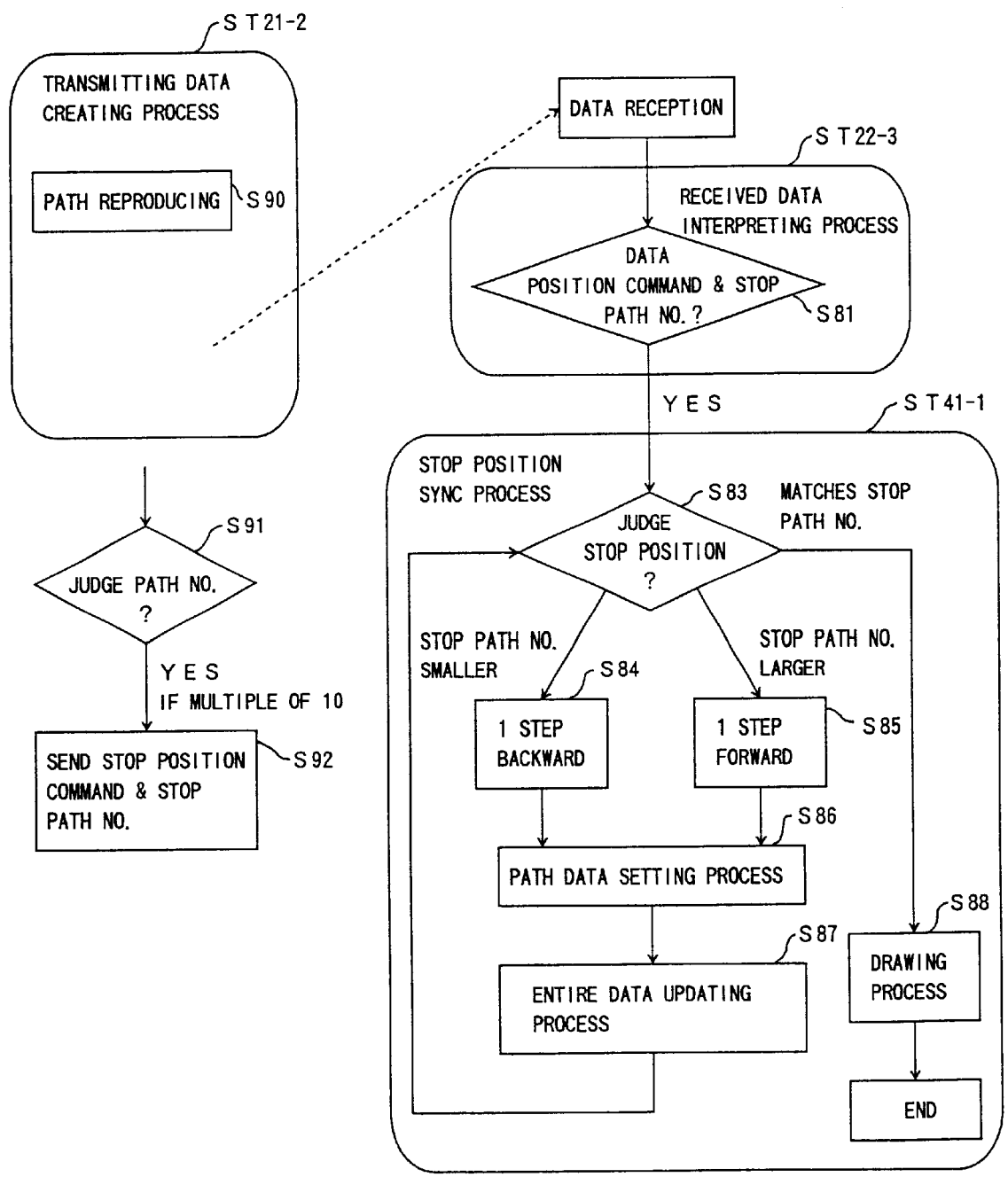
FIG. 47 is a flow chart for explaining the stop position synchronizing process of FIG. 46.

FIG. 47 is a flow chart for explaining the stop position synchronizing process of FIG. 46. In FIG. 47, those steps which are the same as those corresponding steps in FIG. 45 are designated by the same reference numerals, and a description thereof will be omitted.

In FIG. 47, a transmitting data creating process of a step ST21-2 includes a step S90 which carries out a path reproducing process. In addition, steps S91 and S92 are included in the process at the transmitting end. The step S91 carries out a path number judging process, so as to judge whether or not the path number is a multiple of ten. If the judgement result in the step S91 is YES, the step S92 sends a present position command and a stop path number. In this particular case, a step S89 is included in a stop position synchronizing process of a step ST41-1.

Figure 48:
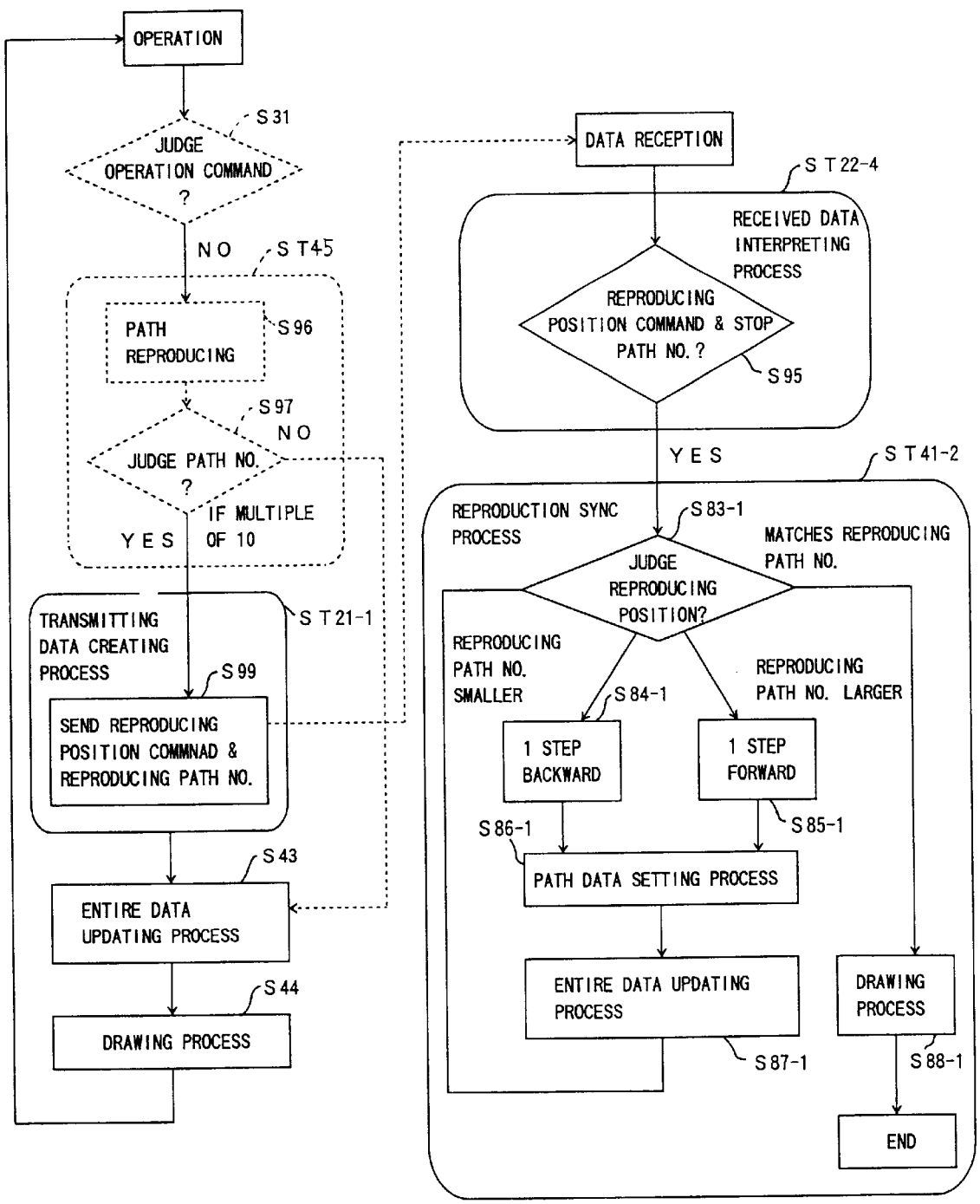
FIG. 48 is a flow chart for explaining the path reproduction synchronizing process.

Next, a description will be given of a path reproduction synchronizing process applied with the dynamic decimation synchronizing process, during reproduction of the product model which has a moving path, by referring to FIG. 48. FIG. 48 is a flow chart for explaining the path reproduction synchronizing process. In FIG. 48, those steps which are the same as those corresponding steps in FIG. 45 are designated by the same reference numerals, and a description thereof will be omitted.

When the dynamic decimation synchronizing process is employed, even a computer system having a slow drawing speed can confirm the general movement of the three-dimensional object, in synchronism with the other computer systems. However, in the general movement of the three-dimensional object, there are cases where it is desirable to confirm the moving path more precisely at a certain part of the three-dimensional object. Hence, at the part of the three-dimensional object where the moving path is to be confirmed more precisely, the reproduction synchronizing process temporarily stops reproduction, and returns the reproduction backward or advances the reproduction forward one frame at a time, so as to enable the more precise confirmation of the moving path.

In FIG. 48, a step ST45 includes a step S96 which carries out a path reproducing process, and a step S97 which carries out a path number judging process. The step S97 judges whether or not the path number is a multiple of ten. The process advances to the step S43 if the judgement result in the step S97 is NO. On the other hand, if the judgement result in the step S97 is YES, a step ST21-1 carries out a transmitting data creating process. This transmitting data creating process includes a step S99 which sends a reproducing position command and a reproducing path number. In addition, a received data interpreting process of a step ST22-4 includes a step S95 which decides whether or not the reproducing position command and the reproducing path number are received. A reproduction synchronizing process of a step ST41-2 is carried out if the decision result in the step S95 is YES.

The reproduction synchronizing process includes steps S83-1 through S88-1. The step S83-1 judges the reproducing position. The process advances to the step S84-1 if the reproducing path number is smaller than the path number of the receiving end, the process advances to the step S85-1 if the reproducing path number is larger than the path number of the receiving end, and the process advances to the step S88-1 if the reproducing path number matches the path number of the receiving end. The step S84-1 returns.backward by one step (frame), and the step S85-1 advances forward by one step (frame). After the step S84-1 or S85-1, the step S86-1 carries out a path data setting process to set the path data. In addition, the step S87-1 carries out an entire data updating process, and the process thereafter returns to the step S83-1. The step S88-1 carries out a drawing process, and the process ends after the step S88-1.

Figure 49:
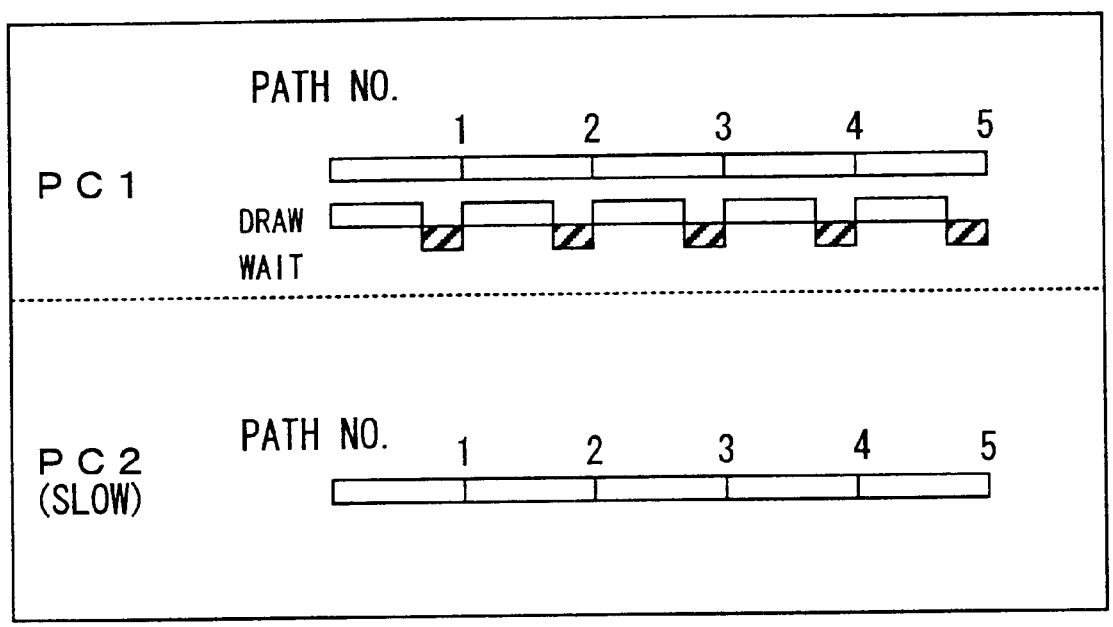
FIG. 49 is a diagram for explaining the wait synchronizing process.
Figure 50:
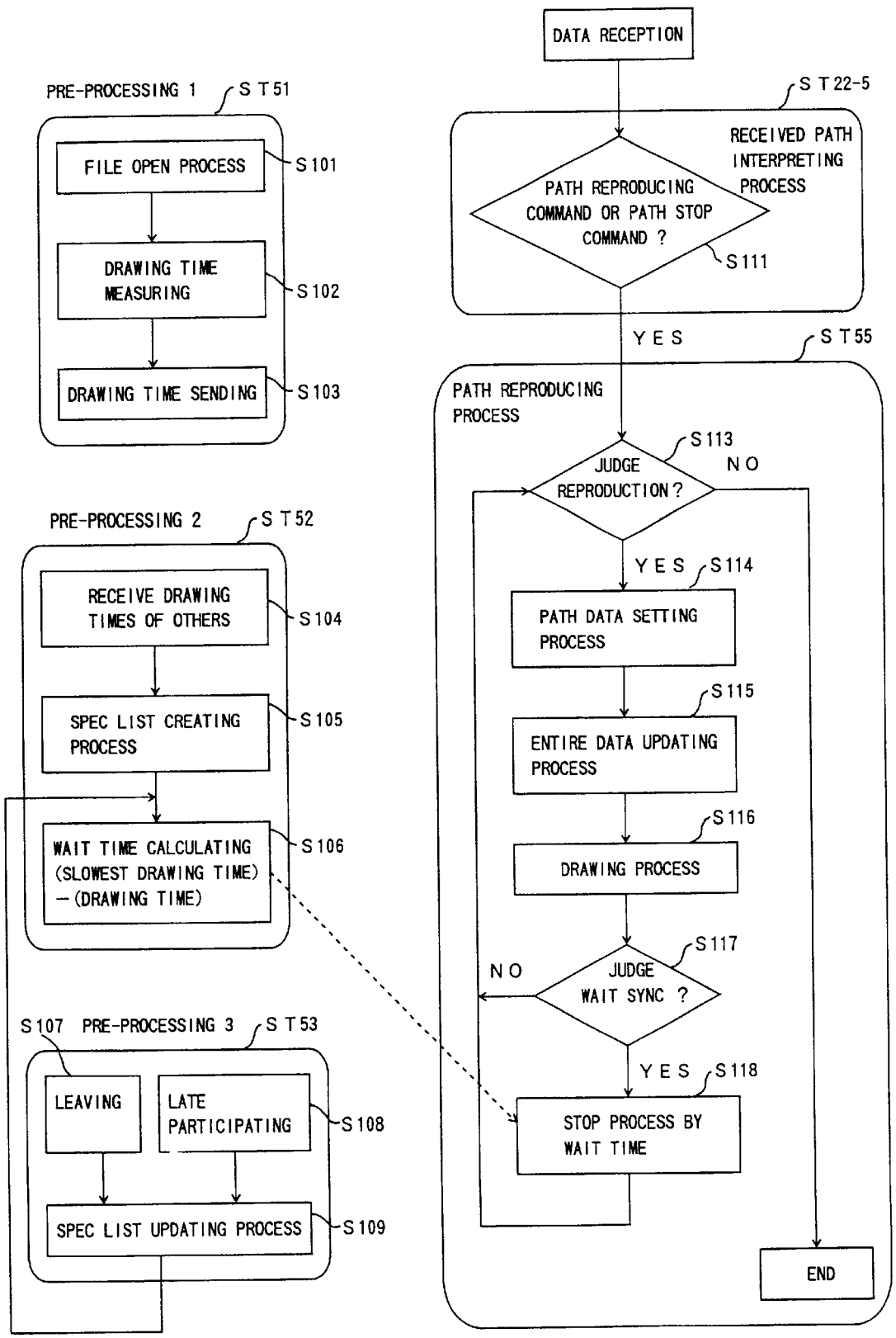
FIG. 50 is a flow chart for explaining the wait synchronizing process.

Next, a description will be given of a wait synchronizing process which carries out the reproduction according to the computer system which has the slowest drawing speed among the computer systems during reproduction of the product model data having a moving path, by referring to FIGS. 49 through 52C. FIG. 49 is a diagram for explaining the wait synchronizing process, and FIG. 50 is a flow chart for explaining the wait synchronizing process. In addition, FIG. 51 is a diagram showing specifications of the computer system, and FIGS. 52A, 52B and 52C are diagrams for explaining creation and updating of a specification list.

When moving the part, rotating the part and changing the view point, the final state is important, and the intermediate states may be decimated. However, in the case of a path reproduction which is used to inspect the movement, it is desirable that all of the movements are visible. Hence, in such a case, according to the computer system which has the slowest drawing speed among the participants, the drawing process of the computer system having a higher drawing speed is made to wait, as shown in FIG. 49. In FIG. 49, the computer system PC1 has the high drawing speed, the computer system PC2 has the low drawing speed, and time indicated by the hatching correspond to the wait time. Therefore, even in a case where the movements of the product model assembling sequence are to be confirmed, for example, it is possible to synchronize the drawing processes among the computer systems having the different graphic performances.

In FIG. 50, a pre-processing 1 of a step ST51 includes steps S101 through S103. The step S101 carries out a file open process, and a step S102 carries out a drawing time measuring process. The step S103 carries out a drawing time sending process.

A pre-processing 2 of a step ST52 includes steps S104 through S106. The step S104 carries out a process for receiving drawing times of the other computer systems (other users), and the step S105 carries out a specification list creating process to create a specification list (PC specification list) of the computer systems. The PC specification includes information such as the user number, the number of CPUs, the CPU frequency, and the CG drawing time (in seconds), as shown in FIG. 51, for example. The PC specification list is a list of the PC specifications. The step S106 carries out a wait time calculating process which obtains the wait time, by subtracting the drawing time of the computer system which is being operated from the drawing time of the computer system which has the slowest drawing time. The wait time which is obtained in this manner is used in a path reproducing process of a step ST55 which will be described later.

A pre-processing 3 of a step ST53 includes steps S107 through S109. The step S107 carries out a leaving process, and notifies the participant who left from the conference. The step S108 carries out a late participating process, and notifies the participant who participated late during the conference. The step S109 carries out a PC specification list updating process which updates the PC specification list depending on the participants who left and/or who participated late.

Next, a description will be given of the creation and updating of the PC specification list related to the drawing times of each of the computer systems, by referring to FIGS. 52A through 52C. FIG. 52A shows a PC specification list which is created when users 1 and 2 participate to the conference, FIG. 52B shows a PC specification list which is updated when a user 3 makes a late participation to the conference, and FIG. 52C shows a PC specification list which is updated when the user 3 leaves the conference.

In FIG. 52A, when users 3, 4, . . . exist, the PC specification list is created so that a list of the users 3, 4, . . . follow the list of the users 1 and 2.

When the user 3 makes a late participation during the conference of the users 1 and 2, the file is re-opened. Hence, the list is once deleted when re-opening the file, and the PC specification list is updated as shown in FIG. 52B by re-creating the list similarly as in the case of the initial state. In this case, compared to a method of sending the data of the users 1 and 2 to the user 3, it is possible to unify and simplify the process. Although the data transmissions of the CG drawing times will overlap, no inconveniences are introduced because the late participation to the conference usually does not occur frequently, and further, because the data transmission time required for the CD drawing times is negligibly short compared to the transmission time of the most recent assembly data file which is transmitted for the late participant.

When a participant leaves during the conference, the data within the PC specification list are updated as shown in FIG. 52C. In this case, when the user 2 leaves during the conference, the three-dimensional shared viewer at the computer system of the user 2 automatically notifies the other three-dimensional shared viewers at the other computer systems that the user 2 has left the conference. Each three-dimensional shared viewer which is notified of the user 2 who left the conference makes a corresponding change in the PC specification list at the participant number of the user 2 who left, by setting the drawing time to 0, for example. In addition, the PC specification list of the participant (user 2) who left the conference is rearranged to appear at the end of the list, and it becomes unnecessary to refer to a PC specification list beyond this PC specification list appearing at the rearranged position when judging the drawing time. Accordingly, it is possible to efficiently carry out the wait time calculating process when a plurality of participants leave during the conference. Furthermore, since it is possible to detect the computer system having the slowest drawing time within the updated PC specification list, it is possible to re-determine the path wait time when reproducing the path thereafter based on the detection result.

Returning now to the description of the wait synchronizing process shown in FIG. 50, a received data interpreting process of a step ST22-5 includes a step S111 which decides whether or not a path reproducing command or a path stop command is received. If the decision result in the step S111 is YES, a path reproducing process of a step ST55 is carried out. The path reproducing process includes steps S113 through S118.

The step S113 decides whether or not to carry out a path reproduction, and the process ends if the decision result in the step S113 is NO. On the other hand, if the decision result in the step S113 is YES, the step S114 sets path data by a path data setting process. The step S115 carries out an entire data updating process, and the step S116 carries out a drawing process. The step S117 decides whether or not a wait synchronizing process is to be carried out, and the process returns to the step S113 if the decision result in the step S117 is NO. If the decision result in the step S117 is YES, the step S118 stops the process by a wait time, based on the wait time which is obtained in the step S106, and the process returns to the step S113.

Figure 53:
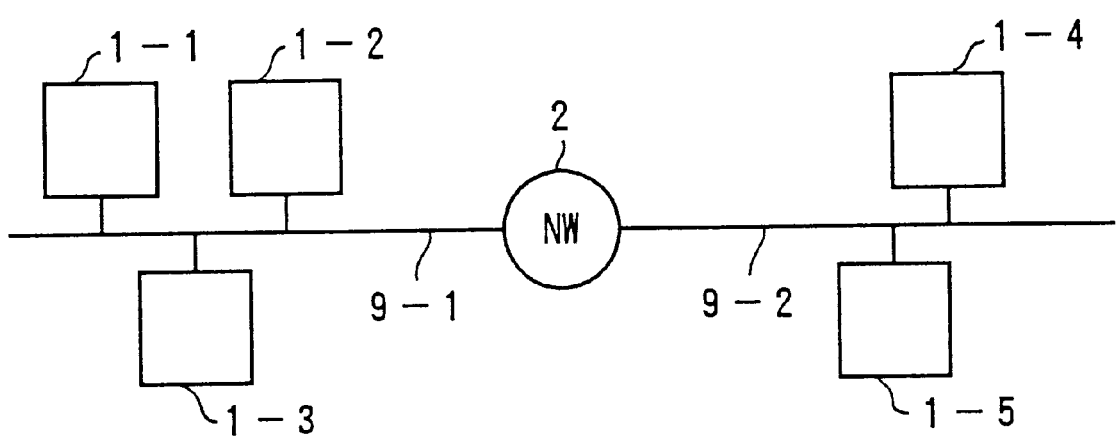
FIG. 53 is a diagram showing a server-client system which may be applied with a second embodiment of the three-dimensional object shared processing method according to the present invention.

FIG. 53 is a diagram showing a server-client system which may be applied with a second embodiment of the three-dimensional object shared processing method according to the present invention. In FIG. 53, those parts which are the same as those corresponding parts in FIG. 1 are designated by the same reference numerals, and a description thereof will be omitted. In the server-client system shown in FIG. 53, a plurality of computer systems 1-1 through 1-3 are connected via a LAN 9-1, to form a first system. In addition, a plurality of computer systems 1-4 and 1-5 are connected via a LAN 9-2, to form a second system. The first system and the second system are connected via a network 2 such as a WAN.

Figure 54:
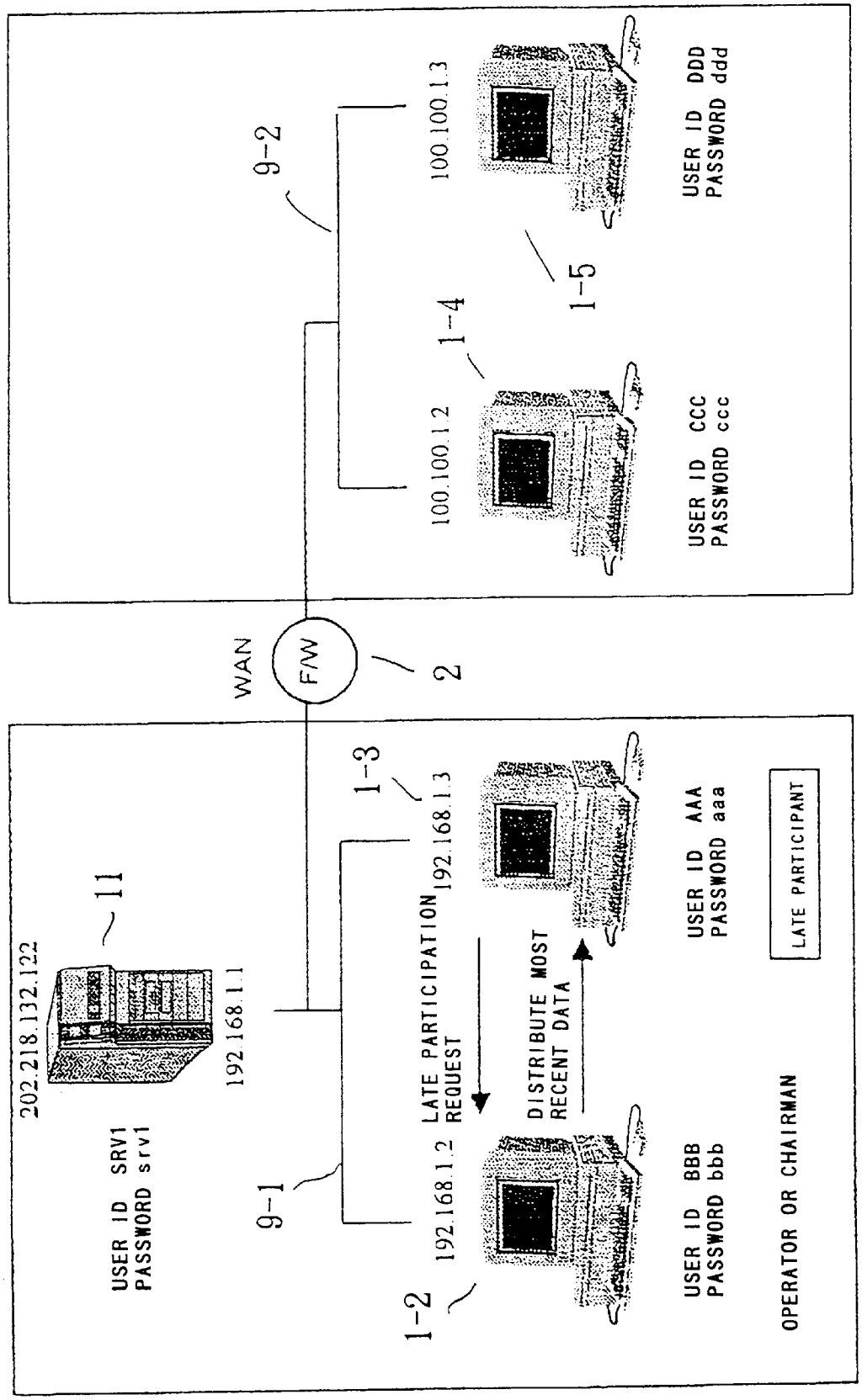
FIG. 54 is a diagram for explaining the late participation to a conference.

For the sake of convenience, it is assumed that the computer system 1-1 forms the server and the other computer systems 1-2 through 1-5 form the clients. Of course, the computer system 1-1 may include the functions of both the server and the client. In this embodiment, it is assumed for the sake of convenience that the computer systems 1-1 through 1-5 all have the same basic structure, however, the basic structures of the computer system 1-1 which forms the server and the computer systems 1-2 through 1-n which form the clients may be mutually different, as shown in FIG. 54. In addition, of the computer systems 1-1 through 1-n, two or more computer systems may have mutually different basic structures.

Next, a description will be given of a process of notifying a most recent state of the conference to a participant who participates late to the conference. As shown in FIG. 54, the late participant (user) pushes a "participate" button which is arranged within a conference management window displayed on the display 102, so as to make a late participation to the conference which has already started. After the three-dimensional shared viewer is started, the late participant pushes a "late participation" button. If the late participant is registered in advance as one of the participants of the conference, the three-dimensional object data are already distributed to the client system of this registered late participant. Accordingly, it is sufficient to distribute to the late participant the final state of the three-dimensional object data (three-dimensional shared viewer assembly file) and the present view point. While the late participant is carried out a process for the late participation to the conference, it takes a certain time for the distribution of the data, and for this reason, the conference is temporarily interrupted so as to achieve synchronism with the other participants. While the conference is being temporarily interrupted, a dialog "making late participation" is displayed to all participants, and the operation of the three-dimensional shared viewer is prohibited, so as to assume a wait state until the process for the late participation ends.

When managing the process for the late participation (hereinafter referred to as a late participating process) in the three-dimensional shared viewer of the client system, the following steps st1 through st10 are carried out.

Step st1: At the client system of the late participant, the later participant pushes a "participate" button in the conference management window.

Step st2: Each three-dimensional shared viewer receives a late participation request from the client system of the late participant.

Step st3: Each three-dimensional shared viewer receives the late participation request from the client system of the late participant.

Step st4: The three-dimensional shared viewer of the client system of the late participant notifies each of the other client systems that the late participation is taking place.

Step st5: At each client system, a message dialog such as "late participation taking place, temporary interruption" is displayed, and the operation of the three-dimensional shared viewer is prohibited.

Step st6: In the case of the client system of the operator or chairman, a final state store instruction is sent to store the final state of the three-dimensional shared viewer, so as to instruct the final state of the three-dimensional shared viewer to be stored. Step st7: At each of the client systems other than the client system of the operator or chairman, the final state of the three-dimensional shared viewer is stored responsive to the final state store instruction.

Step st8: A data distribution is made to a preset storage directory, and the assembly data is sent from the client system of the operator or chairman to the client system of the late participant.

Step st9: The file is opened simultaneously at each of the client systems.

Step st10: The message dialog such as "late participation taking place, temporary interruption" is erased from the display, and the conference is resumed with the late participant added to the participants of the conference.

On the other hand, when managing the late participating process in the three-dimensional shared viewer of the server system, the following steps st11 to sts21 are carried out. In the following description, "st" is added to the designation of a step carried out by the client system, and "sts" is added to the designation of a step carried out by the server system.

Step st11: At the client system of the late participant, the late participant pushes a "participate" button in the conference management window.

Step st12: The client system of the late participant sends a late participation request to the three-dimensional shared viewer.

Step sts13: The three-dimensional shared viewer of the server system receives the late participation request from the client system of the late participant.

Step sts14: The three-dimensional shared viewer of the server system notifies each of the client systems other than the client system of the late participant that a late participation is taking place.

Step st15: At each client system, a message dialog such as "late participation taking place, temporary interruption" is displayed, and the operation of the three-dimensional shared viewer is prohibited.

Step sts16: The server system automatically searches a client system which is closest to the client system of the late participant, and acquires conference information from this client system which is closest to the client system of the late participant.

Step sts17: The server system sends a final state store instruction to the client system which is closest to the client system of the late participant, so as to instruct the final state of the three-dimensional shared viewer to be stored.

Step st18: At the client system which is closest to the client system of the late participant, the final state of the three-dimensional shared viewer is stored responsive to the final state store instruction.

Step st19: A data distribution is made to a preset storage directory, and the assembly data is sent from the client system which is closes to the client system of the late participant to the client system of the late participant.

Step sts20: The server system instructs each of the client systems to open the file simultaneously.

Step sts21: The server system instructs each of the client systems to erase the message dialog such as "late participation taking place, temporary interruption" from the display, so as to resume the conference with the late participant added to the participants of the conference.

In the late participating process described above, the late participation request is made from the late participant by an operation such as pushing a button. However, the late participation request may be made automatically in the following manner. In other words, if a condition that an operator exists in the conference which is being held or a condition that a file is open is satisfied, it is assumed that the conference is in progress and a late participant exists, and an automatic late participating process is carried out to automatically carry out the late participating process.

For example, in a case where a user C wishes to make a late participation to a conference which is in progress with users A and B, the display on the three-dimensional shared viewer of the client system of the user C is made identical to the displays on the three-dimensional shared viewers of the client systems of the users A and B. A conference state module of the client system of the user C notifies the late participation to the conference to the three-dimensional shared viewers of the client systems of the users A, B and C. At each of the three-dimensional shared viewers of the client systems of the users A, B and C, the state of the client system to which it belongs is judged, and the following process is carried out automatically.

That is, when there is a late participant, a dialog is sent and the operation of the three-dimensional shared viewer is prohibited. In addition, the state of the three-dimensional shared viewer of the client system of the user A or chairman is once stored as an assembly file, and this assembly file is transferred to the user C who is the late participant. The file is opened simultaneously at each of the three-dimensional shared viewers of the client systems of the users A, B and C. If a user other than the user B and the users A and C exists, the file is similarly stored in the client system of the user other than the user B and the users A and C in response to a share command, when storing the file in the client system of the user A.

As described above in conjunction with the first embodiment, when carrying out both the process of simultaneously sending the operation command to the users other than the operator and the process of simultaneously reading the three-dimensional object data in the separate directories within the client systems at each of the local sites, it is possible to simultaneously send the operation command together with the file name to each of the client systems so as to store the assembly data of the three-dimensional object. In this state, it is possible to obtain the final display by simultaneously using the function of storing the view point.

Therefore, the automatic late participating process can be realized by the following steps st31 to st54 which are carried out by the conference state module of the late participant, the three-dimensional shared viewer of the late participant and the three-dimensional shared viewers of the participants other than the late participant.

Conference State Module of the Late Participant:

Step st31: A late participation request is sent to the three-dimensional viewer immediately after the conference state module is started.

Three-Dimensional Shared Viewer of the Late Participant:

Step st32: The late participation request is received.

Step st33: For example, a dialog "myself is making late participation . . . " is displayed, and a late participation command is sent to the other three-dimensional shared viewers.

Three-Dimensional Shared Viewers of Participants Other Than Late Participant Who Received the Late Participation Command (in case of operator):

Step st34: For example, a dialog "a user is making late participation . . . " is displayed.

Step st35: The final state of the three-dimensional shared viewer (assembly file) is once stored.

Step st36: The assembly file is sent to the late participant.

Step st37: The file is simultaneously opened.

Step st38: For example, the display of the dialog "a user is making late participation . . . " is erased.

Three-Dimensional Shared Viewers of Participants Other Than Late Participant Who Received Late Participation Command (case where no operator exists, file is open, and user is chairman):

Step st41: For example, a dialog "a user is making late participation . . . " is displayed.

Step st42: The participant becomes the operator.

Step st43: The final state of the three-dimensional shared viewer (assembly file) is once stored.

Step st44: The assembly file is sent to the late participant.

Step st45: The file is simultaneously opened again.

Step st46: The operation right is waived, to return to original state.

Step st47: For example, the display of the dialog "a user is making late participation . . . " is erased.

Three-Dimensional Shared Viewer of Participants Other Than Late Participant Who Received Late Participation Command (cases other than above):

Step st51: For example, a dialog "a user is making late participation . . . " is displayed and the three-dimensional shared viewer waits.

Step st52: A general another name store command of the operator or chairman is received, and the final state is stored in the client system to which the three-dimensional shared viewer belongs.

Step st53: A special file open command is received, and the file is opened.

Step st54: For example, the display of the dialog "a user is making late participation . . . " is erased.

A setting to switch between the late participating process and the automatic late participating process described above, may be made at the same time as setting an item for selecting the kind of three-dimensional shared viewer as an attribute flag, when creating the conference by the conference management module, for example. In this case, if the setting is automatic, the automatic late participating process is started automatically. In addition, if the setting is manual, the late participating process is started in response to a "late participation" is pushed by the late participant.

Next, a description will be given of a late participation data transfer process. When the late participant is registered in advance as one of the participants of the conference, the late participation data transfer process successively transfers the data necessary for the late participation from a client system which is closest to the client system of the late participant to the client system of the late participant.

It is desirable that the automatic late participating process does not make the participants other than the late participant be aware of this automatic late participating process. Hence, the late participation data transfer process successively transfers the data necessary for the late participation, from the client system which is closest to the client system of the late participant to the client system of the late participant, so as not to display a dialog indicating the late participation and not to interrupt the operation of other participants. The difference data related to the three-dimensional object continue to be sent to the client system of the late participant, until the state of the three-dimensional object at the client system of the late participant matches the state of the three-dimensional objects at the client system of the other participants, and it is judged that the automatic late participating process is completed when the match occurs.

The late participation data transfer process can be realized by the following steps st61 through st69.

Step st61: When the late participant pushes a "participate" button in the conference management window, the three-dimensional shared viewer of the client system of the late participant sends a message "late participation taking place", for example, and simultaneously prohibits the operation of the three-dimensional shared viewers of the client systems of each of the other participants.

Step st62: The three-dimensional viewer of the client system of the late participant makes an inquiry to the server system, for example, to find out the client system which is closest to the client system of the late participant.

Step st63: The client system which is closest to the client system of the late participant stores the final state of the three-dimensional shared viewer.

Step st64: The client system which is closest to the client system of the late participant distributes the data to the client system of the late participant.

Step st65: The client system of the late participant stores the received data in a preset storage directory.

Step st66: When a change occurs in the client system which is closest to the client system of the late participant during the data distribution, the data related to the final position, orientation and the like of the three-dimensional object are sent or, the moving path command continues to be sent. When the final state is sent from the client system which is closest to the client system of the late participant, a flag is set, and when an operation command of the operator is received in this state, the three-dimensional shared viewer sends the command to the client system of the late participant.

Step st67: The three-dimensional viewer of the client system of the late participant receives the command, and the three-dimensional object is reproduced until no buffered data remains.

Step st68: When the three-dimensional shared viewer of the client system of the late participant no longer receives the difference data, it is judged that the state of the client system of the late participant has become the same as the state of the client systems of the other participants, and that the late participation is completed.

Step st69: The three-dimensional shared viewer of the client system of the late participant erases the display of the dialog "late participation taking place".

Next, a description will be given of the late participating process by a late participant who is not registered in advance as one of the participants of the conference. In a case where the late participant is not registered in advance as one of the participants of the conference, it is necessary to transfer the three-dimensional object data to this late participant. However, when the number of parts of the three-dimensional object is large, it takes time to make the file transfer. Hence, the following process is carried out prior to making the file transfer, and after carrying out this process, the process can be carried out similarly to the above described case where the late participant is registered in advance as one of the participants of the conference.

When a new participant who does not have the three-dimensional object data (shape data and assembly data) which are common to the participants of the conference makes a late participation, an image output is made of the CG portion from the three-dimensional shared viewer of the client system of the operator or chairman, and transferred to the client system of the new participant in a jpg format or a bmp format. In addition, a message such as "image of most recent state of conference received" is sent to and displayed on the client system of the new participant. In this case, when the jpg file is selected, a WEB browser is opened if linked thereto, and a jpg application is started if not linked thereto. On the other hand, when the bmp file is selected, a paint tool is opened if linked thereto, and a bmp application is started if not linked thereto. When the jpg format is employed, the file size becomes 64 kB, for example. When the bmp format is employed, the file size becomes 372 kB, for example. Hence, the file size can be made smaller by employing the jpg format.

The file for the conference (conference file) may be sent automatically to the client system of the new participant from the client system which is closest to the client system of the new participant or, manually received by the client system of the new participant from the server system. In the latter manual case, the server system displays a message such as "please push "continue" button after receiving conference file" on the client system of the new participant. When the new participant pushes the "continue" button after receiving the conference file from the server system, the late participating process is carried out similarly to the above described case where the late participant is registered in advance as one of the participants of the conference. As a result, the three-dimensional object data at the client system of the new participant also assumes the most recent state.

Next, a description will be given of a most recent state distributing process which distributes the most recent state of the three-dimensional object to the late participant, in a case where a moving path recording is possible.

In a case where the storage capacity of the client system is sufficiently large, it is possible to record the moving path. Hence, it is possible to distribute only the final state of the three-dimensional object (assembly file) or, to distribute the final state or the operation history (path file) depending on the data size. By distributing the assembly data with the moving math of the chairman to the client systems of each of the participants after the conference ends, it becomes possible to confirm the moving path at each of the local sites after the end of the conference.

Of course, it is possible to arbitrarily switch the system between a shared mode in which the three-dimensional shared viewers are shared, and a non-shared mode in which the three-dimensional shared viewers are not shared. In other words, during the non-shared mode, a mode switching operation may be carried out at the local site, and by applying the late participating process after the switching of the mode, it is possible to match the states of each of the local sites and switch the mode to the shared mode. In this case, the three-dimensional shared viewer simply needs to additionally include a "share stop/start" button for switching between the non-shared mode and the shared mode. When a participant wishes to operate the three-dimensional shared viewer only on his own, it is possible to switch the mode to the non-shared mode by specifying stopping of the shared mode by the "share stop/start" button. On the other hand, when the start of the shared mode is specified by the "share stop/start" button, the mode is switched to the shared mode by a process similar to the case of the late participating process.

A synchronizing process and a high-speed data transfer are related to the switching of the mode described above. When returning the mode to the shared mode, the most recent assembly data are transferred similarly to the case of the late participating process, so that each of the participants has the most recent assembly data. Since it is desirable not to make other participants wait during the conference, the participant who wishes to confirm the state on his own, can confirm the desired part by operating the three-dimensional shared viewer independently in a stand-alone state after participating to the conference.

Figure 56:
FIG. 56 is a diagram for explaining a WEB browser.
Figure 57:
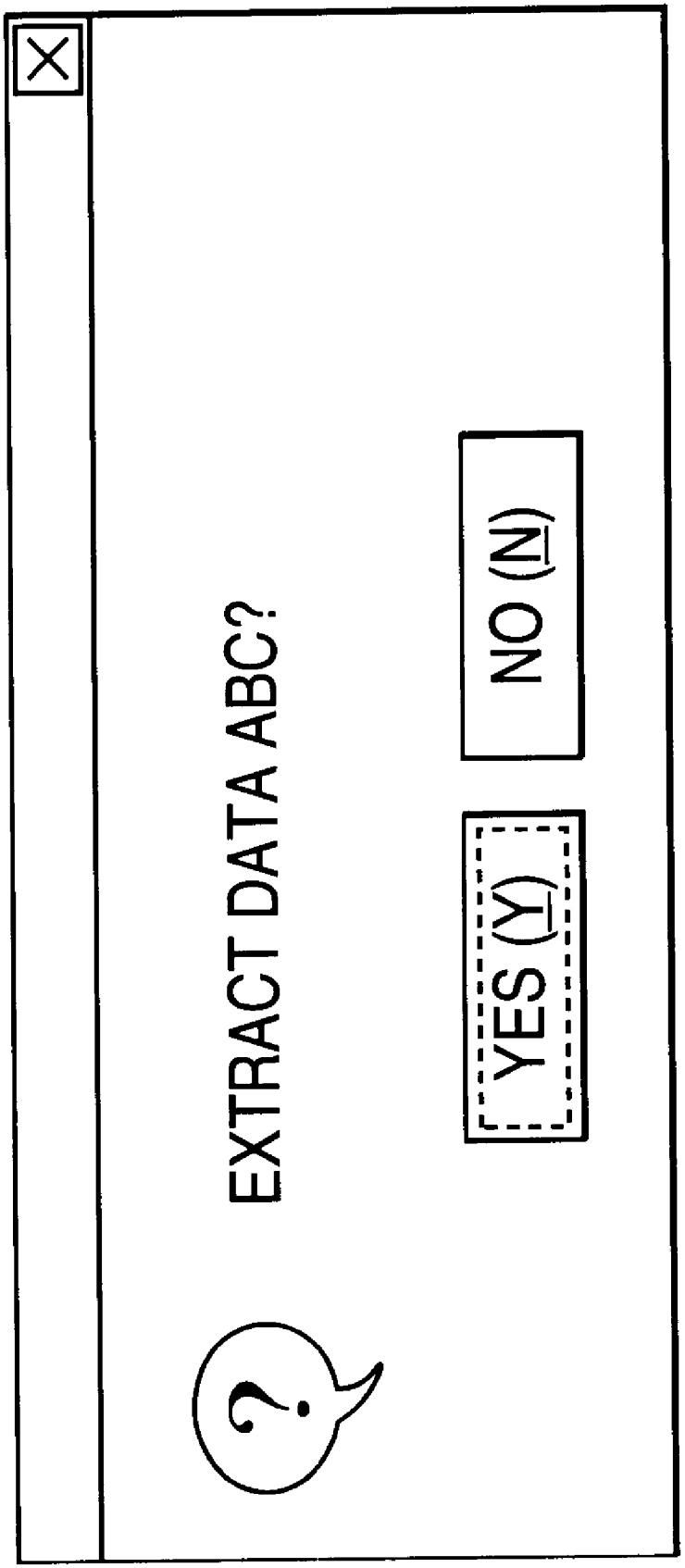
FIG. 57 is a diagram for explaining the data self-extracting.
Figure 58:
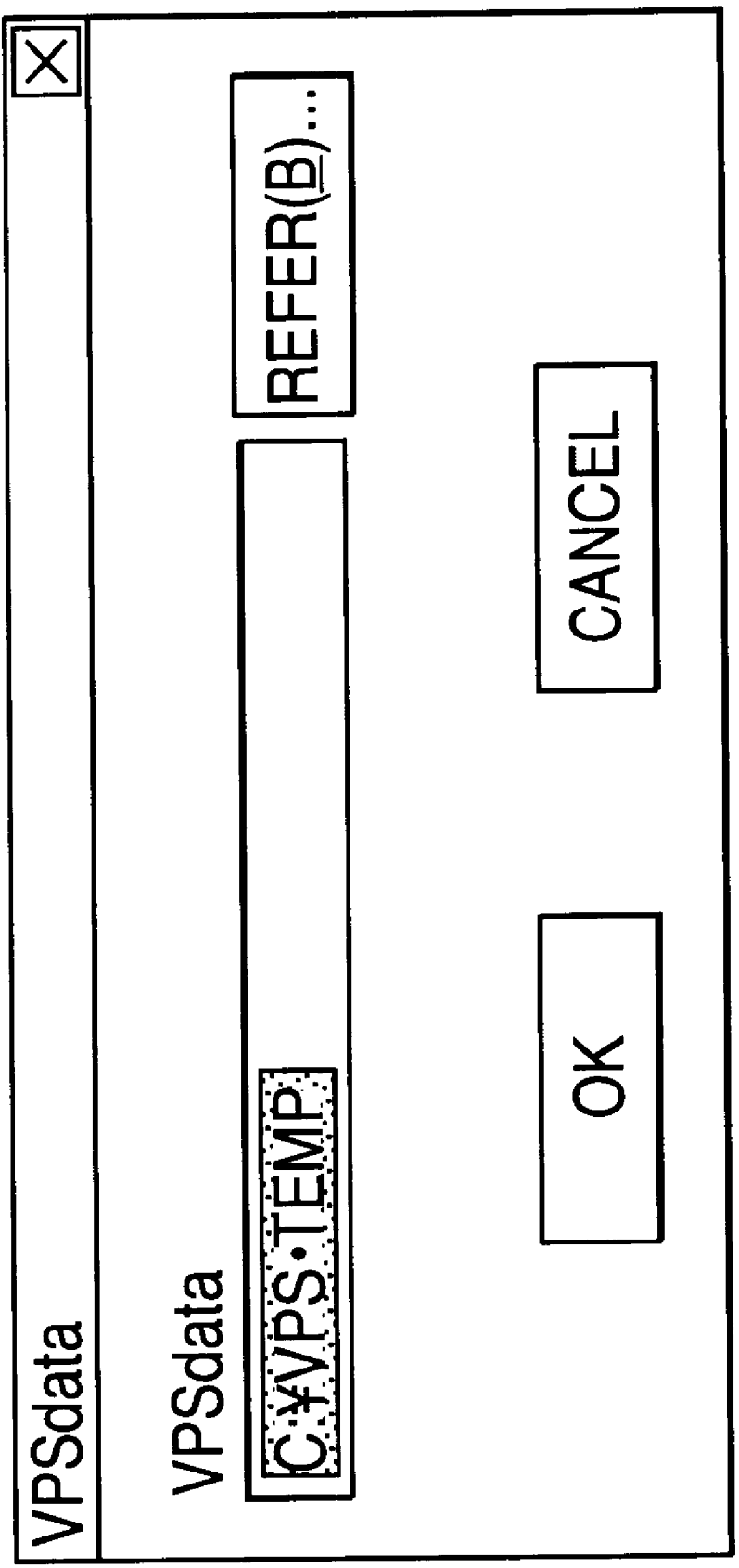
FIG. 58 is a diagram for explaining the data storage destination.

Next, a description will be given of a mail link process, by referring to FIGS. 55 through 58. FIG. 55 is a diagram for explaining a mail reception, and FIG. 56 is a diagram for explaining a WEB browser. FIG. 57 is a diagram for explaining a data self-extracting, and FIG. 58 is a diagram for explaining a data storage destination.

When a mail reception, a download from the WEB, and a self-extracting process are carried out, the three-dimensional object data are self-extracted. Thereafter, a batch process is automatically started, and a conference start time setting file is copied to a specified location, to automatically set the conference environment. A setting file of the conference start time necessary for the automatic start of the conference, is similarly copied to a specified location.

When a conference holding notification mail shown in FIG. 55 is received, a WEB browser shown in FIG. 56 is opened from the URL of the mail, so as to download the three-dimensional shared viewer data. The self-extracting of the three-dimensional object data is carried out by starting the three-dimensional shared viewer (SAIKUDATAPS.exe)., and the self-extracting is carried out a "yes" button in a menu shown in FIG. 57, for example. The data storage destination of the self-extracted data is a directory "C:¥VPS_TEMP" in the case of a menu shown in FIG. 58, for example, and a "yes" button is pushed if this directory is appropriate. When the data storage destination is to be changed, a "refer (B)" button is pushed to set the desired data storage destination. Thereafter, the batch process is automatically started, and the conference start time setting file is copied to "C:¥winnt". The copied conference start time setting file is used in an automatic start process of the system to be described later. Of course, the conference organizer must carry out a pre-processing such as a batch process and a data compression that are required for the conference.

It is possible to start the conference immediately depending on an execution format which is appended to the conference holding notification mail. In this case, by writing a file name which is to be opened during the conference into the batch process, the three-dimensional shared viewer can carry out the process using the file as the argument, so as to open the file automatically at the same time as the starting of the conference. Accordingly, it is possible to automatically carry out the operation of selecting the file, which is normally carried out by the operator by moving the directory by the file chooser.

Figure 59:
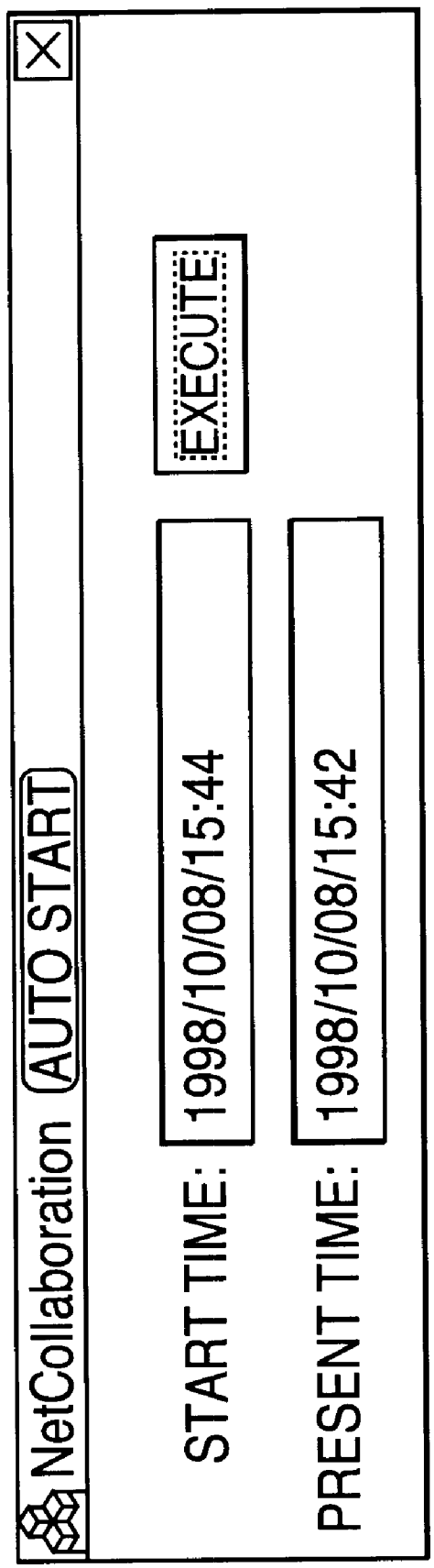
FIG. 59 is a diagram for explaining the automatic start process.
Figure 60:
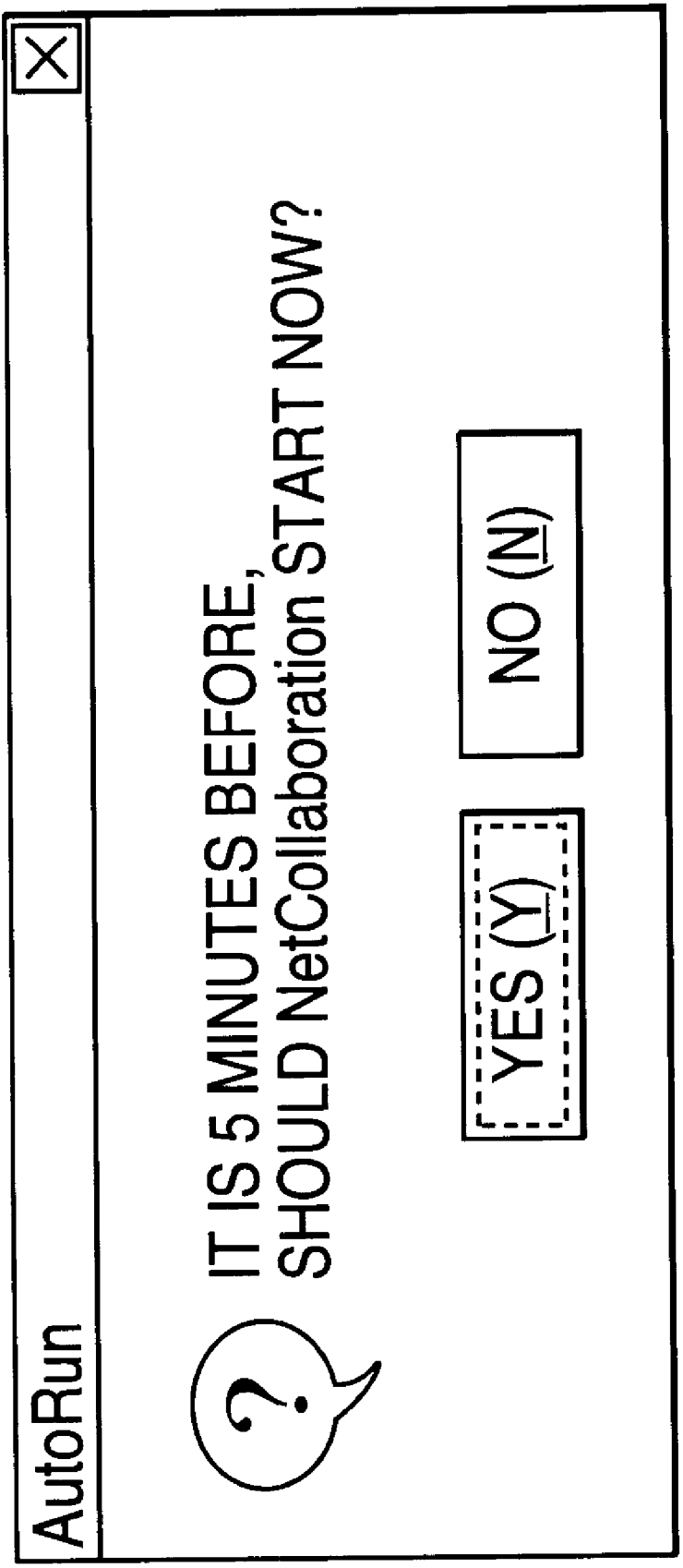
FIG. 60 is a diagram for explaining the 5-minute-before start confirmation process.
Figure 61:
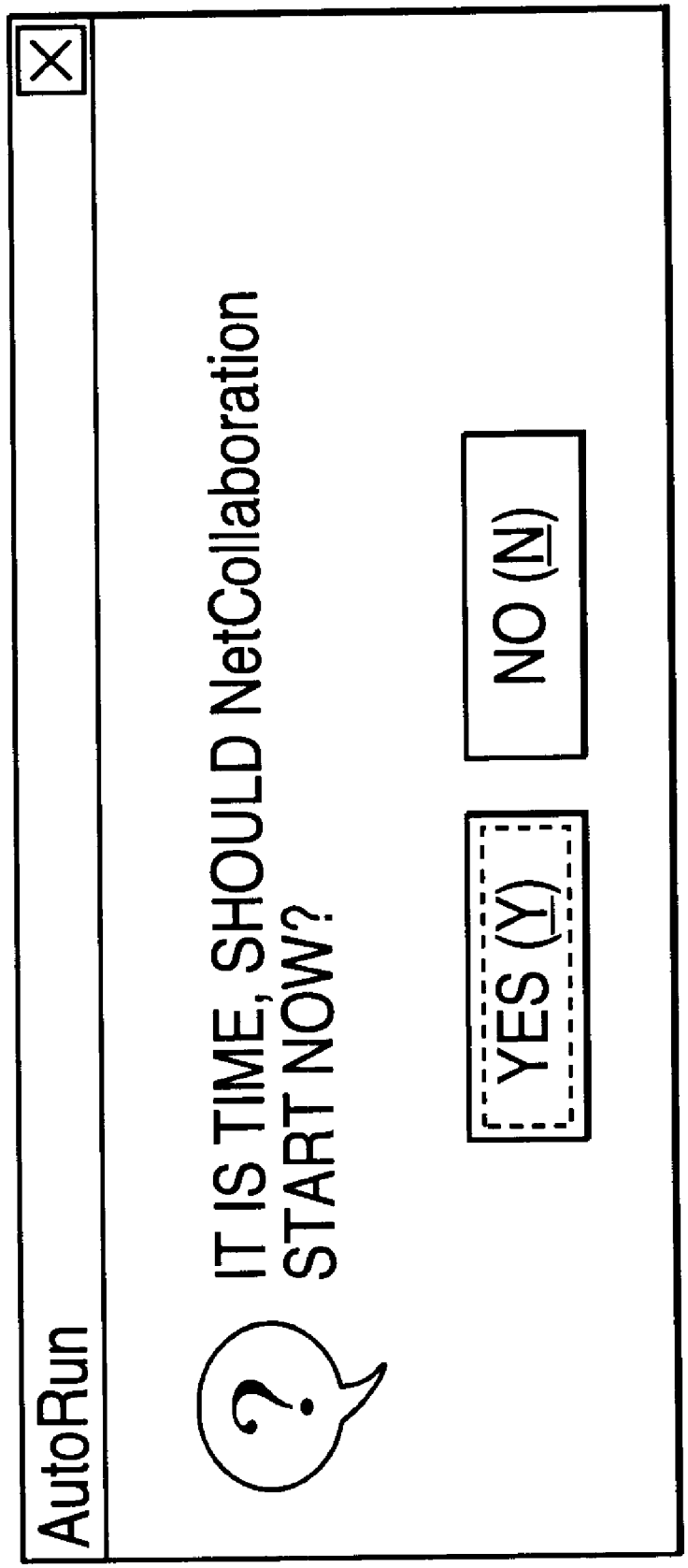
FIG. 61 is a diagram for explaining the 1-minute-before start confirmation process.

Next, a description will be given of the automatic start process of the system, by referring to FIGS. 59 through 62. FIG. 59 is a diagram for explaining the automatic start process. FIG. 60 is a diagram for explaining a 5-minute-before start confirmation process, and FIG. 61 is a diagram for explaining a 1-minute-before start confirmation process. In addition, FIG. 62 is a diagram for explaining a conference holding (participating) process.

The automatic start process automatically starts the systems when the conference start time comes. In this case, the systems will not start simultaneously if an error exists in the time managements of the server system and each of the client systems. Hence, the Greenwich Time is acquired via a network, to match the times at the server and each of the client systems. The server system and each of the client systems have a function of displaying the local time.

When the automatic start function of the conference is set, the automatic start process shown in FIG. 59 is started by the "Collabo_daemon" which is started at the time of the log-ON. Hence, the three-dimensional shared viewer is automatically started when the conference start time comes. The conference start time is written in a conference setting file. Five minutes before the conference start time, for example, a 5-minute before start confirmation menu shown in FIG. 60 is displayed, to inquire the user whether or not to start the conference. When a "yes (Y)" button is pushed in FIG. 60, the three-dimensional shared viewer (NetCollaboration) is started immediately. On the other hand, when a "no (N)" button is pushed in FIG. 60, the wait state continues. One minute before the conference start time, for example, a 1-minute before start confirmation menu shown in FIG. 61 is displayed, to inquire the user whether or not to start the conference. When a "yes (Y)" button is pushed in FIG. 61, the three-dimensional shared viewer (NetCollaboration) is started immediately. On the other hand, when a "no (N)" button is pushed in FIG. 61, the wait state continues. In addition, when an "execute" button is pushed in the automatic start dialog shown in FIG. 59, the three-dimensional shared viewer (NetCollaboration) is started immediately, even if the time is other than the conference start time, and the conference is started.

In other words, the "Collabo_daemon" starts three-dimensional shared viewer and the conference management which has an execution format of another module when the process is started within the conference holding (participating) process shown in FIG. 62, when the conference start time comes or an "execute" button is pushed in the automatic start dialog shown in FIG. 59.

Figure 63A:
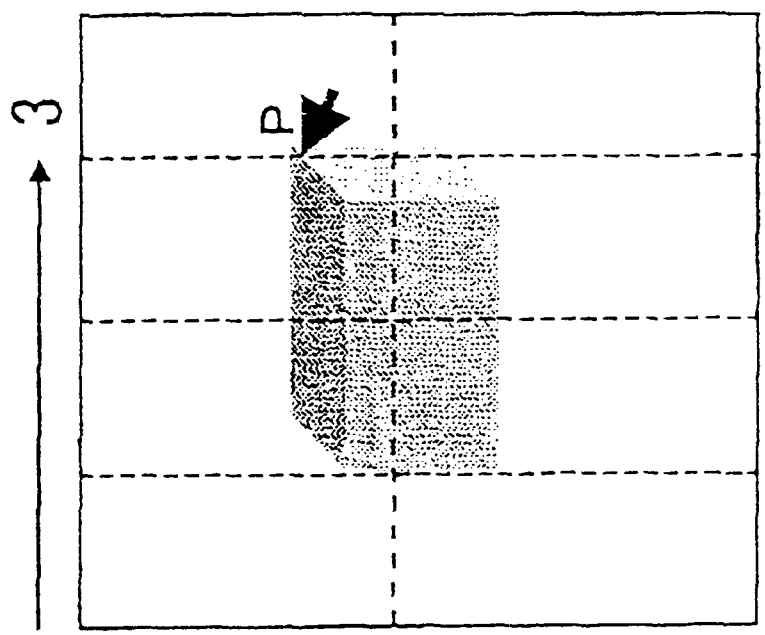
FIGS. 63A and 63B are diagrams for explaining problems generated by different CG drawing sizes.
Figure 63B:
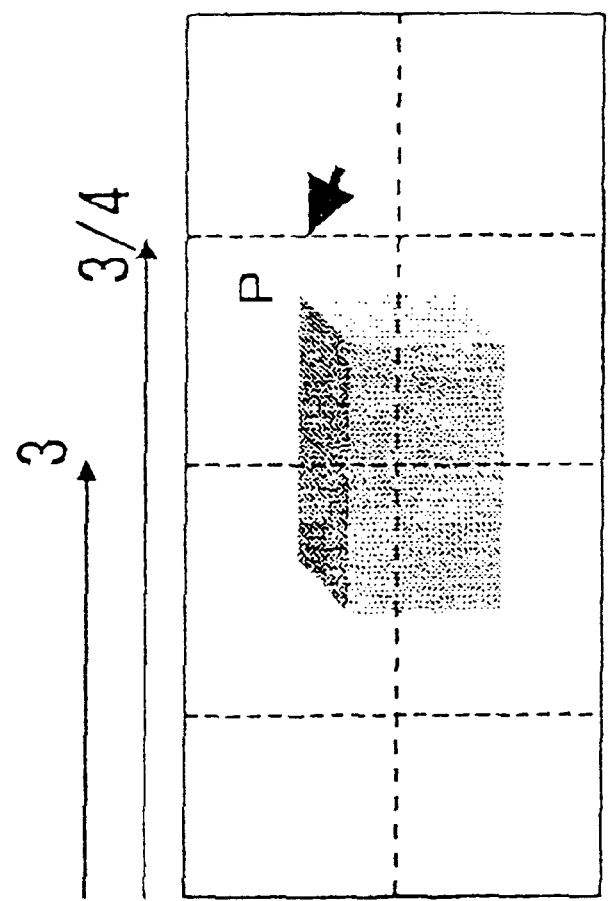
Figure 64B:
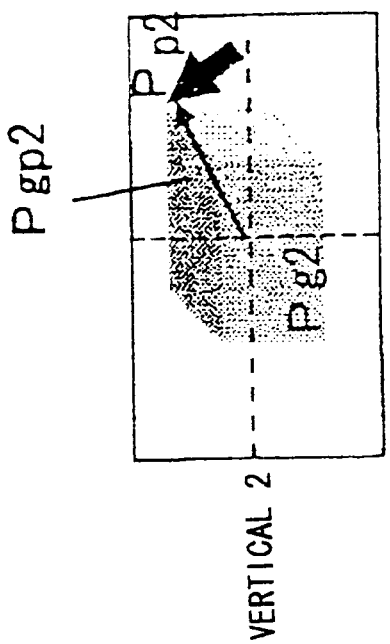
FIGS. 64A and 64B are diagrams for explaining the process of pointing the same position of the three-dimensional object even in case of different CG drawing sizes.
Figure 64A:
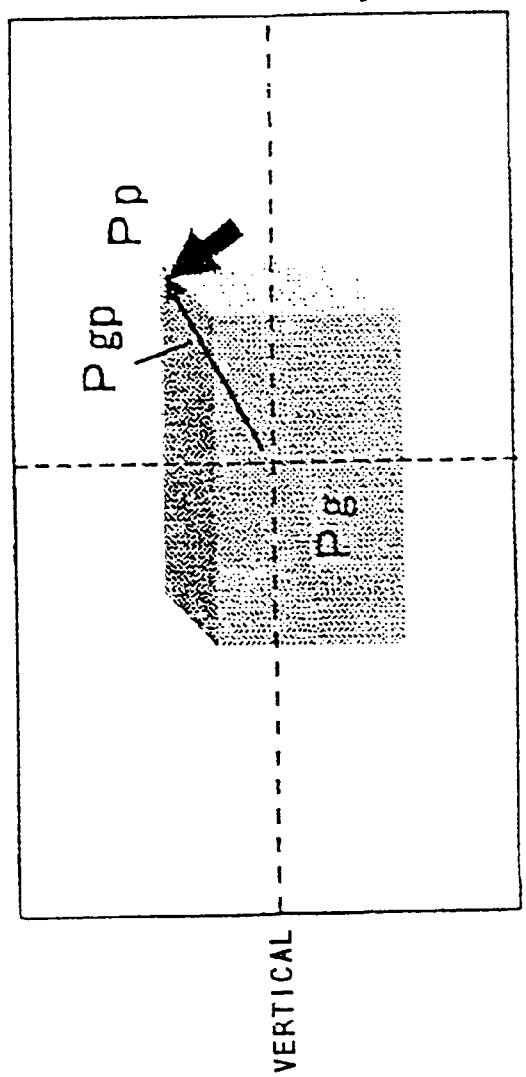

Next, a description will be given of a process of pointing the same position of the three-dimensional object by mouse cursors on displays having different sizes and different vertical/horizontal ratios, by referring to FIGS. 63A, 63B, 64A and 64B. FIGS. 63A and 63B are diagrams for explaining problems generated by different drawing region sizes, and FIGS. 64A and 64B are diagrams for explaining the process of pointing the same position of the three-dimensional object even in case of different drawing region sizes. FIGS. 63A and 64A each show the drawing region of the transmitting end, and FIGS. 63B and 64B each show the drawing region of the receiving end.

In this embodiment, a ratio of the shorter sides of the vertical and horizontal sides of the three-dimensional drawing regions of each of the three-dimensional shared viewers, is multiplied to the difference between the present mouse cursor position and the center of the three-dimensional drawing region, so that the positions pointed by the mouse cursors match in the three-dimensional drawing regions regardless of the different sizes and the vertical and horizontal ratios of the three-dimensional drawing regions.

In a case where the sizes of the three-dimensional drawing regions are different but the part size is the same, a mouse cursor position 3 from a top left reference of the drawing region shown in FIG. 63A points a central portion in the drawing region shown in FIG. 63B. Even if another method is used to set the mouse cursor position to a 3/4 length position along the horizontal direction of the drawing region shown in FIG. 63B, the mouse cursor position will not point the part in FIG. 63B. In this state, the mouse cursor positions with respect to the same part differ between the drawing regions shown in FIGS. 63A and 63B, and it is impossible to point the same point P of the three-dimensional part. If the three-dimensional object is made up of a large number of parts, the different mouse cursor positions cause problems because the mouse cursor may point a part number 5 in one drawing region, while the mouse cursor points a different part number 7 in another drawing region.

Therefore, in this embodiment, when the users at the local sites use different display area sizes for the three-dimensional shared viewers, and the size of the three-dimensional object is enlarged or reduced depending on the different sizes of the three-dimensional drawing regions. If the coordinate values are determined using the top left reference of the drawing region, the position pointed by the mouse cursor will differ depending on the size of the drawing region. For this reason, a ratio of the shorter sides of the vertical and horizontal sides of the three-dimensional drawing regions at each of the local sites is multiplied to a difference Pgp of a present mouse cursor position Pp from a center position Pg of the three-dimensional drawing region, so that the positions pointed by the mouse cursors match as shown in FIGS. 64A and 64B even when the sizes and the vertical/horizontal ratios of the three-dimensional drawing regions differ. In other words, this embodiment utilizes the characteristics of the three-dimensional drawing process of the three-dimensional shared viewer that the size of the three-dimensional object is defined by the shorter side of the vertical and horizontal sides of the drawing region.

A point Pp in the drawing region at the receiving end can be described by the following formulas (1) and (2), where Pg denotes the center of the drawing region at the receiving end, Pgp denotes a difference from the center point of the drawing region at the transmitting end, min_length_rate denotes a ratio of the shorter sides of the vertical and horizontal sides of the drawing regions, min_length denotes the shorter side of the vertical and horizontal sides of the drawing region at the receiving end, and op_min_length denotes the shorter side of the vertical and horizontal sides of the drawing region at the transmitting end.

$$Pp2=Pg2+Pgp2=Pg2+Pgp*min\_length\_rate \quad (1)$$

$$min\_length\_rate=min\_length/op\_min\_length \quad (2)$$

Figure 65:
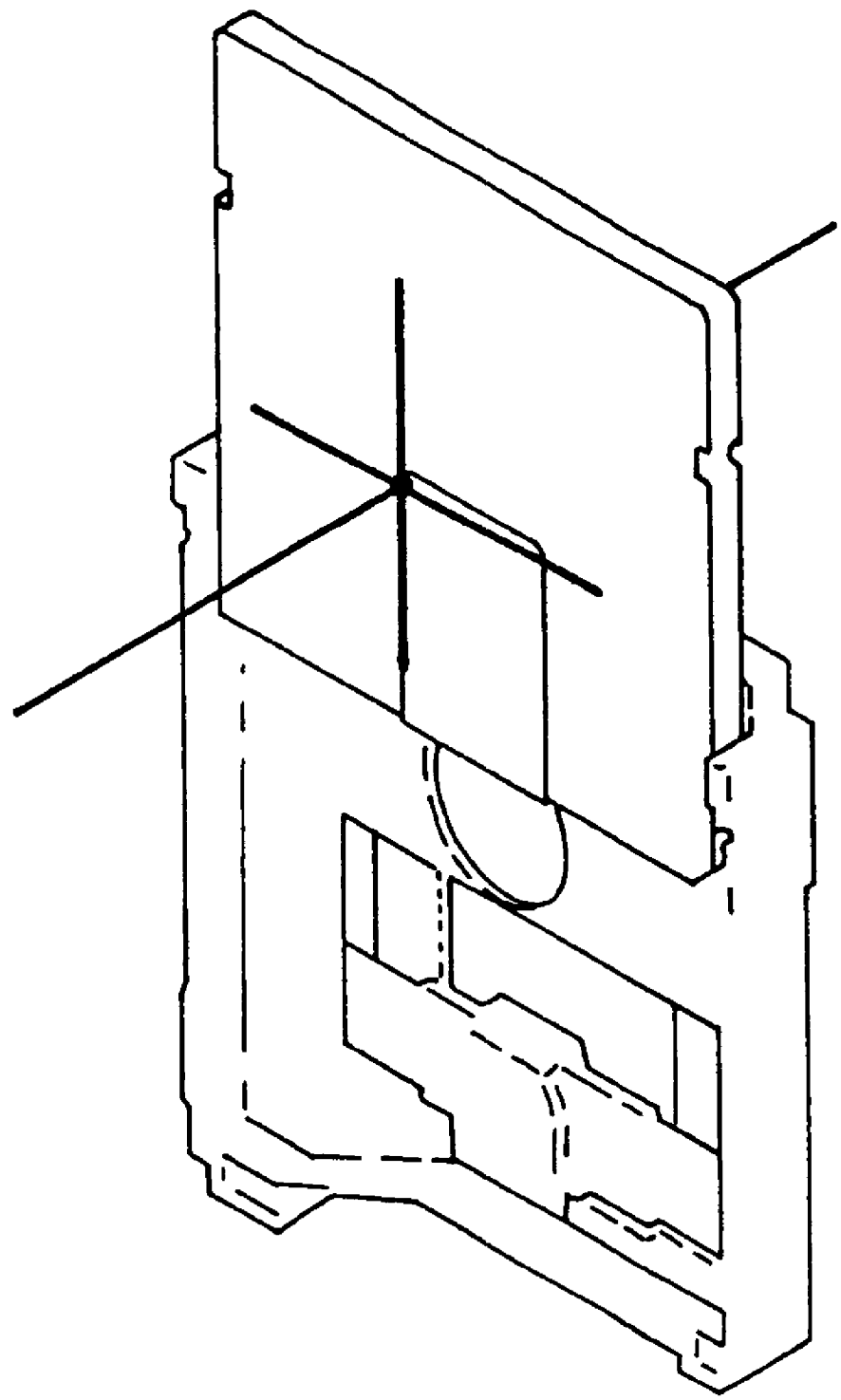
FIG. 65 is a diagram for explaining the three-dimensional pointing using a needle.

Next, a description will be given of a process of clarifying a point which is to be pointed by a three-dimensional pointing function, by referring to FIGS. 65 through 67. FIG. 65 is a diagram for explaining the three-dimensional pointing using a needle, FIG. 66 is a diagram for explaining the three-dimensional pointing using a cone, and FIG. 67 is a diagram for explaining the three-dimensional pointing using an annotation function.

Figure 66:
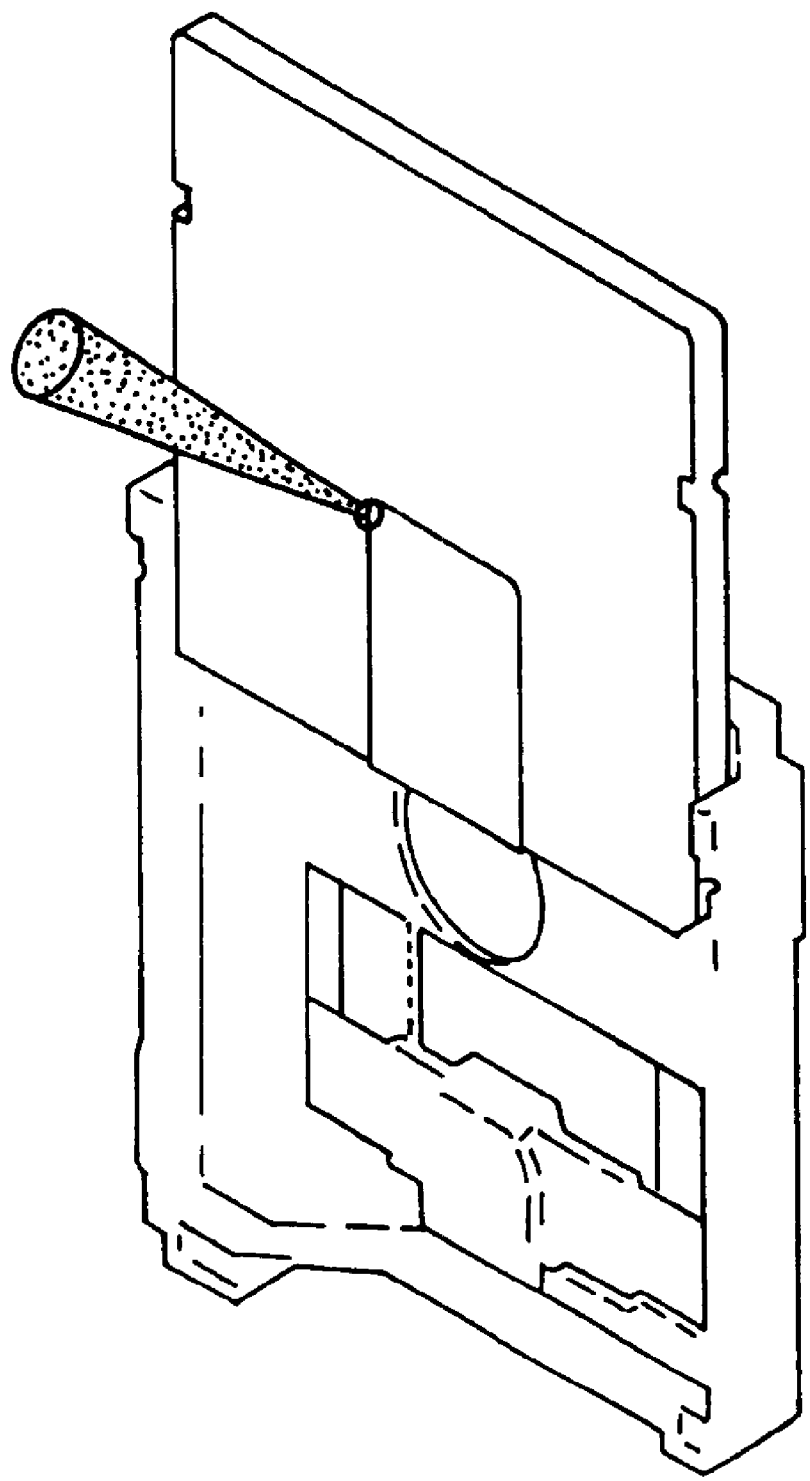
FIG. 66 is a diagram for explaining the three-dimensional pointing using a cone.
Figure 67:
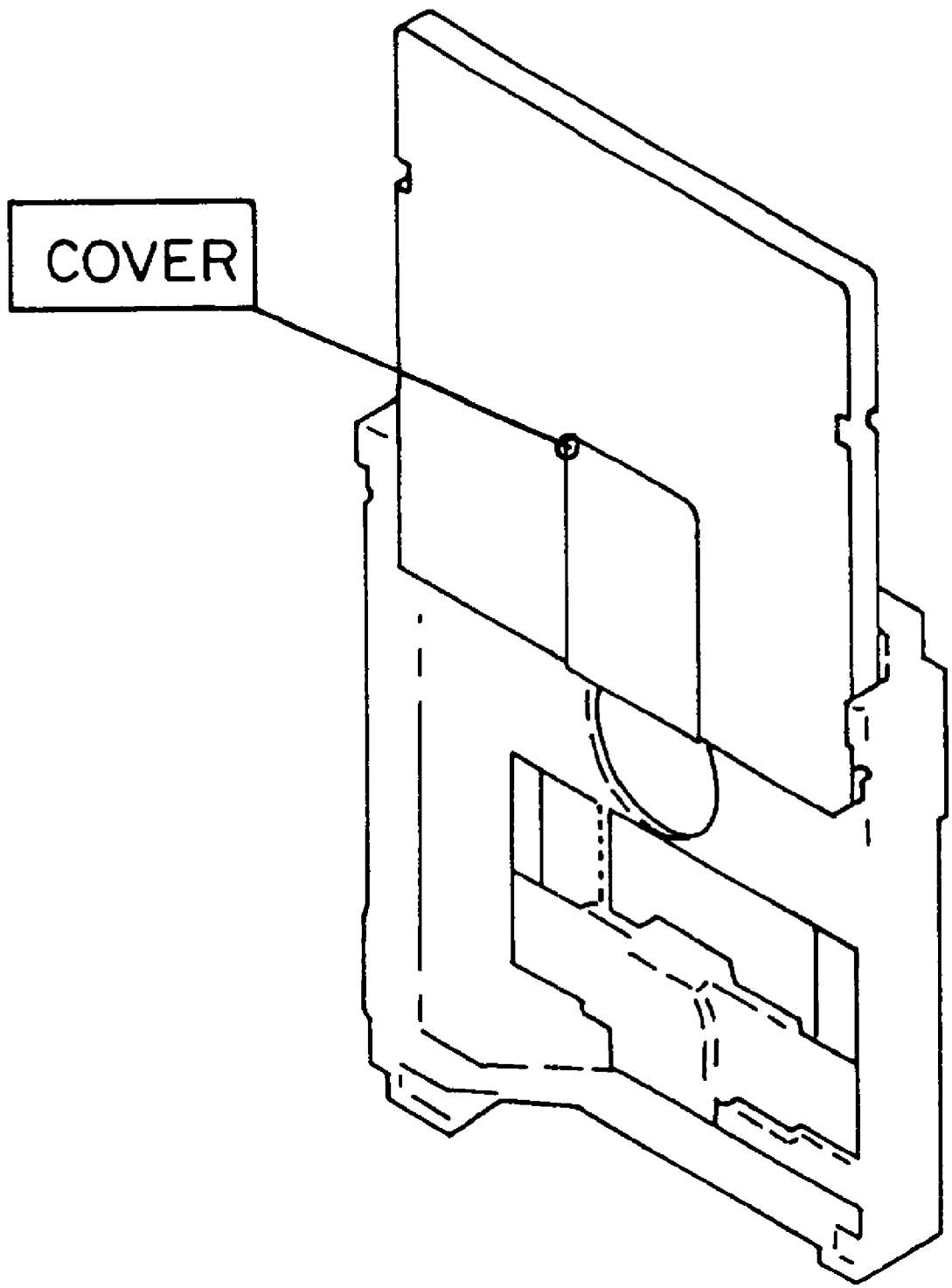
FIG. 67 is a diagram for explaining the three-dimensional pointing using the annotation function.

It is possible to clarify the point which is pointed, by displaying a three-dimensional needle shown in FIG. 65 or a three-dimensional cone shown in FIG. 66, about the point which is selected on the three-dimensional object. Furthermore, it is also possible to clarify the point which is pointed, by using a three-dimensional annotation function of the three-dimensional shared viewer, as shown in FIG. 67.

Figure 68:
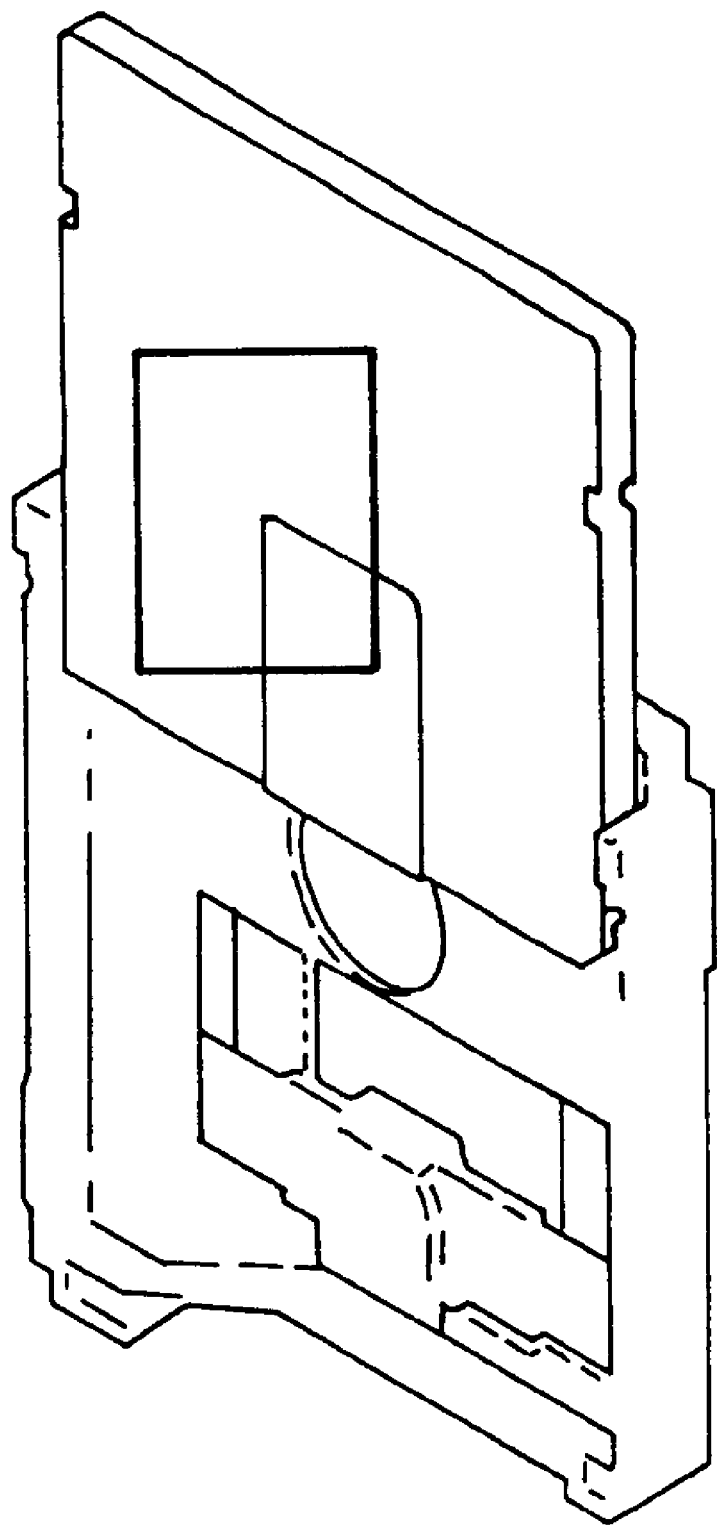
FIG. 68 is a diagram for explaining the pointing using a two-dimensional rectangle.

Next, a description will be given of a process of clarifying a point which is pointed by a two-dimensional pointing function, by referring to FIG. 68. FIG. 68 is a diagram for explaining the pointing using a two-dimensional rectangle.

As shown in FIG. 68, by clarifying the point which is pointed by use of the two-dimensional rectangle or, a rough sketch which connects the moving locus of the mouse cursor, which is overwritten on the three-dimensional drawing region, it is possible to clearly indicate to the user the point on the three-dimensional object where the attention is to be drawn.

Next, a description will be given of a process of matching a target region by a forced enlargement. In a state where the three-dimensional object is shared and a receiving end carries out an independent operation by reducing the size of the three-dimensional drawing region, there are cases where interfering portions and the like cannot be clearly indicated to the user because it is difficult to see on the reduced scale. Hence, when the operator pushes a "forced enlargement" button, the three-dimensional drawing region of the receiving end is forcibly enlarged to the same size as the three-dimensional drawing region of the operator. In this case, it is possible to carry out the process of only matching the sizes of the three-dimensional drawing regions or, the process of matching the display sizes at the operator and the receiving end by sending the display size information from the operator.

Next, a description will be given of an operation right switching process, by referring to FIG. 69. FIG. 69 is a diagram for explaining the operation right switching process.

In order to avoid confusion when a plurality of participants simultaneously attempts to carry out an operation, measures a taken so that the participant who pushes a "acquire operation right" acquires the operation right and the right to share the three-dimensional object. In this case, a flag may be used to distinguish participants with and without the operation right, and an exclusive control may be carried out to prohibit the operation of a participant without the operation right when this participant without the operation right attempts to operate the three-dimensional shared viewer. However, measures may additionally be taken so that even a participant without the operation right may immediately acquire the operation right from the previous operator by pushing the "acquire operation right" button. In addition, a "operation right lock" button may be provided, so that the shift of the operation right is prohibited when this "operation right lock" button is pushed. FIG. 69 shows the switching states of the operation right.

The operation right switching process may be carried out automatically, without the need to push the "acquire operation right" button. For example, it is possible to automatically switch the operation right to a participant other than the operator when this participant moves the mouse cursor into the three-dimensional shared viewer.

Further, the present invention is not limited to these embodiments, but various variations and modifications may be made without departing from the scope of the present invention.

What is claimed is:

1. A three-dimensional object shared processing method for sharing data of a three-dimensional object among a plurality of computer systems which are coupled via a network, comprising:

updating the data of the three-dimensional object stored at each of the computer system so that the data match, based on an operation command and change information, said operation command being related to an operation with respect to the three-dimensional object carried out at each of the computer systems, said change information indicating a change of the three-dimensional object caused by the operation carried out with respect to the three-dimensional object, and including an identification number of a selected part of the three-dimensional object and a position coordinate of the selected part.

2. The three-dimensional object shared processing method as claimed in claim 1, further comprising:

exchanging the change information at each of the computer systems, before an updating process which updates internal data and a drawing process.

3. The three-dimensional object shared processing method as claimed in claim 1, further comprising:

changing data size exchanged at each of the computer systems.

4. The three-dimensional object shared processing method as claimed in claim 1, further comprising:

displaying a dummy window and reproducing an operation carried out at a transmitting and computer system, at a receiving end computer system which receives the operation command and the change information from the transmitting and computer system.

5. The three-dimensional object shared processing method as claimed in claim 1, further comprising:

decimating data related to a mouse cursor movement at a transmitting end computer system; and interpolating data related to the mouse cursor movement at a receiving end computer system.

6. The three-dimensional object shared processing method as claimed in claim 1, further comprising:

carrying out, at a receiving end computer system, at least one of a dynamic decimation synchronizing process, a Level of Detail (LOD) dynamic decimation synchronizing process, a skip synchronizing process, a long-duration process synchronizing process, a stop position synchronizing process, a path reproduction synchronizing process, and a wait synchronizing process.

7. A computer-readable storage medium which stores a program for causing a computer to process data of at here-dimensional object to be shared among a plurality of computer systems which are coupled via a network, comprising:

an update unit causing the computer to update the data of the three-dimensional object stored at each of the computer systems so that the data match, based on an operation command and change information, said operation command being related to an operation with respect to the three-dimensional object carried out at each of the computer systems, said change information indicating a change of the three-dimensional object caused by the operation carried out with respect to the three-dimensional object, and including an identification number of a selected part of the three-dimensional object and a position coordinate of the selected part.

8. The computer-readable storage medium as claimed in claim 7, further comprising:

an exchange unit causing the computer to exchange the change information at each of the computer systems, before an updating process which updates internal data and a drawing process.

9. The computer-readable storage medium as claimed in claim 7, further comprising:

a change unit causing the computer to change data size exchanged at each of the computer systems.

10. The computer-readable storage medium as claimed in claim 7, further comprising:

a display unit causing the computer to display a dummy window and reproducing an operation carried out at a transmitting end computer system, at a receiving end computer system which receives the operation command and the change information from the transmitting end computer system.

11. The computer-readable storage medium as claimed in claim 7, further comprising:

a decimating unit causing the computer to decimate data related to a mouse cursor movement at a transmitting end computer system; and an interpolating unit causing the computer to interpolate data related to the mouse cursor movement at a receiving end computer system.

12. The computer-readable storage medium as claimed in claim 7, further comprising:

a process executing unit causing the computer to carry out, at a receiving end computer system, at least one of a dynamic decimation synchronization process, a Level of Detail (LOD) dynamic decimation synchronizing process, a skip synchronizing process, a long-duration process synchronizing process, a stop position synchronizing process, a path reproduction synchronizing process, and a wait synchronizing process.

* * * * *